US012807802B2

(12) United States Patent
Kuno et al.

(10) Patent No.: US 12,807,802 B2
(45) Date of Patent: Nov. 24, 2026

(54) ADDITIVE MANUFACTURING OF THREE-DIMENSIONAL OBJECTS CONTAINING A TRANSPARENT MATERIAL

(71) Applicant: Stratasys Ltd., Rehovot (IL)

(72) Inventors: Lev Kuno, Tzur-Hadassah (IL); Mariana Pokrass, Rehovot (IL); Elena Shpayzer, Gedera (IL); Dani Peri, Rehovot (IL)

(73) Assignee: Stratasys Ltd., Rehovot (IL)

( * ) Notice: Subject to any disclaimer, the term of this patent is extended or adjusted under 35 U.S.C. 154(b) by 271 days.

(21) Appl. No.: 18/033,105

(22) PCT Filed: Oct. 21, 2021

(86) PCT No.: PCT/IL2021/051252

§ 371 (c)(1),
(2) Date: Apr. 21, 2023

(87) PCT Pub. No.: WO2022/085006

PCT Pub. Date: Apr. 28, 2022

(65) Prior Publication Data

US 2023/0391998 A1 Dec. 7, 2023

Related U.S. Application Data

(60) Provisional application No. 63/094,801, filed on Oct. 21, 2020.

(51) Int. Cl.
*C08L 33/10* (2006.01)
*B29C 64/264* (2017.01)
(Continued)

(52) U.S. Cl.
CPC ............ *C08L 33/10* (2013.01); *B29C 64/264* (2017.08); *C08K 5/372* (2013.01); *B33Y 10/00* (2014.12); *B33Y 70/00* (2014.12)

(58) Field of Classification Search
None
See application file for complete search history.

(56) References Cited

U.S. PATENT DOCUMENTS 3,309,225 A 3/1967 Holladay et al.
6,242,149 B1 * 6/2001 Maeda .................... G03F 7/027 522/66

(Continued)

FOREIGN PATENT DOCUMENTS

EP 33896 A * 8/1981 ................ C08F 8/34
EP 2749610 7/2014

(Continued)

OTHER PUBLICATIONS

Technical Data Sheet for A-TMM-3LM-N as supplied from Shin-Nakamura from SpecialChem. [online]. [retrieved on Mar. 9, 2026]/ Retrieved from internet <URL:https://www.specialchem.com/coatings/product/shin-nakamura-chemicals-a-tmm-3lm-n>. (Year: 2023).*

(Continued)

*Primary Examiner* — Sanza L. McClendon

(57) ABSTRACT

Curable formulations which are usable in additive manufacturing of three-dimensional objects using a transparent material, and which can be advantageously usable in additive manufacturing systems that utilize a LED curing source are provided. Additive manufacturing processes using same and objects made thereby are also provided.

21 Claims, 10 Drawing Sheets

(51) Int. Cl.

| | |
|---|---|
| ***C08K 5/372*** | (2006.01) |
| *B33Y 10/00* | (2015.01) |
| *B33Y 70/00* | (2020.01) |

(56) References Cited

U.S. PATENT DOCUMENTS

| | | | | |
|---|---|---|---|---|
| 6,259,962 | B1 | 7/2001 | Gothait | |
| 6,658,314 | B1 | 12/2003 | Gothait | |
| 6,850,334 | B1 | 2/2005 | Gothait | |
| 6,863,859 | B2 | 3/2005 | Levy | |
| 7,183,335 | B2 | 2/2007 | Napadensky | |
| 7,209,797 | B2 | 4/2007 | Kritchman et al. | |
| 7,225,045 | B2 | 5/2007 | Gothait et al. | |
| 7,300,619 | B2 | 11/2007 | Napadensky et al. | |
| 7,500,846 | B2 | 3/2009 | Eshed et al. | |
| 7,991,498 | B2 | 8/2011 | Kritchman | |
| 9,031,680 | B2 | 5/2015 | Napadensky | |
| 9,227,365 | B2 | 1/2016 | Dikovsky et al. | |
| 9,662,839 | B2 * | 5/2017 | Napadensky | B29C 64/386 |
| 10,589,459 | B2 * | 3/2020 | Ravich | B33Y 80/00 |
| 10,994,475 | B2 * | 5/2021 | Levy | B32B 27/08 |
| 11,433,597 | B2 * | 9/2022 | Ravich | B29C 64/106 |
| 11,559,936 | B2 * | 1/2023 | Dikovsky | B33Y 70/00 |
| 11,958,236 | B2 * | 4/2024 | Levy | B32B 27/308 |
| 12,291,603 | B2 * | 5/2025 | Kuno | C08G 73/128 |
| 2010/0140850 | A1 * | 6/2010 | Napadensky | B29C 64/112 522/79 |
| 2010/0191360 | A1 | 7/2010 | Napadensky | |
| 2010/0230384 | A1 * | 9/2010 | Morita | G03F 7/0002 522/182 |
| 2012/0251841 | A1 | 10/2012 | Southwell et al. | |
| 2013/0052423 | A1 * | 2/2013 | Suemitsu | C09D 133/14 264/447 |
| 2015/0275125 | A1 | 10/2015 | Karaki et al. | |
| 2016/0009029 | A1 * | 1/2016 | Cohen | B29C 64/209 264/250 |
| 2016/0339643 | A1 | 11/2016 | Dikovsky et al. | |
| 2018/0207863 | A1 * | 7/2018 | Porter | B29C 64/40 |
| 2019/0009457 | A1 * | 1/2019 | Watanabe | G03F 7/027 |
| 2019/0077073 | A1 * | 3/2019 | Kwisnek | C08L 91/00 |
| 2022/0033678 | A1 * | 2/2022 | Fuchs | C08F 290/067 |
| 2022/0079547 | A1 * | 3/2022 | Dikovsky | C09D 4/00 |
| 2023/0028822 | A1 * | 1/2023 | Chisaka | G03F 7/028 |
| 2023/0038195 | A1 * | 2/2023 | Chisaka | G03F 7/032 |
| 2023/0056225 | A1 * | 2/2023 | Chisaka | G03F 7/029 |

FOREIGN PATENT DOCUMENTS

| | | | | |
|---|---|---|---|---|
| EP | 4541837 | * | 4/2025 | |
| GB | 2180358 A | * | 3/1987 | G03F 7/002 |
| JP | 2005501124 | * | 1/2005 | |
| JP | 2010-006977 | | 1/2010 | |
| JP | 2013-514451 | | 4/2013 | |
| WO | WO 2009/013751 | | 1/2009 | |
| WO | WO 2011/075553 | | 6/2011 | |
| WO | WO 2013/128452 | | 9/2013 | |
| WO | WO 2016/063282 | | 4/2016 | |
| WO | WO 2016/125170 | | 8/2016 | |
| WO | WO 2017/068590 | | 4/2017 | |
| WO | WO 2017/134672 | | 8/2017 | |
| WO | WO 2017/134673 | | 8/2017 | |
| WO | WO 2017/134674 | | 8/2017 | |
| WO | WO 2017/134676 | | 8/2017 | |
| WO | WO 2017/187434 | | 11/2017 | |
| WO | WO 2018/055521 | | 3/2018 | |
| WO | WO 2018/055522 | | 3/2018 | |
| WO | WO 2020/003863 | | 1/2020 | |
| WO | WO 2020/045325 | | 3/2020 | |
| WO | WO 2020/065654 | | 4/2020 | |
| WO | WO-2020148189 A1 | * | 7/2020 | B29C 64/124 |
| WO | WO-2021106683 A1 | * | 6/2021 | C08F 2/44 |
| WO | WO 2022/085006 | | 4/2022 | |

OTHER PUBLICATIONS

International Preliminary Report on Patentability May 4, 2023 From the International Bureau of WIPO Re. Application No. PCT IL2021/051252. (15 Pages).

International Search Report and the Written Opinion Dated Mar. 30, 2022 From the International Searching Authority Re. Application No. PCT/IL2021/051252. (24 Pages).

Invitation to Pay Additional Fees, Communication Relating to the Results of the Partial International Search and the Provisional Opinion Dated Jan. 31, 2022 From the International Searching Authority Rc. Application No. PCT/IL2021/051252. (18 Pages).

Notice of Reasons for Rejection Dated Jun. 6, 2025 From the Japan Patent Office Re Application No. 2023-524736 and its Translation into English. (11 Pages).

Notice of Reasons for Rejection Dated Jan. 6, 2026 From the Japan Patent Office Re Application No. 2023-524736 and Its Translation Into English. (7 Pages).

Notification of Office Action and Search Report Dated Dec. 22, 2025 From the National Intellectual Property Administration of the People's Republic of China Re. Application No. 202180082302.6 and Its Summary and Machine Translation Into English. (15 Pages).

Notification of Office Action and Search Report Dated May 29, 2026 From the National Intellectual Property Administration of the People's Republic of China Re. Application No. 202180082302.6 with Summary and Machine Translation Into English. (17 Pages).

Notice of Reason(s) for Rejection Dated Aug. 4, 2026 From the Japan Patent Office Re. Application No. 2023-524736 and Its Translation Into English. (3 Pages).

Notification of Office Action and Search Report Dated Aug. 7, 2026 From the National Intellectual Property Administration of the People's Republic of China Re. Application No. 202180082302.6 with Its Summary and Machine Translation Into English. (17 Pages).

Office Action Dated Jul. 9, 2026 From the Israel Patent Office Re. Application No. 302322. (5 Pages).

* cited by examiner

ADDITIVE MANUFACTURING OF THREE-DIMENSIONAL OBJECTS CONTAINING A TRANSPARENT MATERIAL

RELATED APPLICATIONS

This application is a National Phase of PCT Patent Application No. PCT/IL2021/051252 having International filing date of Oct. 21, 2021, which claims the benefit of priority under 35 USC § 119 (e) of U.S. Provisional Patent Application No. 63/094,801 filed on Oct. 21, 2020.

PCT Patent Application No. PCT/IL2021/051252 is also related to co-filed, co-pending and co-assigned PCT Application No. PCT/IL2021/051250 entitled "METHOD AND SYSTEM FOR TREATING AN ADDITIVE MANUFACTURED OBJECT", which claims the benefit of priority under 35 USC § 119(e) of U.S. Provisional Patent Application No. 63/094,712 filed on Oct. 21, 2020.

The contents of the above applications are all incorporated by reference as if fully set forth herein in their entirety.

FIELD AND BACKGROUND OF THE INVENTION

The present invention, in some embodiments thereof, relates to additive manufacturing and, more particularly, but not exclusively, to formulations usable in additive manufacturing of three-dimensional objects containing, in at least a portion thereof, a transparent material, and to additive manufacturing of three-dimensional objects using such formulations.

Additive manufacturing (AM) is a technology enabling fabrication of arbitrarily shaped structures directly from computer data via additive formation steps. The basic operation of any AM system consists of slicing a three-dimensional computer model into thin cross sections, translating the result into two-dimensional position data and feeding the data to control equipment which fabricates a three-dimensional structure in a layerwise manner.

Additive manufacturing entails many different approaches to the method of fabrication, including three-dimensional (3D) printing such as 3D inkjet printing, electron beam melting, stereolithography, selective laser sintering, laminated object manufacturing, fused deposition modeling and others.

Some 3D printing processes, for example, 3D inkjet printing, are being performed by a layer by layer inkjet deposition of building materials. Thus, a building material is dispensed from a dispensing head having a set of nozzles to deposit layers on a supporting structure. Depending on the building material, the layers may then be cured or solidified. Curing may be by exposure to a suitable condition, and optionally by using a suitable device.

The building material includes an uncured model material (also referred to as "uncured modeling material" or "modeling material formulation"), which is selectively dispensed to produce the desired object, and may also include an uncured support material (also referred to as "uncured supporting material" or "support material formulation") which provides temporary support to specific regions of the object during building and assures adequate vertical placement of subsequent object layers. The supporting structure is configured to be removed after the object is completed.

In some known inkjet printing systems, the uncured model material is a photopolymerizable or photocurable material that is cured, hardened or solidified upon exposure to ultraviolet (UV) light after it is jetted. The uncured model material may be a photopolymerizable material formulation that has a composition which, after curing, gives a solid material with mechanical properties that permit the building and handling of the three-dimensional object being built. The material formulation may include a reactive (curable) component and a photo-initiator. The photo-initiator may enable at least partial solidification (hardening) of the uncured support material by curing with the same UV light applied to form the model material. The solidified material may be rigid, or may have elastic properties.

The support material is formulated to permit fast and easy cleaning of the object from its support. The support material may be a polymer, which is water-soluble and/or capable of swelling and/or breaking down upon exposure to a liquid solution, e.g. water, alkaline or acidic water solution. The support material formulation may also include a reactive (curable) component and a photo-initiator similar to that used for the model material formulation.

In order to be compatible with most of the commercially-available print heads utilized in a 3D inkjet printing system, the uncured building materials are known to feature the following characteristics: a relatively low viscosity (e.g., Brookfield Viscosity of up to 50 cps, or up to 35 cps, preferably from 8 to 25 cps) at the working (e.g., jetting) temperature; Surface tension of from about 25 to about 55 Dyne/cm, preferably from about 25 to about 40 Dyne/cm; and a Newtonian liquid behavior and high reactivity to a selected curing condition, to enable fast solidification of the jetted layer upon exposure to a curing condition, of no more than 1 minute, preferably no more than 20 seconds.

The hardened modeling material which forms the final object typically exhibits a heat deflection temperature (HDT) which is higher than room temperature, in order to assure its usability. Desirably, the hardened modeling material exhibits an HDT of at least 35° C. For an object to be stable at variable conditions, a higher HDT is known to be desirable. In most cases, it is also desirable that the object exhibits relatively high Izod Notched impact, e.g., higher than 50 or higher than 60 J/m.

Various three-dimensional printing techniques exist and are disclosed in, e.g., U.S. Pat. Nos. 6,259,962, 6,569,373, 6,658,314, 6,850,334, 6,863,859, 7,183,335, 7,209,797, 7,225,045, 7,300,619, 7,500,846, 7,991,498 and 9,031,680 and U.S. Published Application No. 20160339643, all by the same Assignee, and being hereby incorporated by reference in their entirety.

Several additive manufacturing processes, including three-dimensional inkjet printing, allow additive formation of objects using more than one modeling material, also referred to as "multi-material" AM processes. For example, U.S. Patent Application having Publication No. 2010/0191360, of the present Assignee, discloses a system which comprises a solid freeform fabrication apparatus having a plurality of print heads, a building material supply apparatus configured to supply a plurality of building materials to the fabrication apparatus, and a control unit configured for controlling the fabrication and supply apparatus. The system has several operation modes. In one mode, all print heads operate during a single building scan cycle of the fabrication apparatus. In another mode, one or more of the print heads is not operative during a single building scan cycle or part thereof.

In a 3D inkjet printing process such as Polyjet™ (Stratasys® Ltd., Israel), the building material is selectively jetted from one or more inkjet print heads and/or nozzles and deposited onto a fabrication tray in consecutive layers according to a pre-determined configuration as defined by a software file.

U.S. Pat. No. 9,227,365, by the present assignee, discloses methods and systems for solid freeform fabrication of shelled objects, constructed from a plurality of layers and a layered core constituting core regions and a layered shell constituting envelope regions. This is also referred to as digital ABS™, or D-ABS™.

The Polyjet™ technology allows control over the position and composition of each voxel (volume pixel), which affords enormous design versatility and digital programming of multi-material structures. Other advantages of the Polyjet™ technology is the very high printing resolution, up to 14 μm layer height, and the ability to print multiple materials simultaneously, in a single object. This multi-material 3D printing process often serves for fabrication of complex parts and structures that are comprised of elements having different stiffness, performance, color or transparency. New range of materials, programmed at the voxel level, can be created by the PolyJet™ printing process, using only few starting materials.

International Patent Application Publication No. WO 2013/128452, by the present Assignee, discloses a multi-material approach which involves separate jetting of two components of a cationic polymerizable system and/or a radical polymerizable system, which intermix on the printing tray, leading to a polymerization reaction similar to pre-mixing of the two components before jetting, while preventing their early polymerization on the inkjet head nozzle plate.

Current PolyJet™ technology offers the capability to use a range of curable (e.g., polymerizable) materials that provide polymeric materials featuring a variety of properties, ranging, for example, from stiff and hard materials (e.g., curable formulations marketed as the Vero™ Family materials) to soft and flexible materials (e.g., curable formulations marketed as the Tango™ and Agilus™ families), and including also objects made using Digital ABS, which contain a multi-material made of two starting materials (e.g., RGD515™ & RGD535/531™), and simulate properties of engineering plastic. Most of the currently practiced PolyJet™ materials are curable materials which harden or solidify upon exposure to radiation, mostly UV radiation and/or heat, with the most practiced materials being acrylic-based materials.

Some photocurable (photopolymerizable) modeling material formulations known as usable in 3D inkjet printing are designed so as to provide, when hardened, a transparent material.

U.S. Pat. No. 6,242,149 describes a fast-curing photosensitive composition that is used in recording inks, materials encapsulated inside photocuring microcapsules for image recording, photosensitive coating compositions, and the like. The composition comprises a radical-polymerizable unsaturated compound, a photopolymerization initiator, and a thiol-containing compound, whereby the fast-curing photosensitive composition can be adequately cured with low exposure energy.

U.S. Patent Application having Publication No. 2010/0140850 teaches formulations usable in AM, which are colorless before curing or solidification, and which, when hardened, provide a material with a reduced yellow hue. This patent application teaches that UV curable acrylic-based compositions typically have a characteristic yellow hue, and that although the source of the yellow hue is not completely understood, it has been found that the photoinitiator type and concentration influence the resulting material color. This patent application suggests using a formulation that comprises, in addition to one or more (meth)acrylic materials and a photoinitiator, a sulfur-containing additive such as beta-mercaptopropionate, mercaptoacetate, and/or alkane thiols.

WO 2020/065654, by the present assignee, describes a system and method for fabricating objects with at least one model material that is maintained in a partially solidified or not solidified state throughout the additive manufacturing process. The system and method are such that the object solidifies in a dual stage hardening process, which may include partial solidification during the AM process to produce a green body object, followed by post (e.g., thermal) treatment at the end of the AM process to complete the solidifying process. This provisional patent application describes embodiments in which this process was utilized for providing transparent material, using a formulation for forming an outer layer, and a similar formulation which comprises reduced amount of photoinitiator(s) for forming an inner core.

PCT/IL2020/050396, filed Apr. 1, 2020, describes modeling material formulations that are usable in additive manufacturing such as 3D inkjet printing and which provide, when hardened, a transparent, colorless material, with a reduced or nullified yellow hue and improved transmittance. The disclosed formulations are photocurable formulations, are devoid of mono-functional aromatic curable materials, and of multi-functional materials that feature a Tg higher than the working temperatures of the AM process, e.g., higher than 80° C., and comprise a photoinitiator in a total amount of no more than 1% by weight of the total weight of the formulation. Some of the disclosed formulations may comprise a sulfur-containing compound such as a beta-mercaptopropionate, a mercaptoacetate, and an alkane thiol.

The use of light emitting diodes (LED) as a source for electromagnetic irradiation has recently become more and more common and desirable in many fields, including additive manufacturing processes such as those that utilize UV-curable materials. Most of the commercially available UV LED light sources emit UVA radiation, at the higher wavelengths of 365/395/405 nm. The use of such light sources poses severe limitations since photoinitiators that absorb shorter wavelength, such as, for example, those of the alpha-hydroxy ketone family that absorb at 250-300 nm, cannot be efficiently used. These photoinitiators are typically used for surface curing and the absence thereof adversely affect the process quality.

Current solutions to the limitations posed by the use of UV LED as an irradiation source include the use of hydrogen donors that promote surface curing, such as tertiary amines, thiols and polyethylene glycol-containing materials. However, the use of these materials, while facilitating AM that use UV LED, in accompanied by several drawbacks. For example, tertiary amines impart an increased yellow hue to the cured material; thiols are typically reactive towards UV-curable materials that are commonly used in AM, such as acrylic materials, and thus limit the shelf-lives of formulations containing same; and polyethylene glycol materials are amphiphilic materials that act also as plasticizers or elastomers and hence reduce mechanical stability and increase water absorption of the obtained object.

Additional background art includes WO 2009/013751; WO 2016/063282; WO 2016/125170; WO 2017/134672; WO 2017/134673; WO 2017/134674; WO 2017/134676; WO 2017/068590; WO 2017/187434; WO 2018/055521; and WO 2018/055522, all by the present assignee.

SUMMARY OF THE INVENTION

According to an aspect of some embodiments of the present invention, referred to herein as a first formulation aspect, there is provided a curable formulation comprising one or more curable materials, at least one thioether and optionally one or more non-curable materials.

According to some of any of the embodiments described herein for a first formulation aspect, a total amount of curable materials ranges from 85% to 95% by weight of the total weight of the formulation.

According to some of any of the embodiments described herein for a first formulation aspect, the formulation is a transparent formulation which provides, when hardened, a material that features light transmittance higher than 70% or higher than 75%.

According to some of any of the embodiments described herein for a first formulation aspect, the formulation is a photocurable formulation and further comprises a photoinitiator.

According to some of any of the embodiments described herein for a first formulation aspect, the formulation is a UV-curable formulation and further comprises a photoinitiator that is activated upon absorbing UV radiation.

According to some of any of the embodiments described herein for a first formulation aspect, the photoinitiator is activated upon absorbing light at a wavelength higher than 380 nm.

According to some of any of the embodiments described herein for a first formulation aspect, a total amount of the photoinitiator is no more than 3% or no more than 2.5%, or no more than 2%, by weight, of the total weight of the formulation.

According to some of any of the embodiments described herein for a first formulation aspect, the photoinitiator comprises, or consists of, a phosphine oxide-type photoinitiator.

According to some of any of the embodiments described herein for a first formulation aspect, the thioether comprises at least one, preferably at least two, hydrocarbon chain(s) of at least 8, at least 10 carbon atoms in length.

According to some of any of the embodiments described herein for a first formulation aspect, the at least one hydrocarbon chain is a saturated hydrocarbon chain.

According to some of any of the embodiments described herein for a first formulation aspect, the at least one hydrocarbon chain is a linear hydrocarbon chain.

According to some of any of the embodiments described herein for a first formulation aspect, the thioether is liquid at room temperature.

According to some of any of the embodiments described herein for a first formulation aspect, the thioether further comprises at least one carboxylate or thiocarboxylate group(s).

According to some of any of the embodiments described herein for a first formulation aspect, the thioether is represented by Formula A:

Formula A

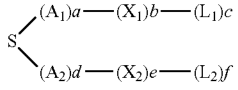

Wherein:

- a, b, c, d, e and f are each independently 0 or 1, provided that at least one of c and f is 1;
- $A_1$ and $A_2$ are each independently an alkylene chain, e.g., of 1 to 6 or from 1 to 4 carbon atoms in length;
- $X_1$ and $X_2$ are each independently a —$Y_1$—C(=$Y_2$)— group or a —C(=$Y_2$)—$Y_1$ group, wherein each of $Y_1$ and $Y_2$ is independently O or S; and
- $L_1$ and $L_2$ are each independently a hydrocarbon chain of at least 8 carbon.

According to some of any of the embodiments described herein for a first formulation aspect, a, b, c, d, e and f are each 1.

According to some of any of the embodiments described herein for a first formulation aspect, the thioether further comprises at least one curable group.

According to some of any of the embodiments described herein for a first formulation aspect, the curable is a photocurable group, e.g., a UV-curable group.

According to some of any of the embodiments described herein for a first formulation aspect, the thioether comprises at least one hydrocarbon chain being at least 8 carbon atoms in length, which is substituted or terminated by the curable group.

According to some of any of the embodiments described herein for a first formulation aspect, an amount of the thioether ranges from 1 to 7, or from 1 to 5, % by weight of the total weight of the formulation.

According to some of any of the embodiments described herein for a first formulation aspect, the one or more curable materials comprise one or more mono-functional curable materials and one or more multi-functional curable materials.

According to some of any of the embodiments described herein for a first formulation aspect, the one or more curable materials comprise at least one aliphatic or alicyclic mono-functional (meth)acrylate material featuring a molecular weight lower than 500 grams/mol, in a total amount of from 10 to 60, or from 40 to 60, % by weight of the total weight of the formulation.

According to some of any of the embodiments described herein for a first formulation aspect, the one or more curable materials comprise at least one aromatic mono-functional (meth)acrylate material, in a total amount of from 5 to 15%, or from 8% to 15%, by weight of the total weight of the formulation.

According to some of any of the embodiments described herein for a first formulation aspect, the formulation comprises at least one multi-functional (meth)acrylate material, in a total amount of from 30 to 60, or from 40 to 60, % by weight of the total weight of the formulation.

According to some of any of the embodiments described herein for a first formulation aspect, the curable materials comprise at least one multi-functional urethane acrylate that features a molecular weight higher than 1000 grams/mol.

According to some of any of the embodiments described herein for a first formulation aspect, the at least one multi-functional urethane acrylate that features a molecular weight higher than 1000 grams/mol comprises at least one multi-functional urethane acrylate that features, when hardened, Tg lower than 35° C., or lower than 20° C.

According to some of any of the embodiments described herein for a first formulation aspect, a total amount of the at least one multi-functional urethane acrylate that features a molecular weight higher than 1000 grams/mol ranges from 15 to 40, or from 15 to 35, or from 15 to 30, % by weight of the total weight of the formulation.

According to some of any of the embodiments described herein for a first formulation aspect, the curable materials comprise at least one multi-functional epoxy (meth)acrylate material.

According to some of any of the embodiments described herein for a first formulation aspect, the curable materials comprise at least one multi-functional (meth)acrylate featuring Tg higher than 100° C., higher than 150° C., or higher than 250° C.

According to some of any of the embodiments described herein for a first formulation aspect, an amount of the multi-functional (meth)acrylate featuring Tg higher than 100° C., higher than 150° C., or higher than 250° C. ranges from 3% to 15%, or from 5% to 15%, or from 5% to %, by weight of the total weight of the formulation.

According to some of any of the embodiments described herein for a first formulation aspect, the multi-functional (meth)acrylate featuring Tg higher than 100° C., higher than 150° C., or higher than 250° C. is an isocyanurate-containing material.

According to some of any of the embodiments described herein for a first formulation aspect, the multi-functional (meth)acrylate featuring Tg higher than 100° C., or higher than 150° C., or higher than 250° C. is an aliphatic or alicyclic material.

According to some of any of the embodiments described herein for a first formulation aspect, the multi-functional (meth)acrylate featuring Tg higher than 100° C., or higher than 150° C., or higher than 250° C., features a volume shrinkage lower than 15%.

According to some of any of the embodiments described herein for a first formulation aspect, the multi-functional (meth)acrylate featuring Tg higher than 100° C., or higher than 150° C., or higher than 250° C., features a molecular weight lower 550 grams/mol.

According to some of any of the embodiments described herein for a first formulation aspect, the formulation further comprises a surface active agent.

According to some of any of the embodiments described herein for a first formulation aspect, an amount of the surface active agent is lower than 0.05% by weight of the total weight of the formulation.

According to some of any of the embodiments described herein for a first formulation aspect, the surface active agent is a silicon-based surface active agent.

According to some of any of the embodiments described herein for a first formulation aspect, the surface active agent comprises a polyacrylic material.

According to some of any of the embodiments described herein for a first formulation aspect, the formulation further comprises a blue dye or pigment.

According to some of any of the embodiments described herein for a first formulation aspect, an amount of the blue dye or pigment is lower than $1 \cdot 10^{-4}$%, by weight, of the total weight of the formulation.

According to some of any of the embodiments described herein for a first formulation aspect, the formulation is devoid of a sulfur-containing thiol compound.

According to some of any of the embodiments described herein for a first formulation aspect, the sulfur-containing thiol compound is selected from a beta-mercaptopropionate, a mercaptoacetate, and an alkane thiol.

According to an aspect of some embodiments of the present invention there is provided a photocurable formulation comprising:

at least one photoinitiator in a total amount of no more than 3% or no more than 2%, by weight of the total weight of the formulation;

at least one mono-functional (meth)acrylate material featuring a molecular weight lower than 500 grams/mol, in a total amount of from 50 to 70% by weight of the total weight of the formulation;

at least two multi-functional (meth)acrylic materials, in a total amount of from 30 to 50% by weight of the total weight of the formulation, wherein at least one of the multi-functional (meth)acrylic materials featuring Tg higher than 100° C., or higher than 140° C. features a volume shrinkage lower than 15% and/or a high curing rate and/or comprises a cyanurate moiety, and at least one another of the multi-functional (meth)acrylic materials is an ethoxylated multifunctional (meth)acrylate material which features a medium-high viscosity, a molecular weight of above 1000 grams/mol, and Tg lower than 20° C., lower than 0° C., or lower than −20° C.

This aspect is also referred to herein as a second formulation aspect.

According to some of any of the embodiments described herein for a second formulation aspect, the formulation is a transparent formulation which provides, when hardened, a material that features light transmittance higher than 70% or higher than 75%.

According to some of any of the embodiments described herein for a second formulation aspect, the formulation is a photocurable formulation and further comprises a photoinitiator.

According to some of any of the embodiments described herein for a second formulation aspect, the formulation is a UV-curable formulation and further comprising a photoinitiator that is activated upon absorbing UV radiation.

According to some of any of the embodiments described herein for a second formulation aspect, an amount of the multi-functional (meth)acrylic material that features Tg higher than 100° C., higher than 140° C. or higher than 250° C., ranges from 1 to 5% by weight of the total weight of the formulation.

According to some of any of the embodiments described herein for a second formulation aspect, an amount of the ethoxylated multifunctional (meth)acrylate material which features a medium-high viscosity, and Tg lower than 20° C., lower than 0° C., or lower than −20° C. ranges from 3 to 10, or from 3 to 8, % by weight, of the total weight of the formulation.

According to some of any of the embodiments described herein for a second formulation aspect, the at least one mono-functional (meth)acrylate material comprises at least one aliphatic or alicyclic (non-aromatic) mono-functional (meth)acrylate material, in an amount of from 50 to 60% by weight of the total weight of the formulation; and at least one aromatic mono-functional (meth)acrylate material in an amount of from 5 to 10%, by weight, of the total weight of the formulation.

According to some of any of the embodiments described herein for a second formulation aspect, the multi-functional (meth)acrylate materials further comprise at least one multi-functional urethane acrylate that features a molecular weight higher than 1000 grams/mol.

According to some of any of the embodiments described herein for a second formulation aspect, the at least one multi-functional urethane acrylate that features a molecular weight higher than 1000 grams/mol comprises at least one multi-functional urethane acrylate that features, when hardened, Tg lower than 20° C.

According to some of any of the embodiments described herein for a second formulation aspect, a total amount of the at least one multi-functional urethane acrylate that features a molecular weight higher than 1000 grams/mol ranges from 10 to 20% by weight of the total weight of the formulation.

According to some of any of the embodiments described herein for a second formulation aspect, the multi-functional (meth)acrylate materials further comprise at least one multi-functional epoxy (meth)acrylate material.

According to some of any of the embodiments described herein for a second formulation aspect, the at least one multi-functional epoxy (meth)acrylate material is aromatic.

According to some of any of the embodiments described herein for a second formulation aspect, an amount of the at least one multi-functional epoxy (meth)acrylate material ranges from to 20% by weight of the total weight of the formulation.

According to some of any of the embodiments described herein for a second formulation aspect, the at least one photoinitiator is devoid of an alpha-substituted ketone-type photoinitiator.

According to some of any of the embodiments described herein for a second formulation aspect, the at least one photoinitiator comprises, or consists of, a phosphine oxide-type photoinitiator.

According to some of any of the embodiments described herein for a second formulation aspect, the phosphine oxide-type photoinitiator is activated by radiation at a wavelength of at least 380 nm.

According to some of any of the embodiments described herein for a second formulation aspect, the formulation further comprises a surface active agent.

According to some of any of the embodiments described herein for a second formulation aspect, an amount of the surface active agent is lower than 0.05% by weight of the total weight of the formulation.

According to some of any of the embodiments described herein for a second formulation aspect, the formulation further comprises a blue dye or pigment.

According to some of any of the embodiments described herein for a second formulation aspect, an amount of the blue dye or pigment is lower than $1 \cdot 10^{-4}$%, by weight, of the total weight of the formulation.

According to some of any of the embodiments described herein for a first and second formulation aspects, the formulation is usable in additive manufacturing of a three-dimensional object comprising, in at least a portion thereof, a transparent material.

According to some of any of the embodiments described herein for a first and second formulation aspects, the additive manufacturing is three-dimensional inkjet printing.

According to some of any of the embodiments described herein for a first and second formulation aspects, the additive manufacturing comprises exposure to UV irradiation from a LED source.

According to some of any of the embodiments described herein for a first and second formulation aspects, a relative UV dose emitted from the LED source is higher than 0.1 $J/cm^2$ per layer, e.g., as described herein.

According to some of any of the embodiments described herein, the additive manufacturing comprises dispensing a plurality of layers in a configured pattern, wherein for at least a portion of the layers, a thickness of each layer is lower than 20 micrometers, the photocurable formulation being as defined for any of the embodiments of the first formulation aspect.

According to some of any of the embodiments described herein, the additive manufacturing comprises dispensing a plurality of layers in a configured pattern, wherein for at least a portion of the layers, a thickness of each layer is higher than 25 or higher than 30 micrometers, the photocurable formulation being as defined for any of the embodiments of the second formulation aspect.

According to some of any of the embodiments described herein, the transparent material is characterized by at least one of: Transmittance of at least 70%; and Yellowness Index lower than 8, or lower than 6.

According to an aspect of some embodiments of the present invention there is provided a method of additive manufacturing a three-dimension object that comprises in at least a portion thereof a transparent material, the method comprising sequentially forming a plurality of layers in a configured pattern corresponding to the shape of the object, thereby forming the object, wherein the formation of each of at least a few of the layers comprises dispensing at least one formulation, and exposing the dispensed formulation to a curing condition to thereby form a cured modeling material, wherein the at least one formulation is the curable or photocurable formulation as defined in any of the embodiments described herein for a first or second formulation aspect.

According to some of any of the embodiments described herein, the curing condition comprises electromagnetic irradiation and the electromagnetic irradiation is from a LED source.

According to some of any of the embodiments described herein, the curing condition comprises UV irradiation.

According to some of any of the embodiments described herein, a dose of the UV irradiation is higher than 0.1 $J/cm^2$ per layer, e.g., as described herein.

According to some of any of the embodiments described herein, the formation of at least a few of the layers is at a layer thickness lower than 20 micrometers, and wherein the formulation is as defined in any of the embodiments of the first formulation aspect.

According to some of any of the embodiments described herein, the formation of at least a few of the layers is at a layer thickness higher than 25 or higher than 30 micrometers, and wherein the formulation is as defined in any of the embodiments of the second formulation aspect.

According to some of any of the embodiments described herein, the method further comprises, subsequent to exposing to the curing condition, exposing the object to a condition that promotes decomposition of a residual amount of the photoinitiator (photobleaching).

According to an aspect of some embodiments of the present invention there is provided an object comprising in at least a portion thereof a transparent material, obtainable by the method as described herein in any of the respective embodiments.

According to some of any of the embodiments described herein, the transparent material is characterized by at least one of: Transmittance of at least 70%; and Yellowness Index lower than 8, or lower than 6.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 1A-D are schematic illustrations of an additive manufacturing system according to some embodiments of the invention;

Figure 10:
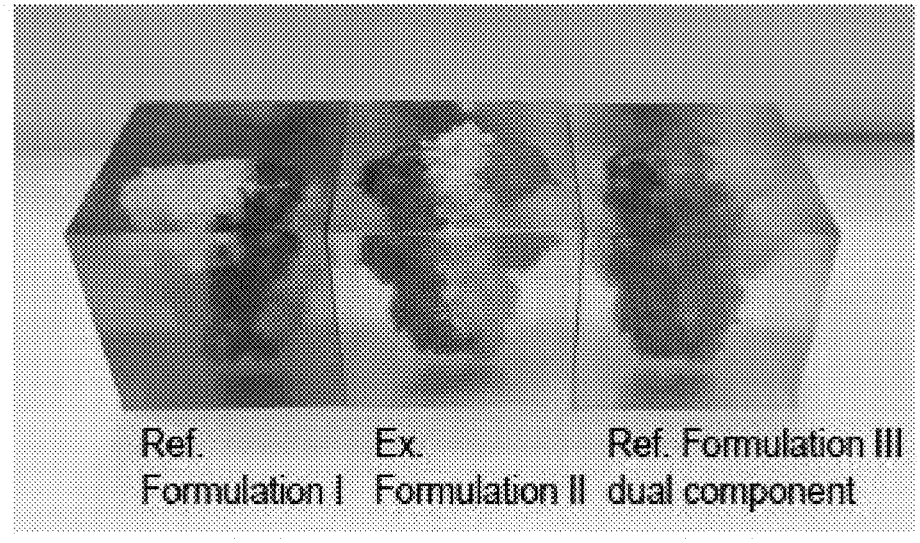
Figure 11:
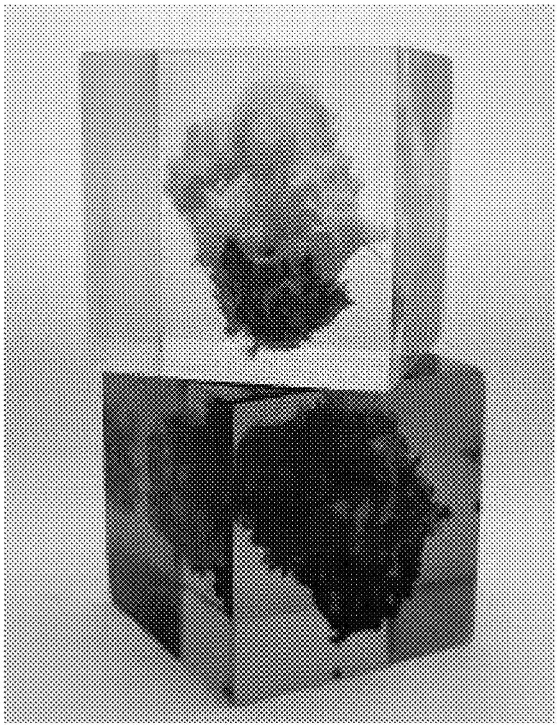

FIG. 10 presents a photograph of objects formed using Ref. Formulation I (left) Ref. Formulation III (right) and Ex. Formulation II (middle) in a system as described in FIG. 1A; and FIG. 11 presents a photograph of objects formed using Ref. Formulation I (bottom) and Ex. Formulation III (top) in a system as described in FIGS. 1B-D.

DESCRIPTION OF SPECIFIC EMBODIMENTS OF THE INVENTION

The present invention, in some embodiments thereof, relates to additive manufacturing and, more particularly, but not exclusively, to formulations usable in additive manufacturing of three-dimensional objects containing, in at least a portion thereof, a transparent material, and to additive manufacturing of three-dimensional objects using such formulations.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Embodiments of the present invention therefore relate to novel formulations and to additive manufacturing methods using same, which are usable for manufacturing three-dimensional objects using a transparent material as defined herein in at least a portion thereof.

Herein throughout, the term "object" describes a final product of the additive manufacturing. This term refers to the product obtained by a method as described herein, after removal of the support material, if such has been used as part of the uncured building material, and/or after post treatment (e.g., photobleaching such as described herein).

The term "object" as used herein throughout refers to a whole object or a part thereof.

Herein throughout, the phrase "cured modeling material" which is also referred to herein as "hardened" or solidified" modeling material describes the part of the building material that forms the object, as defined herein, upon exposing the dispensed building material to a curing condition (and optionally post-treatment), and, optionally, if a support material has been dispensed, removal of the cured support material, as described herein. The hardened modeling material can be a single hardened material or a mixture of two or more hardened materials, depending on the modeling material formulations used in the method, as described herein.

The phrases "cured modeling material", "hardened modeling material", "solidified modeling material" or "cured/hardened/solidified modeling material formulation" can be regarded as a cured building material wherein the building material consists only of a modeling material formulation (and not of a support material formulation). That is, this phrase refers to the portion of the building material, which is used to provide the final object.

Herein throughout, the phrase “modeling material formulation”, which is also referred to herein interchangeably as “modeling formulation”, “modeling material” “model material” or simply as “formulation”, describes a part or all of the uncured building material which is dispensed so as to form the object, as described herein. The modeling material formulation is an uncured modeling formulation (unless specifically indicated otherwise), which, upon exposure to a condition that effects curing, may form the object or a part thereof.

In some embodiments of the present invention, a modeling material formulation is formulated for use in three-dimensional inkjet printing and is able to form a three-dimensional object on its own, i.e., without having to be mixed or combined with any other substance.

An uncured building material can comprise one or more modeling material formulations, and can be dispensed such that different parts of the object are made, upon being hardened, of different cured modeling formulations, and hence are made of different hardened (e.g., cured) modeling materials or different mixtures of hardened (e.g., cured) modeling materials.

The final three-dimensional object is made of the modeling material or a combination of modeling materials or a combination of modeling material/s and support material/s or modification thereof (e.g., following curing). All these operations are well-known to those skilled in the art of solid freeform fabrication.

In some exemplary embodiments of the invention, an object is manufactured by dispensing a building material that comprises two or more different modeling material formulations, each modeling material formulation from a different dispensing head and/or nozzle of the inkjet printing apparatus. The modeling material formulations are optionally and preferably deposited in layers during the same pass of the printing heads. The modeling material formulations and/or combination of formulations within the layer are selected according to the desired properties of the object and according to the method parameters described herein.

An uncured building material can comprise one or more modeling formulations, and can be dispensed such that different parts of the model object are made upon curing different modeling formulations, and hence are made of different cured modeling materials or different mixtures of cured modeling materials, or mixtures of cured modeling and support materials.

Herein throughout, the phrase “hardened support material” is also referred to herein interchangeably as “cured support material” or simply as “support material” and describes the part of the building material that is intended to support the fabricated final object during the fabrication process, and which is removed once the process is completed and a hardened modeling material is obtained.

Herein throughout, the phrase “support material formulation”, which is also referred to herein interchangeably as “support formulation” or simply as “formulation”, describes a part of the uncured building material which is dispensed so as to form the support material, as described herein. The support material formulation is an uncured formulation. When a support material formulation is a curable formulation, it forms, upon exposure to a curing condition, a hardened support material.

Support materials, which can be either liquid materials or hardened, typically gel materials, are also referred to herein as sacrificial materials, which are removable after layers are dispensed and exposed to a curing energy, to thereby expose the shape of the final object.

Currently practiced support materials typically comprise a mixture of curable and non-curable materials, and are also referred to herein as gel support material.

Currently practiced support materials are typically water miscible, or water-dispersible or water-soluble.

Herein throughout, the term “water-miscible” describes a material which is at least partially dissolvable or dispersible in water, that is, at least 50% of the molecules move into the water upon mixing at room temperature, e.g., when mixed with water in equal volumes or weights, at room temperature. This term encompasses the terms “water-soluble” and “water dispersible”.

Herein throughout, the term “water-soluble” describes a material that when mixed with water in equal volumes or weights, at room temperature, a homogeneous solution is formed.

Herein throughout, the term “water-dispersible” describes a material that forms a homogeneous dispersion when mixed with water in equal volumes or weights, at room temperature.

Herein throughout, the phrase “dissolution rate” describes a rate at which a substance is dissolved in a liquid medium. Dissolution rate can be determined, in the context of the present embodiments, by the time needed to dissolve a certain amount of a support material. The measured time is referred to herein as “dissolution time”. Unless otherwise indicated, “dissolution time” is at room temperature.

The method and system of the present embodiments manufacture three-dimensional objects based on computer object data in a layerwise manner by forming a plurality of layers in a configured pattern corresponding to the shape of the objects. The computer object data can be in any known format, including, without limitation, a Standard Tessellation Language (STL) or a StereoLithography Contour (SLC) format, Virtual Reality Modeling Language (VRML), Additive Manufacturing File (AMF) format, Drawing Exchange Format (DXF), Polygon File Format (PLY) or any other format suitable for Computer-Aided Design (CAD).

Each layer is formed by additive manufacturing apparatus which scans a two-dimensional surface and patterns it. While scanning, the apparatus visits a plurality of target locations on the two-dimensional layer or surface, and decides, for each target location or a group of target locations, whether or not the target location or group of target locations is to be occupied by building material formulation, and which type of building material formulation is to be delivered thereto. The decision is made according to a computer image of the surface.

In preferred embodiments of the present invention the AM comprises three-dimensional printing, more preferably three-dimensional inkjet printing. In these embodiments a building material formulation is dispensed from a dispensing head having a set of nozzles to deposit building material formulation in layers on a supporting structure. The AM apparatus thus dispenses building material formulation in target locations which are to be occupied and leaves other target locations void. The apparatus typically includes a plurality of dispensing heads, each of which can be configured to dispense a different building material formulation. Thus, different target locations can be occupied by different building material formulations. The types of building material formulations can be categorized into two major categories: modeling material formulation and support material formulation. The support material formulation serves as a supporting matrix or construction for supporting the object or object parts during the fabrication process and/or other purposes, e.g., providing hollow or porous objects. Support constructions may additionally include modeling material formulation elements, e.g. for further support strength.

The final three-dimensional object is made of the modeling material or a combination of modeling materials or of modeling and support materials or modification thereof (e.g., following curing). All these operations are well-known to those skilled in the art of solid freeform fabrication.

In some exemplary embodiments of the invention an object is manufactured by dispensing one or more different modeling material formulations. When more than one modeling material formulation is used, each modeling material formulation is optionally and preferably dispensed from a different array of nozzles (belonging to the same or distinct dispensing heads) of the AM apparatus.

In some embodiments, the dispensing head of the AM apparatus is a multi-channel dispensing head, in which case different modeling material formulations can be dispensed from two or more arrays of nozzles that are located in the same multi-channels dispensing head. In some embodiments, arrays of nozzles that dispense different modeling material formulations are located in separate dispensing heads, for example, a first array of nozzles dispensing a first modeling material formulation is located in a first dispensing head, and a second array of nozzles dispensing a second modeling material formulation is located in a second dispensing head.

In some embodiments, an array of nozzles that dispense a modeling material formulation and an array of nozzles that dispense a support material formulation are both located in the same multi-channels dispensing head. In some embodiments, an array of nozzles that dispense a modeling material formulation and an array of nozzles that dispense a support material formulation are located in separate dispensing head heads.

The material formulations are optionally and preferably deposited in layers during the same pass of the printing heads. The material formulations and combination of material formulations within the layer are selected according to the desired properties of the object.

Figure 1A:
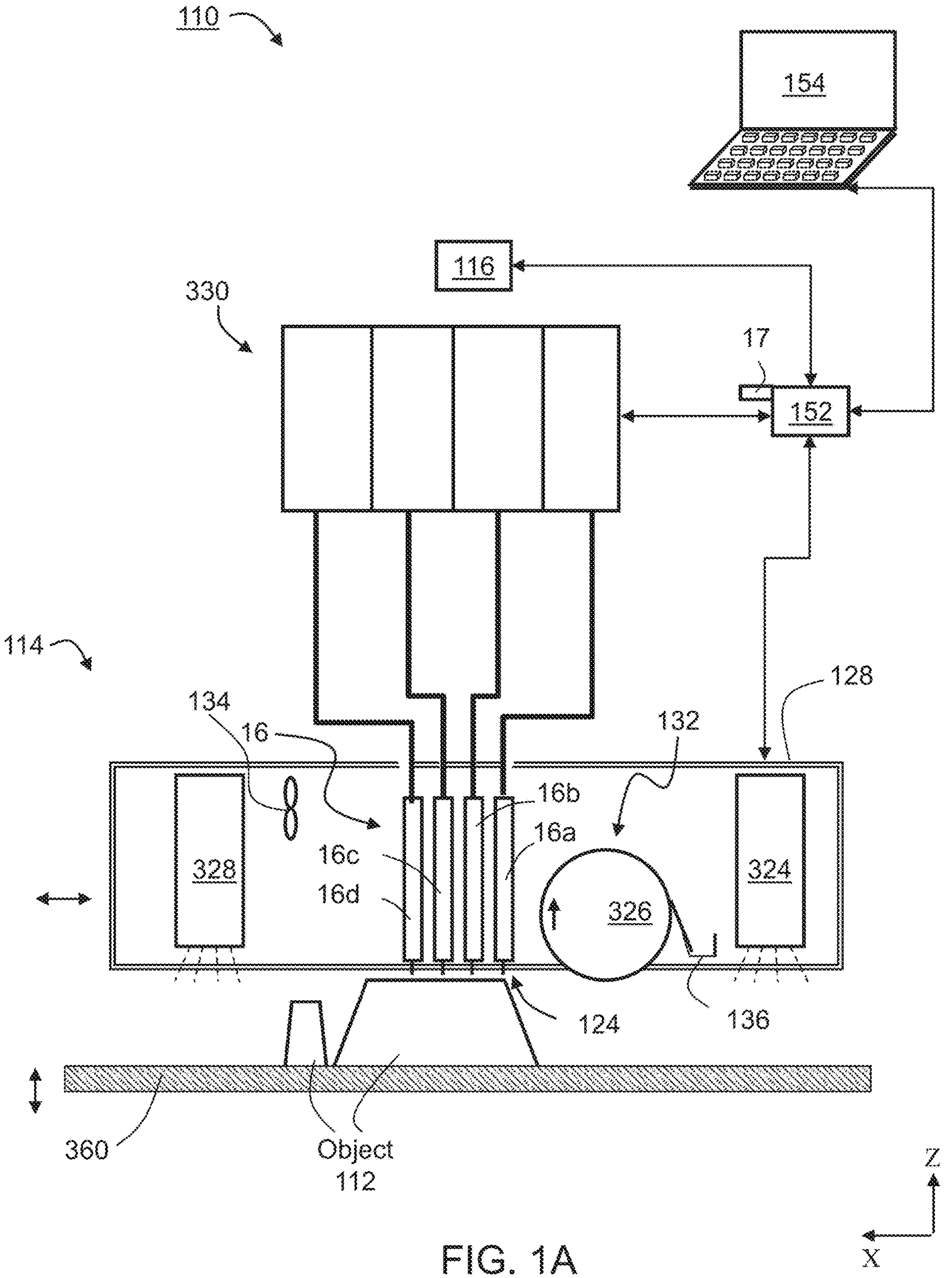
Figure 2A:
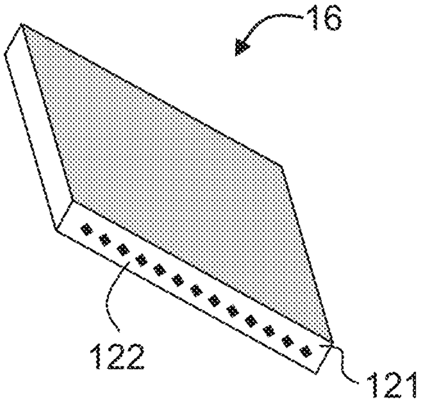
FIGS. 2A-2C are schematic illustrations of printing heads according to some embodiments of the present invention.
Figure 2B:
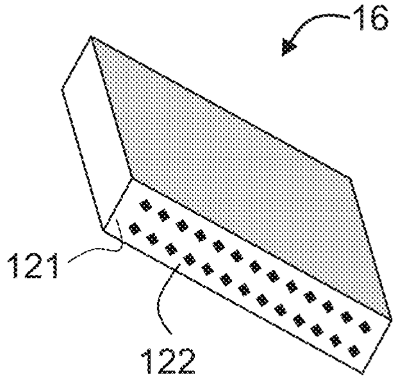
Figure 2C:
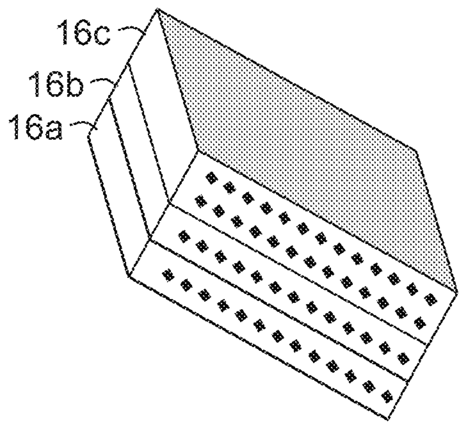

System:

A representative and non-limiting example of a system 110 suitable for AM of an object 112 according to some embodiments of the present invention is illustrated in FIG. 1A. System 110 comprises an additive manufacturing apparatus 114 having a dispensing unit 16 which comprises a plurality of printing heads. Each head preferably comprises one or more arrays of nozzles 122, typically mounted on an orifice plate 121, as illustrated in FIGS. 2A-C described below, through which a liquid building material formulation 124 is dispensed.

Preferably, but not obligatorily, apparatus 114 is a three-dimensional printing apparatus, in which case the printing heads are printing heads, and the building material formulation is dispensed via inkjet technology. This need not necessarily be the case, since, for some applications, it may not be necessary for the additive manufacturing apparatus to employ three-dimensional printing techniques. Representative examples of additive manufacturing apparatus contemplated according to various exemplary embodiments of the present invention include, without limitation, fused deposition modeling apparatus and fused material formulation deposition apparatus.

Each printing head is optionally and preferably fed via one or more building material formulation reservoirs which may optionally include a temperature control unit (e.g., a temperature sensor and/or a heating device), and a material formulation level sensor. To dispense the building material formulation, a voltage signal is applied to the printing heads to selectively deposit droplets of material formulation via the printing head nozzles, for example, as in piezoelectric inkjet printing technology. Another example includes thermal inkjet printing heads. In these types of heads, there are heater elements in thermal contact with the building material formulation, for heating the building material formulation to form gas bubbles therein, upon activation of the heater elements by a voltage signal. The gas bubbles generate pressures in the building material formulation, causing droplets of building material formulation to be ejected through the nozzles. Piezoelectric and thermal printing heads are known to those skilled in the art of solid freeform fabrication. For any types of inkjet printing heads, the dispensing rate of the head depends on the number of nozzles, the type of nozzles and the applied voltage signal rate (frequency).

Optionally, the overall number of dispensing nozzles or nozzle arrays is selected such that half of the dispensing nozzles are designated to dispense support material formulation and half of the dispensing nozzles are designated to dispense modeling material formulation, i.e. the number of nozzles jetting modeling material formulations is the same as the number of nozzles jetting support material formulation. In the representative example of FIG. 1A, four printing heads 16*a*, 16*b*, 16*c* and 16*d* are illustrated. Each of heads 16*a*, 16*b*, 16*c* and 16*d* has a nozzle array. In this Example, heads 16*a* and 16*b* can be designated for modeling material formulation/s and heads 16*c* and 16*d* can be designated for support material formulation. Thus, head 16*a* can dispense one modeling material formulation, head 16*b* can dispense another modeling material formulation and heads 16*c* and 16*d* can both dispense support material formulation. In an alternative embodiment, heads 16*c* and 16*d*, for example, may be combined in a single head having two nozzle arrays for depositing support material formulation. In a further alternative embodiment any one or more of the printing heads may have more than one nozzle arrays for depositing more than one material formulation, e.g. two nozzle arrays for depositing two different modeling material formulations or a modeling material formulation and a support material formulation, each formulation via a different array or number of nozzles.

Yet it is to be understood that it is not intended to limit the scope of the present invention and that the number of modeling material formulation printing heads (modeling heads) and the number of support material formulation printing heads (support heads) may differ. Generally, the number of arrays of nozzles that dispense modeling material formulation, the number of arrays of nozzles that dispense support material formulation, and the number of nozzles in each respective array are selected such as to provide a predetermined ratio, a, between the maximal dispensing rate of the support material formulation and the maximal dispensing rate of modeling material formulation. The value of the predetermined ratio, a, is preferably selected to ensure that in each formed layer, the height of modeling material formulation equals the height of support material formulation. Typical values for a are from about 0.6 to about 1.5.

As used herein throughout the term "about" refers to ±10%.

For example, for a=1, the overall dispensing rate of support material formulation is generally the same as the overall dispensing rate of the modeling material formulation when all the arrays of nozzles operate.

Apparatus 114 can comprise, for example, M modeling heads each having m arrays of p nozzles, and S support heads each having s arrays of q nozzles such that M×m×p=S×s×q. Each of the M×m modeling arrays and S×s support arrays can be manufactured as a separate physical unit, which can be assembled and disassembled from the group of arrays. In this embodiment, each such array optionally and preferably comprises a temperature control unit and a material formulation level sensor of its own, and receives an individually controlled voltage for its operation.

Apparatus 114 can further comprise a solidifying device 324 which can include any device configured to emit light, heat or the like that may cause the deposited material formulation to harden. For example, solidifying device 324 can comprise one or more radiation sources, which can be, for example, an ultraviolet or visible or infrared lamp, or other sources of electromagnetic radiation, or electron beam source, depending on the modeling material formulation being used. In some embodiments of the present invention, solidifying device 324 serves for curing or solidifying the modeling material formulation.

In addition to solidifying device 324, apparatus 114 optionally and preferably comprises an additional radiation source 328 for solvent evaporation. Radiation source 328 optionally and preferably generates infrared radiation. In various exemplary embodiments of the invention solidifying device 324 comprises a radiation source generating ultraviolet radiation, and radiation source 328 generates infrared radiation.

In some embodiments of the present invention apparatus 114 comprises cooling system 134 such as one or more fans or the like.

The printing head(s) and radiation source are preferably mounted in a frame or block 128 which is preferably operative to reciprocally move over a tray 360, which serves as the working surface. In some embodiments of the present invention the radiation sources are mounted in the block such that they follow in the wake of the printing heads to at least partially cure or solidify the material formulations just dispensed by the printing heads. Tray 360 is positioned horizontally. According to the common conventions an X-Y-Z Cartesian coordinate system is selected such that the X-Y plane is parallel to tray 360. Tray 360 is preferably configured to move vertically (along the Z direction), typically downward. In various exemplary embodiments of the invention, apparatus 114 further comprises one or more leveling devices 132, e.g. a roller 326. Leveling device 326 serves to straighten, level and/or establish a thickness of the newly formed layer prior to the formation of the successive layer thereon. Leveling device 326 preferably comprises a waste collection device 136 for collecting the excess material formulation generated during leveling. Waste collection device 136 may comprise any mechanism that delivers the material formulation to a waste tank or waste cartridge.

In use, the printing heads of unit 16 move in a scanning direction, which is referred to herein as the X direction, and selectively dispense building material formulation in a predetermined configuration in the course of their passage over tray 360. The building material formulation typically comprises one or more types of support material formulation and one or more types of modeling material formulation. The passage of the printing heads of unit 16 is followed by the curing of the modeling material formulation(s) by radiation source 126. In the reverse passage of the heads, back to their starting point for the layer just deposited, an additional dispensing of building material formulation may be carried out, according to predetermined configuration. In the forward and/or reverse passages of the printing heads, the layer thus formed may be straightened by leveling device 326, which preferably follows the path of the printing heads in their forward and/or reverse movement. Once the printing heads return to their starting point along the X direction, they may move to another position along an indexing direction, referred to herein as the Y direction, and continue to build the same layer by reciprocal movement along the X direction. Alternately, the printing heads may move in the Y direction between forward and reverse movements or after more than one forward-reverse movement. The series of scans performed by the printing heads to complete a single layer is referred to herein as a single scan cycle.

Once the layer is completed, tray 360 is lowered in the Z direction to a predetermined Z level, according to the desired thickness of the layer subsequently to be printed. The procedure is repeated to form three-dimensional object 112 in a layerwise manner.

In another embodiment, tray 360 may be displaced in the Z direction between forward and reverse passages of the printing head of unit 16, within the layer. Such Z displacement is carried out in order to cause contact of the leveling device with the surface in one direction and prevent contact in the other direction.

System 110 optionally and preferably comprises a building material formulation supply system 330 which comprises the building material formulation containers or cartridges and supplies a plurality of building material formulations to fabrication apparatus 114.

A control unit 152 controls fabrication apparatus 114 and optionally and preferably also supply system 330. Control unit 152 typically includes an electronic circuit configured to perform the controlling operations. Control unit 152 preferably communicates with a data processor 154 which transmits digital data pertaining to fabrication instructions based on computer object data, e.g., a CAD configuration represented on a computer readable medium in a form of a Standard Tessellation Language (STL) format or the like. Typically, control unit 152 controls the voltage applied to each printing head or each nozzle array and the temperature of the building material formulation in the respective printing head or respective nozzle array.

Once the manufacturing data is loaded to control unit 152 it can operate without user intervention. In some embodiments, control unit 152 receives additional input from the operator, e.g., using data processor 154 or using a user interface 116 communicating with unit 152. User interface 116 can be of any type known in the art, such as, but not limited to, a keyboard, a touch screen and the like. For example, control unit 152 can receive, as additional input, one or more building material formulation types and/or attributes, such as, but not limited to, color, characteristic distortion and/or transition temperature, viscosity, electrical property, magnetic property. Other attributes and groups of attributes are also contemplated.

Figure 1B:
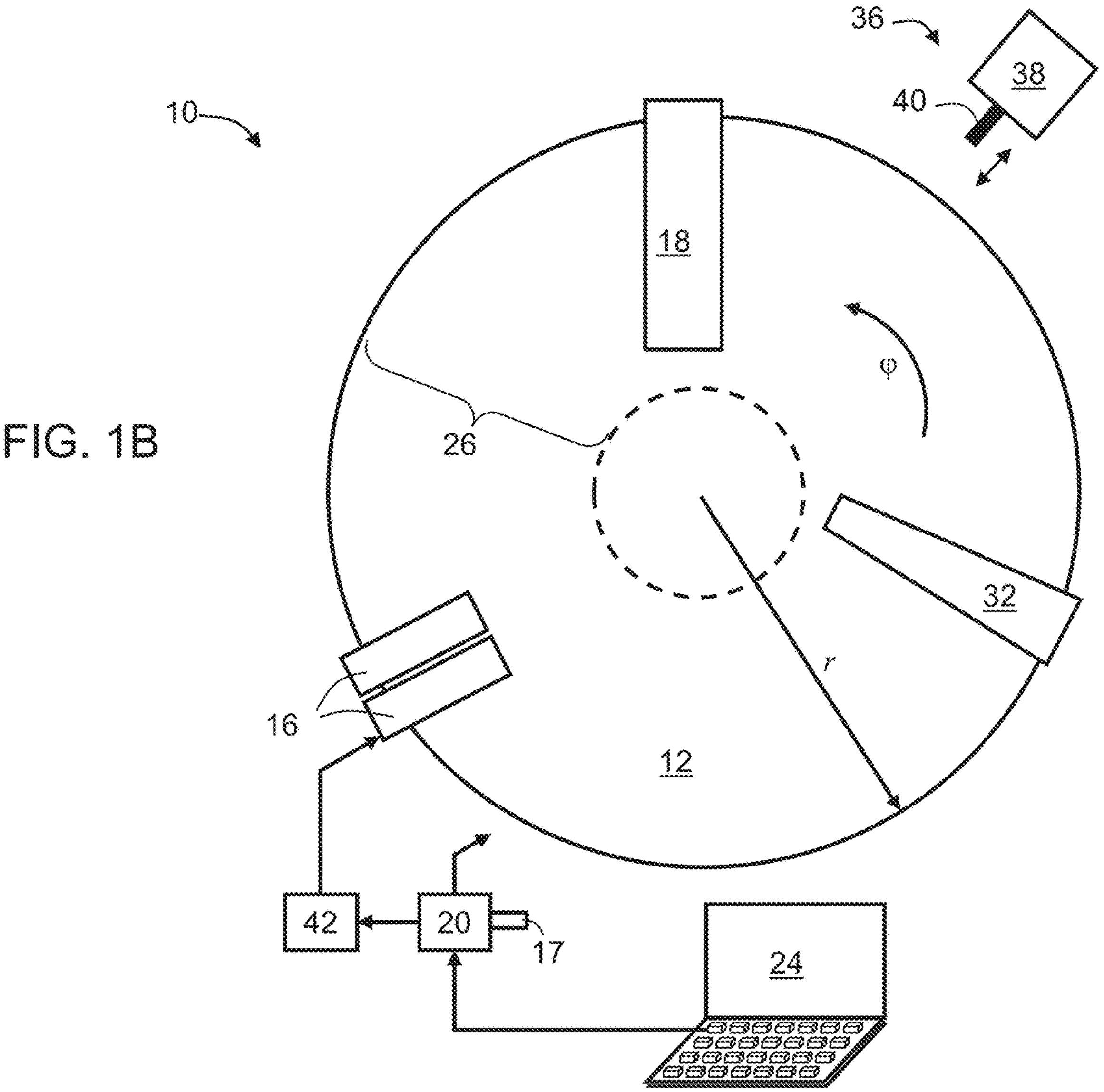
Figure 1C:
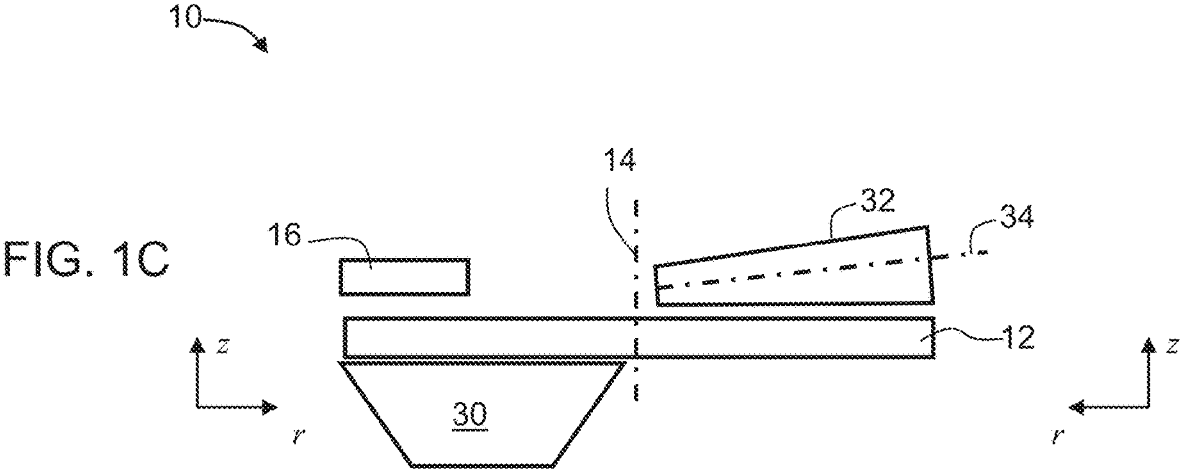
Figure 1D:
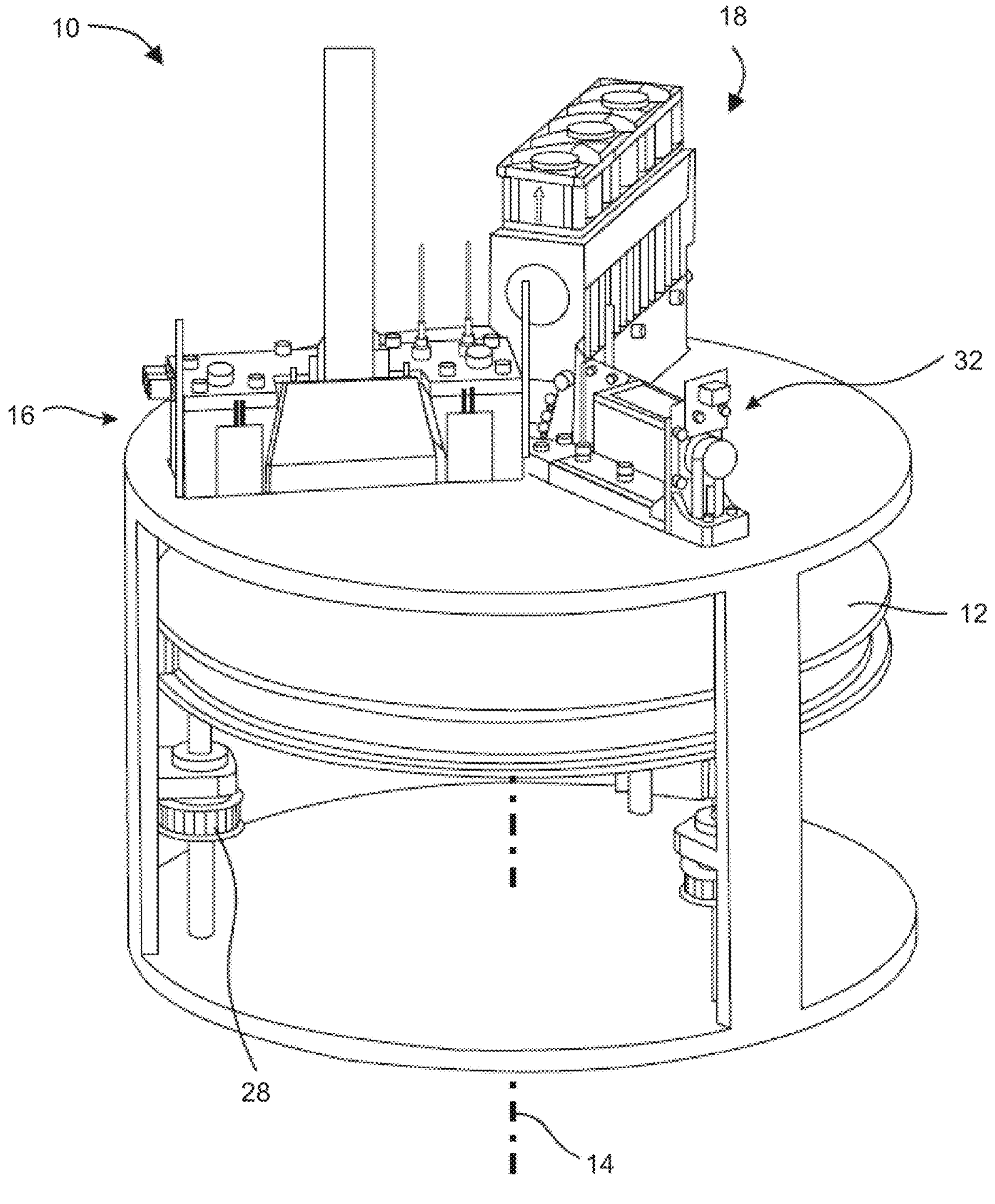

Another representative and non-limiting example of a system 10 suitable for AM of an object according to some embodiments of the present invention is illustrated in FIGS. 1B-D. FIGS. 1B-D illustrate a top view (FIG. 1B), a side view (FIG. 1C) and an isometric view (FIG. 1D) of system 10.

In the present embodiments, system 10 comprises a tray 12 and a plurality of inkjet printing heads 16, each having one or more arrays of nozzles with respective one or more pluralities of separated nozzles. The material used for the three-dimensional printing is supplied to heads 16 by a building material supply system 42. Tray 12 can have a shape of a disk or it can be annular. Non-round shapes are also contemplated, provided they can be rotated about a vertical axis.

Tray 12 and heads 16 are optionally and preferably mounted such as to allow a relative rotary motion between tray 12 and heads 16. This can be achieved by (i) configuring tray 12 to rotate about a vertical axis 14 relative to heads 16, (ii) configuring heads 16 to rotate about vertical axis 14 relative to tray 12, or (iii) configuring both tray 12 and heads 16 to rotate about vertical axis 14 but at different rotation velocities (e.g., rotation at opposite direction). While some embodiments of system 10 are described below with a particular emphasis to configuration (i) wherein the tray is a rotary tray that is configured to rotate about vertical axis 14 relative to heads 16, it is to be understood that the present application contemplates also configurations (ii) and (iii) for system 10. Any one of the embodiments of system 10 described herein can be adjusted to be applicable to any of configurations (ii) and (iii), and one of ordinary skills in the art, provided with the details described herein, would know how to make such adjustment.

In the following description, a direction parallel to tray 12 and pointing outwardly from axis 14 is referred to as the radial direction r, a direction parallel to tray 12 and perpendicular to the radial direction r is referred to herein as the azimuthal direction φ, and a direction perpendicular to tray 12 is referred to herein is the vertical direction z.

The radial direction r in system 10 enacts the indexing direction y in system 110, and the azimuthal direction φ enacts the scanning direction x in system 110. Therefore, the radial direction is interchangeably referred to herein as the indexing direction, and the azimuthal direction is interchangeably referred to herein as the scanning direction.

The term "radial position," as used herein, refers to a position on or above tray 12 at a specific distance from axis 14. When the term is used in connection to a printing head, the term refers to a position of the head which is at specific distance from axis 14. When the term is used in connection to a point on tray 12, the term corresponds to any point that belongs to a locus of points that is a circle whose radius is the specific distance from axis 14 and whose center is at axis 14.

The term "azimuthal position," as used herein, refers to a position on or above tray 12 at a specific azimuthal angle relative to a predetermined reference point. Thus, radial position refers to any point that belongs to a locus of points that is a straight line forming the specific azimuthal angle relative to the reference point.

The term "vertical position," as used herein, refers to a position over a plane that intersect the vertical axis 14 at a specific point.

Tray 12 serves as a building platform for three-dimensional printing. The working area on which one or objects are printed is typically, but not necessarily, smaller than the total area of tray 12. In some embodiments of the present invention the working area is annular. The working area is shown at 26. In some embodiments of the present invention tray 12 rotates continuously in the same direction throughout the formation of object, and in some embodiments of the present invention tray reverses the direction of rotation at least once (e.g., in an oscillatory manner) during the formation of the object. Tray 12 is optionally and preferably removable. Removing tray 12 can be for maintenance of system 10, or, if desired, for replacing the tray before printing a new object. In some embodiments of the present invention system 10 is provided with one or more different replacement trays (e.g., a kit of replacement trays), wherein two or more trays are designated for different types of objects (e.g., different weights) different operation modes (e.g., different rotation speeds), etc. The replacement of tray 12 can be manual or automatic, as desired. When automatic replacement is employed, system 10 comprises a tray replacement device 36 configured for removing tray 12 from its position below heads 16 and replacing it by a replacement tray (not shown). In the representative illustration of FIG. 1B tray replacement device 36 is illustrated as a drive 38 with a movable arm 40 configured to pull tray 12, but other types of tray replacement devices are also contemplated.

Exemplified embodiments for the printing head 16 are illustrated in FIGS. 2A-2C. These embodiments can be employed for any of the AM systems described above, including, without limitation, system 110 and system 10.

FIGS. 2A-B illustrate a printing head 16 with one (FIG. 2A) and two (FIG. 2B) nozzle arrays 22. The nozzles in the array are preferably aligned linearly, along a straight line. In embodiments in which a particular printing head has two or more linear nozzle arrays, the nozzle arrays are optionally and preferably can be parallel to each other. When a printing head has two or more arrays of nozzles (e.g., FIG. 2B) all arrays of the head can be fed with the same building material formulation, or at least two arrays of the same head can be fed with different building material formulations.

When a system similar to system 110 is employed, all printing heads 16 are optionally and preferably oriented along the indexing direction with their positions along the scanning direction being offset to one another.

When a system similar to system 10 is employed, all printing heads 16 are optionally and preferably oriented radially (parallel to the radial direction) with their azimuthal positions being offset to one another. Thus, in these embodiments, the nozzle arrays of different printing heads are not parallel to each other but are rather at an angle to each other, which angle being approximately equal to the azimuthal offset between the respective heads. For example, one head can be oriented radially and positioned at azimuthal position $\varphi_1$, and another head can be oriented radially and positioned at azimuthal position $\varphi_2$. In this example, the azimuthal offset between the two heads is $\varphi_1$-$\varphi_2$, and the angle between the linear nozzle arrays of the two heads is also $\varphi_1$-$\varphi_2$.

In some embodiments, two or more printing heads can be assembled to a block of printing heads, in which case the printing heads of the block are typically parallel to each other. A block including several inkjet printing heads 16*a*, 16*b*, 16*c* is illustrated in FIG. 2C.

In some embodiments, system 10 comprises a stabilizing structure 30 positioned below heads 16 such that tray 12 is between stabilizing structure 30 and heads 16. Stabilizing structure may serve for preventing or reducing vibrations of tray 12 that may occur while inkjet printing heads 16 operate. In configurations in which printing heads 16 rotate about axis 14, stabilizing structure 30 preferably also rotates such that stabilizing structure 30 is always directly below heads 16 (with tray 12 between heads 16 and tray 12).

Tray 12 and/or printing heads 16 is optionally and preferably configured to move along the vertical direction z, parallel to vertical axis 14 so as to vary the vertical distance between tray 12 and printing heads 16. In configurations in which the vertical distance is varied by moving tray 12 along the vertical direction, stabilizing structure 30 preferably also moves vertically together with tray 12. In configurations in which the vertical distance is varied by heads 16 along the vertical direction, while maintaining the vertical position of tray 12 fixed, stabilizing structure 30 is also maintained at a fixed vertical position.

The vertical motion can be established by a vertical drive 28. Once a layer is completed, the vertical distance between tray 12 and heads 16 can be increased (e.g., tray 12 is lowered relative to heads 16) by a predetermined vertical step, according to the desired thickness of the layer subsequently to be printed. The procedure is repeated to form a three-dimensional object in a layerwise manner.

The operation of inkjet printing heads 16 and optionally and preferably also of one or more other components of system 10, e.g., the motion of tray 12, are controlled by a controller 20. The controller can have an electronic circuit and a non-volatile memory medium readable by the circuit, wherein the memory medium stores program instructions which, when read by the circuit, cause the circuit to perform control operations as further detailed below.

Controller 20 can also communicate with a host computer 24 which transmits digital data pertaining to fabrication instructions based on computer object data, e.g., in a form of a Standard Tessellation Language (STL) or a StereoLithography Contour (SLC) format, Virtual Reality Modeling Language (VRML), Additive Manufacturing File (AMF) format, Drawing Exchange Format (DXF), Polygon File Format (PLY) or any other format suitable for Computer-Aided Design (CAD). The object data formats are typically structured according to a Cartesian system of coordinates. In these cases, computer 24 preferably executes a procedure for transforming the coordinates of each slice in the computer object data from a Cartesian system of coordinates into a polar system of coordinates. Computer 24 optionally and preferably transmits the fabrication instructions in terms of the transformed system of coordinates. Alternatively, computer 24 can transmit the fabrication instructions in terms of the original system of coordinates as provided by the computer object data, in which case the transformation of coordinates is executed by the circuit of controller 20.

The transformation of coordinates allows three-dimensional printing over a rotating tray. In non-rotary systems with a stationary tray with the printing heads typically reciprocally move above the stationary tray along straight lines. In such systems, the printing resolution is the same at any point over the tray, provided the dispensing rates of the heads are uniform. In system 10, unlike non-rotary systems, not all the nozzles of the head points cover the same distance over tray 12 during at the same time. The transformation of coordinates is optionally and preferably executed so as to ensure equal amounts of excess material formulation at different radial positions.

Figure 3A:
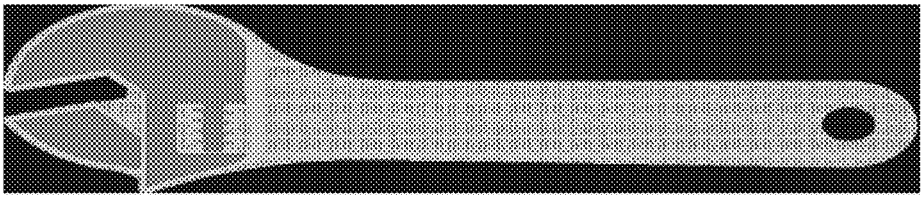
FIGS. 3A and 3B are schematic illustrations demonstrating coordinate transformations according to some embodiments of the present invention.
Figure 3B:
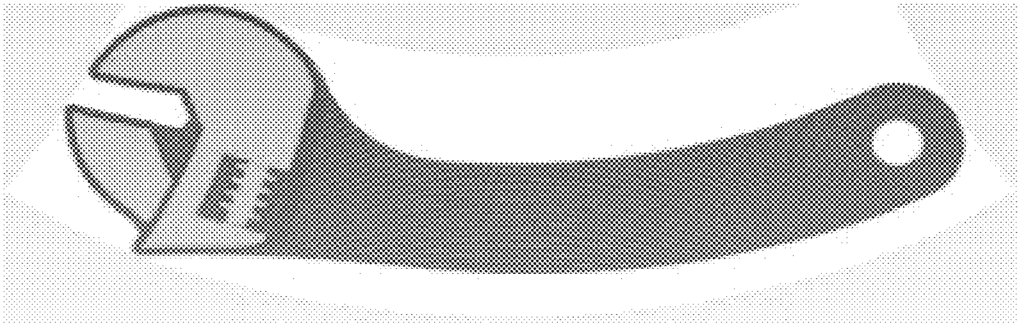

Representative examples of coordinate transformations according to some embodiments of the present invention are provided in FIGS. 3A-B, showing three slices of an object (each slice corresponds to fabrication instructions of a different layer of the objects), where FIG. 3A illustrates a slice in a Cartesian system of coordinates and FIG. 3B illustrates the same slice following an application of a transformation of coordinates procedure to the respective slice.

Typically, controller 20 controls the voltage applied to the respective component of the system 10 based on the fabrication instructions and based on the stored program instructions as described below.

Generally, controller 20 controls printing heads 16 to dispense, during the rotation of tray 12, droplets of building material formulation in layers, such as to print a three-dimensional object on tray 12.

System 10 optionally and preferably comprises one or more radiation sources 18, which can be, for example, an ultraviolet or visible or infrared lamp, or other sources of electromagnetic radiation, or electron beam source, depending on the modeling material formulation being used. Radiation source can include any type of radiation emitting device, including, without limitation, light emitting diode (LED), digital light processing (DLP) system, resistive lamp and the like. Radiation source 18 serves for curing or solidifying the modeling material formulation. In various exemplary embodiments of the invention the operation of radiation source 18 is controlled by controller 20 which may activate and deactivate radiation source 18 and may optionally also control the amount of radiation generated by radiation source 18.

In some embodiments of the invention, system 10 further comprises one or more leveling devices 32 which can be manufactured as a roller or a blade. Leveling device 32 serves to straighten the newly formed layer prior to the formation of the successive layer thereon. In some embodiments, leveling device 32 has the shape of a conical roller positioned such that its symmetry axis 34 is tilted relative to the surface of tray 12 and its surface is parallel to the surface of the tray. This embodiment is illustrated in the side view of system 10 (FIG. 1C).

The conical roller can have the shape of a cone or a conical frustum.

The opening angle of the conical roller is preferably selected such that there is a constant ratio between the radius of the cone at any location along its axis 34 and the distance between that location and axis 14. This embodiment allows roller 32 to efficiently level the layers, since while the roller rotates, any point p on the surface of the roller has a linear velocity which is proportional (e.g., the same) to the linear velocity of the tray at a point vertically beneath point p. In some embodiments, the roller has a shape of a conical frustum having a height h, a radius $R_1$ at its closest distance from axis 14, and a radius $R_2$ at its farthest distance from axis 14, wherein the parameters h, $R_1$ and $R_2$ satisfy the relation $R_1/R_2=(R-h)/h$ and wherein R is the farthest distance of the roller from axis 14 (for example, R can be the radius of tray 12).

The operation of leveling device 32 is optionally and preferably controlled by controller 20 which may activate and deactivate leveling device 32 and may optionally also control its position along a vertical direction (parallel to axis 14) and/or a radial direction (parallel to tray 12 and pointing toward or away from axis 14.

In some embodiments of the present invention printing heads 16 are configured to reciprocally move relative to tray along the radial direction r. These embodiments are useful when the lengths of the nozzle arrays 22 of heads 16 are shorter than the width along the radial direction of the working area 26 on tray 12. The motion of heads 16 along the radial direction is optionally and preferably controlled by controller 20.

Method:

According to an aspect of some embodiments of the present invention there is provided a method of additive manufacturing of a three-dimensional object, as described herein. The method of the present embodiments is usable for manufacturing an object having, in at least a portion thereof, a transparent material, as defined herein.

The method is generally effected by sequentially forming a plurality of layers in a configured pattern corresponding to the shape of the object, such that formation of each of at least a few of said layers, or of each of said layers, comprises dispensing a building material (uncured) which comprises one or more modeling material formulation(s), and exposing the dispensed modeling material to a curing condition, preferably a curing energy (e.g., irradiation) to thereby form a cured modeling material, as described in further detail hereinafter.

In some exemplary embodiments of the invention an object is manufactured by dispensing a building material (uncured) that comprises two or more different modeling material formulations, for example, as described hereinbelow. In some of these embodiments, each modeling material formulation is dispensed from a different array of nozzles belonging to the same or distinct dispensing heads of the inkjet printing apparatus, as described herein.

In some embodiments, two or more such arrays of nozzles that dispense different modeling material formulations are both located in the same printing head of the AM apparatus (i.e. multi-channels printing head). In some embodiments, arrays of nozzles that dispense different modeling material formulations are located in separate printing heads, for example, a first array of nozzles dispensing a first modeling material formulation is located in a first printing head, and a second array of nozzles dispensing a second modeling material formulation is located in a second printing head.

In some embodiments, an array of nozzles that dispense a modeling material formulation and an array of nozzles that dispense a support material formulation are both located in the same printing head. In some embodiments, an array of nozzles that dispense a modeling material formulation and an array of nozzles that dispense a support material formulation are located in separate printing heads.

The modeling material formulations are optionally and preferably deposited in layers during the same pass of the printing heads. The modeling material formulations and/or combination of formulations within the layer are selected according to the desired properties of the object, and as further described in detail hereinbelow. Such a mode of operation is also referred to herein as “multi-material”.

The phrase “digital materials”, as used herein and in the art, describes a combination of two or more materials on a microscopic scale or voxel level such that the printed zones of a specific material are at the level of few voxels, or at a level of a voxel block. Such digital materials may exhibit new properties that are affected by the selection of types of materials and/or the ratio and relative spatial distribution of two or more materials.

In exemplary digital materials, the modeling material of each voxel or voxel block, obtained upon curing, is independent of the modeling material of a neighboring voxel or voxel block, obtained upon curing, such that each voxel or voxel block may result in a different model material and the new properties of the whole part are a result of a spatial combination, on the voxel level, of several different model materials.

The phrase “digital material formulations”, as used herein and in the art, describes a combination of two or more material formulations on a pixel level or voxel level such that pixels or voxels of different material formulations are interlaced with one another over a region. Such digital material formulations may exhibit new properties that are affected by the selection of types of material formulations and/or the ratio and relative spatial distribution of two or more material formulations.

As used herein, a “voxel” of a layer refers to a physical three-dimensional elementary volume within the layer that corresponds to a single pixel of a bitmap describing the layer. The size of a voxel is approximately the size of a region that is formed by a building material, once the building material is dispensed at a location corresponding to the respective pixel, leveled, and solidified.

Herein throughout, whenever the expression “at the voxel level” is used in the context of a different material and/or properties, it is meant to include differences between voxel blocks, as well as differences between voxels or groups of few voxels. In preferred embodiments, the properties of the whole part are a result of a spatial combination, on the voxel block level, of several different model materials.

In some of any of the embodiments of the present invention, once a layer is dispensed as described herein, exposure to a curing condition (e.g., curing energy) as described herein is effected. In some embodiments, the curable materials are photocurable material, preferably UV-curable materials, and the curing condition is such that a radiation source emits UV radiation.

In some of any of the embodiments described herein, the UV irradiation is from a LED source, as described herein.

In some of any of the embodiments described herein, the curing condition comprises electromagnetic irradiation and said electromagnetic irradiation is from a LED source.

In some of any of the embodiments described herein, the curing condition comprises UV irradiation.

In some of any of the embodiments described herein, a dose of the UV irradiation is higher than 0.1 $J/cm^2$ per layer, e.g., as described herein.

In some of any of the embodiments described herein, the formation of at least a few of said layers is at a layer thickness lower than 20 micrometers, and the formulation is as defined herein as encompassing Ex. Formulations I, II and III. In some of these embodiments, the method is executed using a system as described in FIGS. 1B-D, and a LED source for curing.

In some of any of the embodiments described herein, the formation of at least a few of said layers is at a layer thickness higher than 25 or higher than 30 micrometers, and the formulation is as defined herein as encompassing Ex. Formulation IV. In some of these embodiments, the method is executed using a system as described in FIG. 1A, and a LED source for curing.

In some embodiments, where the building material comprises also support material formulation(s), the method proceeds to removing the hardened support material (e.g., thereby exposing the adjacent hardened modeling material). This can be performed by mechanical and/or chemical means, as would be recognized by any person skilled in the art. A portion of the support material may optionally remain upon removal, for example, within a hardened mixed layer, as described herein.

In some embodiments, removal of hardened support material reveals a hardened mixed layer, comprising a hardened mixture of support material and modeling material formulation. Such a hardened mixture at a surface of an object may optionally have a relatively non-reflective appearance, also referred to herein as “matte”; whereas surfaces lacking such a hardened mixture (e.g., wherein support material formulation was not applied thereon) are described as “glossy” in comparison.

In some of any of the embodiments described herein, the method further comprises exposing the cured modeling material, either before or after (preferably after) removal of a support material, if such has been included in the building material, to a post-treatment condition.

In some of any of the embodiments described herein, the post-treatment is or comprises (e.g., in addition to heating and/or irradiating) exposing the object to a condition that promotes decomposition of a residual amount of the photoinitiator (also referred to herein and in the art as photobleaching).

In some embodiments, the photobleaching is as described in Example 4 hereinafter.

Formulations:

According to some of any of the embodiments described herein, a modeling material formulation as described herein comprises one or more curable materials, and is also referred to herein as curable formulations. A curable formulation is characterized in that its viscosity (e.g., at room temperature) increases, upon exposure to a curing condition as described herein, by at least 2-folds, preferably by at least 5-folds, and more preferably by at least one order of magnitude.

Herein throughout, a "curable material", which is also referred to herein as a "solidifiable material" is a compound (e.g., monomeric or oligomeric or polymeric compound) which, when exposed to a curing condition (e.g., curing energy), as described herein, solidifies or hardens to form a cured modeling material as defined herein. Curable materials are typically polymerizable materials, which undergo polymerization and/or cross-linking when exposed to a suitable curing condition, typically a suitable energy source. A curable or solidifiable material is typically such that its viscosity increases by at least one order of magnitude when it is exposed to a curing condition.

In some of any of the embodiments described herein, a curable material can be a monomer, an oligomer or a short-chain polymer, each being polymerizable and/or cross-linkable as described herein.

In some of any of the embodiments described herein, when a curable material is exposed to a curing condition (e.g., curing energy such as, for example, radiation), it polymerizes by any one, or combination, of chain elongation and cross-linking.

In some of any of the embodiments described herein, a curable material is a monomer or a mixture of monomers which can form a polymeric modeling material upon a polymerization reaction, when exposed to a curing condition at which the polymerization reaction occurs. Such curable materials are also referred to herein as monomeric curable materials.

In some of any of the embodiments described herein, a curable material is an oligomer or a mixture of oligomers which can form a polymeric modeling material upon a polymerization reaction, when exposed to a curing condition at which the polymerization reaction occurs. Such curable materials are also referred to herein as oligomeric curable materials.

In some of any of the embodiments described herein, a curable material, whether monomeric or oligomeric, can be a mono-functional curable material or a multi-functional curable material.

Herein, a mono-functional curable material comprises one functional group that can undergo polymerization when exposed to a curing condition (e.g., curing energy).

A multi-functional curable material comprises two or more, e.g., 2, 3, 4 or more, functional groups that can undergo polymerization when exposed to a curing condition. Multi-functional curable materials can be, for example, di-functional, tri-functional or tetra-functional curable materials, which comprise 2, 3 or 4 groups that can undergo polymerization, respectively. The two or more functional groups in a multi-functional curable material are typically linked to one another by a linking moiety, as defined herein. When the linking moiety is an oligomeric moiety, the multi-functional group is an oligomeric multi-functional curable material.

Exemplary curable materials that are commonly used in additive manufacturing and in some of the present embodiments are acrylic materials.

Herein throughout, the term "acrylic materials" collectively encompasses materials bearing one or more acrylate, methacrylate, acrylamide and/or methacrylamide group(s).

The term "(meth)acrylate" and grammatical diversions thereof encompasses materials bearing one or more acrylate and/or methacrylate group(s).

The curable materials included in the formulations described herein may be defined by the properties of the materials before hardening, when appropriate. Such properties include, for example, molecular weight (MW), functionality (e.g., mono-functional or multi-functional), and viscosity The curable materials included in the formulations described herein are otherwise defined by the properties provided by each material, when hardened. That is, the materials may be defined, when appropriate, by properties of a material formed upon exposure to a curing condition, for example, upon polymerization. These properties (e.g., Tg, HDT), are of a polymeric material formed upon curing any of the described curable materials alone.

As used herein, the term "curing" or "hardening" describes a process in which a formulation is hardened. This term encompasses polymerization of monomer(s) and/or oligomer(s) and/or cross-linking of polymeric chains (either of a polymer present before curing or of a polymeric material formed in a polymerization of the monomers or oligomers). The product of a curing reaction or of a hardening is therefore typically a polymeric material and in some cases a cross-linked polymeric material.

A "rate of hardening" as used herein represents the rate at which curing is effected, that is, the extent at which curable materials underwent polymerization and/or cross-linking in/within a given time period (for example, one minute). When a curable material is a polymerizable material, this phrase encompasses both a mol % of the curable materials in a formulation that underwent polymerization and/or cross-linking at the given time period, upon exposure to a curing condition; and/or the degree at which polymerization and/or cross-linking was effected, for example, the degree of chain elongation and/or cross-linking, at a given time period. Determining a rate of polymerization can be performed by methods known to those skilled in the art.

A "rate of hardening" can alternatively be represented by a degree at which a viscosity of a formulation charges at a given time period, that is, the rate at which the viscosity of a formulation increases upon exposure to curing condition.

Herein, the phrase "a condition that affects curing" or "a condition for inducing curing", which is also referred to herein interchangeably as "curing condition" or "curing inducing condition" describes a condition which, when applied to a formulation that contains a curable material, induces at least partial polymerization of monomer(s) and/or oligomer(s) and/or cross-linking of polymeric chains. Such a condition can include, for example, application of a curing energy, as described hereinafter, to the curable material(s), and/or contacting the curable material(s) with chemically reactive components such as catalysts, co-catalysts, and activators.

When a condition that induces curing comprises application of a curing energy, the phrase "exposing to a curing condition" means that the dispensed layers, preferably each of the dispensed layers, is/are exposed to the curing energy and the exposure is typically performed by applying a curing energy to (e.g., each of) the dispensed layers.

A "curing energy" typically includes application of radiation or application of heat.

The radiation can be electromagnetic radiation (e.g., ultraviolet or visible light), or electron beam radiation, or ultrasound radiation or microwave radiation, depending on the materials to be cured. The application of radiation (or irradiation) is effected by a suitable radiation source. For example, an ultraviolet or visible or infrared or Xenon lamp can be employed, as described herein.

A curable material, formulation or system that undergoes curing upon exposure to radiation is referred to herein interchangeably as "photopolymerizable" or "photoactivatable" or "photocurable".

In some of any of the embodiments described herein, a curable material is a photopolymerizable material, which polymerizes or undergoes cross-linking upon exposure to radiation, as described herein, and in some embodiments the curable material is a UV-curable material, which polymerizes or undergoes cross-linking upon exposure to UV-vis radiation, as described herein.

In some embodiments, a curable material as described herein includes a polymerizable material that polymerizes via photo-induced radical polymerization.

According to an aspect of some embodiments of the present invention, there is provided a transparent curable formulation.

By "transparent curable formulation" it is meant a curable formulation, as defined herein, which provides, when hardened, a transparent material.

The term "transparent" describes a property of a material that reflects the transmittance of light therethrough. A transparent material is typically characterized as capable of transmitting at least 70% of a light that passes therethrough, or by transmittance of at least 70%. Transmittance of a material can be determined using methods well known in the art. An exemplary method is described in the Examples section that follows.

A transparent curable formulation as described herein can be transparent also before it is hardened.

A transparent curable formulation as described herein can be characterized as colorless and/or by color properties as determined by the L*a*b* scale, as described hereinafter for a hardened material.

According to some embodiments of the present invention, a curable formulation as described herein is a photocurable formulation, as defined herein.

According to some embodiments of the present invention, the transparent formulation comprises a mixture of curable materials and one or more photoinitiator(s) (PIs), as described herein.

According to some of any of the embodiments described herein, the photoinitiator(s) comprises, or consists essentially of, a phosphine oxide-type (e.g., mono-acylated (MAPO) or bis-acylated phosphine oxide-type (BAPO) photoinitiator.

Exemplary monoacyl and bisacyl phosphine oxides include, but are not limited to, 2,4,6-trimethylbenzoyldiphenyl phosphine oxide, bis(2,4,6-trimethylbenzoyl) phenylphosphine oxide, dibenzoylphenylphosphine oxide, bis (2,6-dimethoxybenzoyl)phenyl phosphine oxide, tris(2,4-dimethylbenzoyl) phosphine oxide, tris(2-methoxybenzoyl) phosphine oxide, 2,6-dimethoxybenzoyldiphenyl phosphine oxide, 2,6-dichlorobenzoyldiphenyl phosphine oxide, 2,3,5,6-tetramethylbenzoyldiphenyl phosphine oxide, benzoyl-bis (2,6-dimethylphenyl) phosphonate, and 2,4,6-trimethylbenzoylethoxyphenyl phosphine oxide. Commercially available phosphine oxide photoinitiators capable of free-radical initiation when irradiated at wavelength ranges of greater than about 380 nm to about 450 nm include 2,4,6-trimethylbenzoyldiphenyl phosphine oxide (TPO), bis(2,4,6-trimethylbenzoyl)phenyl phosphine oxide (marketed as IRGACURE® 819), bis(2,6-dimethoxybenzoyl)-(2,4,4-trimethylpentyl) phosphine oxide (marketed as CGI 403), a 25:75 mixture, by weight, of bis(2,6-dimethoxybenzoyl)-2,4,4-trimethylpentyl phosphine oxide and 2-hydroxy-2-methyl-1-phenylpropan-1-one (marketed as IRGACURE® 1700), a 1:1 mixture, by weight, of bis(2,4,6-trimethylbenzoyl)phenyl phosphine oxide and 2-hydroxy-2-methyl-1-phenylpropane-1-one (marketed as DAROCUR® 4265), and ethyl 2,4,6-trimethylbenzylphenyl phosphinate (LUCIRIN LR8893X).

In an exemplary embodiments, the photoinitiator is or comprises 2,4,6-trimethylbenzoyldiphenyl phosphine oxide (marketed as TPO) and/or bis(2,4,6-trimethylbenzoyl)phenyl phosphine oxide (marketed as IRGACURE® 819).

The present inventors have sought for transparent curable formulations that are suitable for use in additive manufacturing such as 3D inkjet printing which utilize as a curing condition irradiation (e.g., UV irradiation) from a LED source, as described in the Examples section that follows. Such formulations are described in the Examples section and are also described in the following.

According to an aspect of some embodiments of the present invention there is provided a curable formulation which comprises one or more curable materials, at least one thioether and optionally one or more non-curable materials. This formulation is also referred to herein as a first formulation aspect or as encompassing Ex. Formulations I, II and III.

According to some of any of the embodiments described herein, a total amount of curable materials in the formulation ranges from 85% to 95% by weight of the total weight of the formulation.

According to some of any of the embodiments described herein, the formulation is a transparent formulation which provides, when hardened, a material that features light transmittance higher than 70% or higher than 75%.

According to some of any of the embodiments described herein, the formulation is a photocurable formulation and further comprises a photoinitiator, as described herein.

According to some of any of the embodiments described herein, the formulation is a UV-curable formulation and further comprises a photoinitiator that is activated upon absorbing UV radiation.

According to some of any of the embodiments described herein, the photoinitiator is activated upon absorbing light at a wavelength higher than 380 nm, for example, at a wavelength that ranges from 380 nm to 440 nm. Any photoinitiator that is activated upon absorbing light at the above-indicated wavelength is contemplated.

In some embodiments, the photoinitiator is such that is activated upon absorbing light at a wavelength that ranges from 380 nm to 440 nm, and is decomposed, or undergoes photobleaching as defined herein, when exposed to visible light having a peak wavelength less than 470 nm, and to a temperature of less than a heat deflection temperature (HDT) of the modeling material containing same.

According to some of any of the embodiments described herein, a total amount of the photoinitiator is no more than 3% or no more than 2.5%, or no more than 2%, by weight, of the total weight of the formulation. In exemplary embodiments, a total amount of the photoinitiator ranges from 0.1 to 3, or from 0.1 to 2.5, or from 0.1 to 2, or from 0.5 to 3, or from 0.5 to 2.5, or from 0.5 to 2, or from 0.8 to 2, or from 1 to 3, or from 1 to 2, % by weight, of the total weight of the formulation, including any intermediate values and subranges therebetween.

According to some of any of the embodiments described herein, the photoinitiator comprises, or consists of, a phosphine oxide-type photoinitiator, as described herein.

Other suitable photoinitiators include, but are not limited to, germanium-based photoinitiators, for example, acyl germane type photoinitiators, including, for example, monoacyl, diacyl, triacyl, and tetracyl germane type photoinitiators.

According to some of any of the embodiments described herein, the thioether comprises at least one, preferably at least two, hydrocarbon chain(s). In some embodiments, at least one of the hydrocarbon chains is of at least 8, at least 10 carbon atoms in length.

According to some of any of the embodiments described herein, the at least one hydrocarbon chain is a saturated hydrocarbon chain.

According to some of any of the embodiments described herein, the at least one hydrocarbon chain is a linear hydrocarbon chain.

According to some of any of the embodiments described herein, at least one hydrocarbon chain is or comprises an alkylene chain, for example, an alkylene chain of at least 8, at least 10 carbon atoms in length.

According to some of any of the embodiments described herein, the thioether is liquid at room temperature.

According to some of any of the embodiments described herein, the thioether further comprises at least one carboxylate or thiocarboxylate group(s).

By "thioether" it is meant a material (compound) that comprises at least one Ra—S—Rb moieties, where Ra and Rb can be any moiety that is described herein as a substituent and is other than H.

In some embodiments, the thioether is Ra—S—Rb, and at least one Ra and Rb is or comprises a hydrocarbon chain as described herein, and may also further comprise a carboxylate or thiocarboxylate group.

In some embodiments, one or more of Ra and Rb comprises a curable group as described herein.

In some embodiments, the thioether comprises two or more Ra—S—Rb groups as described herein in any of the respective embodiments, which are linked to one another via a branching unit, as described herein.

In exemplary embodiments, the thioether is or represented by Formula A:

Formula A

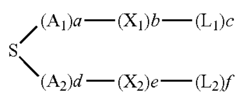

wherein:

a, b, c, d, e and f are each independently 0 or 1, provided that at least one of c and f is 1; $A_1$ and $A_2$ are each independently an alkylene chain, e.g., of 1 to 6 or from 1 to 4 carbon atoms in length;

$X_1$ and $X_2$ are each independently a —$Y_1$—C(═$Y_2$)— group or a —C(═$Y_2$)—$Y_1$ group, wherein each of $Y_1$ and $Y_2$ is independently O or S; and $L_1$ and $L_2$ are each independently a hydrocarbon chain of at least 8 carbon.

In some of these embodiments, a, b, c, d, e and f are each 1.

According to some of any of the embodiments described herein, the thioether further comprises at least one curable group.

According to some of any of the embodiments described herein, the curable is a photocurable group, e.g., a UV-curable group.

According to some of any of the embodiments described herein, the thioether comprises at least one hydrocarbon chain being at least 8 carbon atoms in length, which is substituted or terminated by the curable group.

Additional embodiments of the thioether are described in the Examples section that follows.

According to some of any of the embodiments described herein, an amount of the thioether ranges from 1 to 7, or from 1 to 5, % by weight of the total weight of the formulation, including any intermediate values and subranges therebetween.

According to some of any of the embodiments described herein, the one or more curable materials comprise one or more mono-functional curable materials and one or more multi-functional curable materials.

According to some of any of the embodiments described herein, the one or more curable materials comprise at least one aliphatic or alicyclic mono-functional (meth)acrylate material featuring a molecular weight lower than 500 grams/mol, in a total amount of from 10 to 60, or from 20 to 60, or from 30 to 60, or from 40 to 60, % by weight of the total weight of the formulation, including any intermediate values and subranges therebetween.

According to some of any of the embodiments described herein, the one or more curable materials comprise at least one aromatic mono-functional (meth)acrylate material, in a total amount of from 5 to 15%, or from 8% to 15%, by weight of the total weight of the formulation.

Herein, an aliphatic curable material describes a curable material in which the functional (e.g., polymerizable and/or cross-linkable) moiety or moieties, as defined herein, is/are covalently attached to an aliphatic moiety.

Herein, an alicylic curable material describes a curable material in which the functional (e.g., polymerizable and/or cross-linkable) moiety or moieties, as defined herein, is/are covalently attached to an alicyclic (cycloalkyl or heteroalicyclic) moiety.

Herein, an aromatic curable material describes a curable material in which the functional (e.g., polymerizable and/or cross-linkable) moiety or moieties, as defined herein, is/are covalently attached to an aromatic moiety, which comprises one or more aryl or heteroaryl moiety/moieties.

Aliphatic and/or alicyclic mono-functional (meth)acrylate materials featuring a molecular weight lower than 500 grams/mol are also referred to herein as Component A1.

Aromatic mono-functional (meth)acrylate materials featuring a molecular weight lower than 500 grams/mol are also referred to herein as Component A2.

Monomeric mono-functional (meth)acrylate materials according to the present embodiments can be collectively represented by Formula I:

Formula I

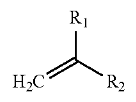

wherein $R_1$ is a carboxylate, —C(═O)—O—Ra, $R_2$ is hydrogen (for acrylate) or methyl (methaceylate), and Ra is an aliphatic, alicylic or aromatic moiety, such that the MW of the compound is no more than 500 grams/mol.

When the material is an alicylic monomeric mono-functional (meth)acrylate material(s), Ra can be, for example, an alicylic moiety such as, but not limited to, isobornyl or any other substituted or unsubstituted cycloalkyl as described herein, or a heteroalicyclic moiety as described herein such as morpholine, tetrahydrofuran, oxalidine, or any other substituted or unsubstituted heteroalicylic as described herein, wherein the substituent(s), if present for a cycloalkyl or for a heteroalicyclic, do not comprise an aryl or heteroaryl, as defined herein. Exemplary alicyclic monomeric mono-functional acrylate include, but are not limited to isobornylacrylate (IBOA), acryloyl morpholine (ACMO), and a material marketed as SR218.

When the material is an aliphatic monomeric mono-functional (meth)acrylate material(s), Ra can be, for example, a substituted or unsubstituted alkyl or alkylene, or any other short hydrocarbon as defined herein, wherein the substituent(s), if present do not comprise an aryl or heteroaryl, as defined herein.

When the material is an aromatic monomeric mono-functional (meth)acrylate material(s), Ra can be, or comprise, for example, an aryl or a heteroaryl, as defined herein, for example a substituted or unsubstituted phenyl, a substituted or unsubstituted naphthalenyl, etc., wherein when substituted, there can be 1, 2, 3 or more substituents each being the same or different, or an alkyl or cycloalkyl substituted by one or more substituted or unsubstituted aryl(s) or substituted or unsubstituted heteroaryl(s), as described herein, for example, substituted or unsubstituted benzyl. Exemplary aromatic monomeric mono-functional (meth)acrylates include, for example, a material marketed as CN131B.

According to some of any of the embodiments described herein, the formulation comprises one or more multi-functional (meth)acrylate materials, in a total amount of from 30 to 60, or from 40 to 60, % by weight of the total weight of the formulation.

According to some of any of the embodiments described herein, the one or more multi-functional (meth)acrylate material(s) include one or more multi-functional urethane (meth)acrylate, for example, urethane di(meth)acrylate and/or urethane tri(meth)acrylate. According to some of any of the embodiments described herein, the one or more multi-functional acrylate material(s) include one or more multi-functional urethane acrylate, for example, urethane diacrylate and/or urethane triacrylate. According to some of any one of these embodiments, each of the multi-functional urethane (meth)acrylate(s) features a molecular weight higher than 1000 grams/mol. Such materials are also referred to herein in the Examples section that follows as Component C.

According to some of the embodiments of the multi-functional urethane (meth)acrylate(s), a total amount of the multi-functional urethane (meth)acrylate(s) ranges from 15 to 40, or from 15 to 30, or from 15 to 25, % by weight of the total weight of the formulation.

According to some of any of the embodiments described herein, the at least one multi-functional urethane acrylate that features a molecular weight higher than 1000 grams/mol comprises at least one multi-functional urethane acrylate that features, when hardened, Tg lower than 35° C., or lower than 20° C., which is also referred to herein as Component C1.

According to some of any of the embodiments described herein for the multi-functional urethane (meth)acrylate(s), the multi-functional urethane (meth)acrylate(s) comprises one or more oligomeric multi-functional urethane (meth)acrylate(s) that features, when hardened, Tg not higher than 20° C., for example, of from −20 to 20° C., or from 0 to 20° C., or from 5 to 20° C. or from 10 to ° C. or from 15 to 20° C. (for example Component C1 in the Examples section that follows); and one or more multi-functional urethane (meth)acrylate that features, when hardened, Tg higher than ° C., for example, of from 20 to 70° C., or of from 20 to 60° C., or of from 30 to 60° C., or of from 40 to 60° C. (for example, Component C2 in the Examples section that follows).

According to some of any of these embodiments, the one or more oligomeric multi-functional urethane (meth)acrylate(s) that features, when hardened, Tg of 20° C. or lower comprise one or more di-functional urethane (meth)acrylate(s). Exemplary such materials include aliphatic polyester urethane diacrylate oligomers, such as, but not limited to, materials marketed under the tradenames CN991, CN9200, CN996, CN9002, and CN996H90, and similar materials.

According to some of any of these embodiments, the one or more oligomeric multi-functional urethane (meth)acrylate(s) that features, when hardened, Tg higher than 20° C. comprise one or more tri-functional urethane (meth)acrylate(s), or otherwise multi-functional urethane (meth)acrylates or mixtures thereof that provides the indicated Tg. Exemplary such materials include aliphatic urethane diacrylate and triacrylate oligomers, such as, but not limited to, those marketed as Photomer 6010, Photomer 6019, Photomer 6210, Photomer 6891, Photomer 6893-Photomer 6008, Photomer 6184, and similar materials.

According to some of any of the embodiments described herein, the formulation comprises at least one multi-functional epoxy (meth)acrylate material, as exemplified herein for Component E.

According to some of any of the embodiments described herein, the curable materials comprise at least one multi-functional (meth)acrylate featuring Tg higher than 100° C., higher than 150° C., or higher than 250° C. as exemplified herein as Component B.

According to some of these embodiments, an amount of the multi-functional (meth)acrylate featuring Tg higher than 100° C., higher than 150° C., or higher than 250° C. ranges from 3% to 15%, or from 5% to 15%, or from 5% to 10%, by weight of the total weight of the formulation.

According to some embodiments, the multi-functional (meth)acrylate features a Tg higher than 100° C., or higher than 150° C., and is an aliphatic or alicyclic material, as exemplified herein for Component B1.

According to some other embodiments, the multi-functional (meth)acrylate features a Tg higher than 100° C., higher than 150° C., or higher than 250° C., and optionally further features a high hardening rate (speed) and/or low volume shrinkage (e.g., lower than 16% or lower than 15%). Alternatively, or in addition, the multi-functional (meth)acrylate that features a Tg higher than 100° C., higher than 150° C., or higher than 250° C. is a cyanurate-based material, which comprises one or more cyanurate or isocyanurate moieties (e.g., as a core to which acrylic groups are attached), as exemplified herein for Component B2.

According to some of any of the embodiments described herein, the multi-functional (meth)acrylate featuring Tg higher than 100° C., or higher than 150° C., or higher than 250° C., features a molecular weight lower 550 grams/mol. In some of these embodiments, such a material is as described herein for Component B2 (e.g., a cyanurate or isocyanurate-containing material and/or a material that features high hardening rate and/or low volume shrinkage as described herein.)

According to some of any of these embodiments, the multi-functional (meth)acrylate featuring Tg higher than 100° C., higher than 150° C., or higher than 250° C. features a volume shrinkage lower than 15%.

In exemplary embodiments, a curable formulation as described in any of the embodiments of this (first) aspect encompasses and is exemplified herein as Ex. Formulations I, II or III.

A formulation as described herein may comprise one or more non-curable materials, which are also referred to herein as additives.

Such materials include, for example, surface active agents (surfactants), inhibitors, antioxidants, fillers, pigments, dyes, and/or dispersants.

According to some of any of the embodiments described herein, the formulation further comprises a surface active agent.

According to some of any of the embodiments described herein, an amount of the surface active agent is lower than 0.05% by weight of the total weight of the formulation.

According to some of any of the embodiments described herein, the surface active agent is a silicon-based surface active agent.

According to some of any of the embodiments described herein, the surface active agent comprises a polyacrylic material.

Surface-active agents may be used to reduce the surface tension of the formulation to the value required for jetting or for printing process, which is typically around 30 dyne/cm. Such agents include silicone materials, for example, organic polysiloxanes such as PDMS and derivatives therefore, such as those commercially available as BYK type surfactants.

According to some of any of the embodiments of the present invention, a formulation as described herein comprises one or more surface active agents, e.g., as described herein.

According to some embodiments, an amount of the surface active agent is lower than 0.05% by weight of the total weight of the formulation, and can range, for example, from 0.001 to 0.045%, by weight.

Suitable stabilizers (stabilizing agents) include, for example, thermal stabilizers, which stabilize the formulation at high temperatures.

The term "filler" describes an inert material that modifies the properties of a polymeric material and/or adjusts a quality of the end products. The filler may be an inorganic particle, for example calcium carbonate, silica, and clay.

Fillers may be added to the modeling formulation in order to reduce shrinkage during polymerization or during cooling, for example, to reduce the coefficient of thermal expansion, increase strength, increase thermal stability, reduce cost and/or adopt rheological properties. Nanoparticles fillers are typically useful in applications requiring low viscosity such as ink-jet applications.

In some embodiments, a concentration of each of a dispersant and/or a stabilizer and/or a filler, if present, ranges from 0.01 to 2%, or from 0.01 to 1%, by weight, of the total weight of the respective formulation. Dispersants are typically used at a concentration that ranges from 0.01 to %, or from 0.01 to 0.05%, by weight, of the total weight of the respective formulation.

In some embodiments, the formulation further comprises an inhibitor. The inhibitor is included for preventing or reducing curing before exposure to a curing condition. Suitable inhibitors include, for example, those commercially available as the Genorad type, or as MEHQ. Any other suitable inhibitors are contemplated.

The pigments can be organic and/or inorganic and/or metallic pigments, and in some embodiments the pigments are nanoscale pigments, which include nanoparticles.

Exemplary inorganic pigments include nanoparticles of titanium oxide, and/or of zinc oxide and/or of silica. Exemplary organic pigments include nanosized carbon black.

In some embodiments, combinations of white pigments and dyes are used to prepare colored cured materials.

The dye may be any of a broad class of solvent soluble dyes. Some non-limiting examples are azo dyes which are yellow, orange, brown and red; anthraquinone and triarylmethane dyes which are green and blue; and azine dye which is black.

According to some of any of the embodiments described herein, the formulation further comprises a blue dye or pigment, which is aimed at masking a possible yellow of the obtained hardened material.

According to some of these embodiments, an amount of the blue dye or pigment is lower than $5\cdot10^{-4}$%, or lower than $2\cdot10^{-4}$%, or lower $1\cdot10^{-4}$%, by weight, of the total weight of the formulation, and can range, for example, from $1\cdot10^{-6}$% to $1\cdot10^{-4}$%, from $1\cdot10^{-5}$% to $1\cdot10^{-4}$%, or from $1\cdot10^{-5}$% to $8\cdot10^{-5}$%, According to some of any of the embodiments described herein, the formulation is devoid of a sulfur-containing thiol compound.

The term "sulfur-containing thiol material" as used in the context of any of the above embodiments encompasses compounds that include one or more —SH (thiol) end-groups, as defined herein. This term encompasses, for example, compounds that include one or more thiol, thioalkoxy, and/or thioaryloxy groups, as defined herein.

Exemplary sulfur-containing compounds include beta-mercaptopropionates, mercaptoacetates, and/or alkane thiols.

Some examples of beta-mercaptopropionate include, but are not limited to, glycol di-(3-mercaptopropionate), pentaerythritol tetra-(3-mercaptopropionate), and trimethylol propane tri-(3-mercaptopropionate).

According to some embodiments of the present invention, the sulfur-containing compound is glycol di-(3-mercaptopropionate), pentaerythritol tetra-(3-mercaptopropionate), and/or trimethylol propane tri-(3-mercaptopropionate).

According to an aspect of some embodiments of the present invention there is provided another photocurable formulation, which encompasses and is exemplified herein as Ex. Formula IV. This formulation is also referred to herein as a second formulation aspect. This formulation is also, in some embodiments a transparent curable formulation as described herein for the first formulation aspect.

According to embodiments of this aspect, the formulation comprises:

- at least one photoinitiator in a total amount of no more than 3% or no more than 2%, by weight of the total weight of the formulation, as described herein in any of the respective embodiments;
- at least one mono-functional (meth)acrylate material featuring a molecular weight lower than 500 grams/mol, in a total amount of from 50 to 70% by weight of the total weight of the formulation, as described herein in any of the respective embodiments, for example, for Components A, A1 and A2;
- at least two multi-functional (meth)acrylic materials, in a total amount of from 30 to 50% by weight of the total weight of the formulation, wherein at least one of the multi-functional (meth)acrylic materials has a Tg higher than 100° C., higher than 150° C., or higher than 250° C., and features a volume shrinkage lower than 15% and/or a high hardening rate and/or comprises a cyanurate or isocyanurate moiety, as described herein for example for Component B2; and at least one of the multi-functional (meth)acrylic materials which is an ethoxylated multifunctional (meth)acrylate material which features a medium-high viscosity, and Tg lower than 20° C., or lower than 0° C., or lower than −20° C., as described herein for component D3.

In some embodiments of this aspect, an average Tg of the at least two multi-functional (meth)acrylate materials, when hardened, is no more than 60, or no more than 50, or no more than ° C.

According to some of any of the embodiments described herein for this aspect, an amount of the multi-functional (meth)acrylic material that features Tg higher than 100° C., or higher than 150, ° C. ranges from 1 to 5% by weight of the total weight of the formulation.

According to some of any of the embodiments described herein for this aspect, an amount of the ethoxylated multi-functional (meth)acrylate material which features a medium-high viscosity, and Tg lower than 20° C., or lower than 0° C. ranges from 3 to 10° C., or from 3 to 8° C., % by weight, of the total weight of the formulation.

According to some of any of the embodiments described herein for this aspect, the at least one mono-functional (meth)acrylate material comprises at least one aliphatic or alicyclic (non-aromatic) mono-functional (meth)acrylate material, as described herein (e.g., for Component A1), in an amount of from 50 to 60% by weight of the total weight of the formulation; and at least one aromatic mono-functional (meth)acrylate material, as described herein (e.g., for Component A2) in an amount of from 5 to 10%, by weight, of the total weight of the formulation.

According to some of any of the embodiments described herein for this aspect, the multi-functional (meth)acrylate materials further comprise at least one multi-functional urethane acrylate that features a molecular weight higher than 1000 grams/mol, as described herein for Component C.

According to some of any of the embodiments described herein for this aspect, the at least one multi-functional urethane acrylate that features a molecular weight higher than 1000 grams/mol comprises at least one multi-functional urethane acrylate that features, when hardened, Tg lower than 35° C., or lower than 20° C., as described herein for Component C1.

According to some of any of the embodiments described herein for this aspect, a total amount of the at least one multi-functional urethane acrylate that features a molecular weight higher than 1000 grams/mol ranges from 10 to 20% by weight of the total weight of the formulation.

According to some of any of the embodiments described herein for this aspect, the multi-functional (meth)acrylate materials further comprise at least one multi-functional epoxy (meth)acrylate material (Component E).

According to some of any of the embodiments described herein for this aspect, the at least one multi-functional epoxy (meth)acrylate material is aromatic.

According to some of any of the embodiments described herein for this aspect, an amount of the at least one multi-functional epoxy (meth)acrylate material ranges from 10 to 20% by weight of the total weight of the formulation.

According to some of any of the embodiments described herein for this aspect, the at least one photoinitiator is devoid of an alpha-substituted ketone-type photoinitiator, for example of an alpha-amine ketone type and/or an alpha-hydroxy ketone type.

In exemplary embodiments, the alpha-substituted ketone-type photoinitiator, is an aromatic alpha-substituted ketone, for example, aromatic alpha-amine ketone and/or aromatic alpha-hydroxy ketone. Any such photoinitiators that are commonly practiced as PIs for UV-curable formulations are encompassed by these embodiments.

Exemplary alpha-hydroxy ketone PIs include, but are not limited to, 1-hydroxy-cyclohexyl-phenyl-ketone (marketed as IRGACURE® 184, I-184), 2-hydroxy-1-{1-[4-(2-hydroxy-2-methyl-propionyl)-phenyl]-1,3,3-trimethyl-indan-5-yl}-2-methyl-propan-1-one, (marketed as ESACURE ONE®), and 1-[4-(2-hydroxyethoxy)-phenyl]-2-hydroxy-2-methyl-1-propan-1-one (marketed as IRGACURE® 2959, I-2959).

According to some of any of the embodiments described herein for this aspect, the at least one photoinitiator comprises, or consists of, a phosphine oxide-type photoinitiator, as described herein.

According to some of any of the embodiments described herein for this aspect, the phosphine oxide-type photoinitiator is activated by radiation at a wavelength of at least 380 nm (e.g., of from 380 to 440 nm).

The formulation according to this aspect may further comprise additional non-reactive components as described herein above.

According to some of any of the embodiments described herein, any of the transparent formulations feature properties such as viscosity, surface tension and/or jettability, which render it usable in additive manufacturing such as three-dimensional inkjet printing.

According to some of any of the embodiments described herein the transparent formulation provides, when hardened, a transparent material.

According to some embodiments, the transparent material is characterized by transmittance of 70% or higher, when measured using an X-rite device as described herein.

According to some embodiments, the additive manufacturing comprises exposure to UV irradiation from a LED source.

According to some embodiments, a relative UV dose emitted from the LED source is higher than 0.1 J/cm$^2$ per layer, for a layer thickness of between 5 to 60 microns, 10 to 50 microns, or 15 to 30 microns.

According to some embodiments, the additive manufacturing comprises dispensing a plurality of layers in a configured pattern, wherein for at least a portion of the layers, a thickness of each layer is lower than 20 micrometers, and the photocurable formulation is as defined herein as encompassing Ex. Formulations I, II and III.

According to some embodiments, the additive manufacturing comprises dispensing a plurality of layers in a configured pattern, wherein for at least a portion of the layers, a thickness of each layer is higher than 25 or higher than 30 micrometers, and the photocurable formulation is as described herein as encompassing Ex. Formulation IV.

According to some embodiments, the transparent material is characterized by at least one of: Transmittance of at least 70%; and Yellowness Index, when measured as described in the Examples section, lower than 8, or lower than 6.

The Object:

The method of the present embodiments manufactures three-dimensional objects in a layerwise manner by forming a plurality of layers in a configured pattern corresponding to the shape of the objects, as described herein.

The final three-dimensional object, obtainable by a method as described herein, is made of the modeling material or a combination of modeling materials or a combination of modeling material/s and support material/s or modification thereof (e.g., following curing). All these operations are well-known to those skilled in the art of solid freeform fabrication.

In some embodiments, the object comprises a transparent material in one or more parts thereof.

In some embodiments, the object features, in at least a portion thereof, one or more of the following characteristics, when determined as described in the Examples section that follows: Transmittance of at least 70%; and Yellowness Index lower than 8, or lower than 6.

In some embodiments, the object features, in at least a portion thereof, one or more of the characteristics presented in Table 6.

As used herein, the phrase "impact resistance", which is also referred to interchangeably, herein and in the art, as "impact strength" or simply as "impact", describes the resistance of a material to fracture by a mechanical impact, and is expressed in terms of the amount of energy absorbed by the material before complete fracture. Impact resistance can be measured using, for example, the ASTM D256-06 standard Izod impact testing (also known as "Izod notched impact", or as "Izod impact"), and/or as described hereinunder, and is expressed as J/m.

As used herein, HDT refers to a temperature at which the respective formulation or combination of formulations deforms under a predetermined load at some certain temperature. Suitable test procedures for determining the HDT of a formulation or combination of formulations are the ASTM D-648 series, particularly the ASTM D-648-06 and ASTM D-648-07 methods. In various exemplary embodiments of the invention the core and shell of the structure differ in their HDT as measured by the ASTM D-648-06 method as well as their HDT as measured by the ASTM D-648-07 method. In some embodiments of the present invention the core and shell of the structure differ in their HDT as measured by any method of the ASTM D-648 series. In the majority of the examples herein, HDT at a pressure of 0.45 MPa was used.

Herein, "Tg" of a material refers to glass transition temperature defined as the location of the local maximum of the E" curve, where E" is the loss modulus of the material as a function of the temperature.

Broadly speaking, as the temperature is raised within a range of temperatures containing the Tg temperature, the state of a material, particularly a polymeric material, gradually changes from a glassy state into a rubbery state.

Herein, "Tg range" is a temperature range at which the E" value is at least half its value (e.g., can be up to its value) at the Tg temperature as defined above.

Without wishing to be bound to any particular theory, it is assumed that the state of a polymeric material gradually changes from the glassy state into the rubbery within the Tg range as defined above. The lowest temperature of the Tg range is referred to herein as Tg(low) and the highest temperature of the Tg range is referred to herein as Tg(high).

Herein throughout, whenever a curable material is defined by a property of a hardened material obtained therefrom, it is to be understood that this property is for a hardened material obtained from this curable material per se.

By "Tensile strength" it is meant the maximum stress that a material can withstand while being stretched or pulled before breaking. Tensile strength may be determined, for example, according to ASTM D-638-03.

By "Tensile modulus" it is meant the stiffness of a material, defined as the relationship between stress (force per unit area) and strain (proportional deformation) in a material in the linear elasticity regime of a uniaxial deformation. Tensile modulus may be determined, for example, according to ASTM D-638-04.

By "flexural strength" or "flexural stress" it is meant the stress in a material just before it yields in a flexure test. Flexural strength may be determined, for example, according to ASTM D-790-03.

By "flexural modulus" or "flexural Y modulus" it is meant the ratio of stress to strain in flexural deformation, which is determined from the slope of a stress-strain curve produced by a flexural test such as the ASTM D790. Flexural modulus may be determined, for example, according to ASTM D-790-04.

Herein throughout, unless otherwise indicated, viscosity values are provided for a viscosity of a material or a formulation when measured at 25° C. on a Brookfield's viscometer.

It is expected that during the life of a patent maturing from this application many relevant curable materials and/or respective agents for promoting polymerization of curable materials will be developed and the scope of the terms first curable material, second curable material and agents promoting polymerization thereof is intended to include all such new technologies a priori.

As used herein the term "about" refers to ±10% or ±5%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

Herein the terms "method" and "process" are used interchangeably and refer to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

Herein throughout, whenever the phrase "weight percent", or "% by weight" or "% wt.", is indicated in the context of embodiments of a formulation (e.g., a modeling formulation), it is meant weight percent of the total weight of the respective uncured formulation.

Herein throughout, an acrylic material is used to collectively describe material featuring one or more acrylate, methacrylate, acrylamide and/or methacrylamide group(s).

Similarly, an acrylic group is used to collectively describe curable groups which are acrylate, methacrylate, acrylamide and/or methacrylamide group(s), preferably acrylate or methacrylate groups (referred to herein also as (meth)acrylate groups).

Herein throughout, the term "(meth)acrylic" encompasses acrylic and methacrylic materials.

Herein throughout, the phrase "linking moiety" or "linking group" describes a group that connects two or more moieties or groups in a compound. A linking moiety is typically derived from a bi- or tri-functional compound, and can be regarded as a bi- or tri-radical moiety, which is connected to two or three other moieties, via two or three atoms thereof, respectively.

Exemplary linking moieties include a hydrocarbon moiety or chain, optionally interrupted by one or more heteroatoms, as defined herein, and/or any of the chemical groups listed below, when defined as linking groups.

When a chemical group is referred to herein as "end group" it is to be interpreted as a substituent, which is connected to another group via one atom thereof.

Herein throughout, the term "hydrocarbon" collectively describes a chemical group composed mainly of carbon and hydrogen atoms. A hydrocarbon can be comprised of alkyl, alkene, alkyne, aryl, and/or cycloalkyl, each can be substituted or unsubstituted, and can be interrupted by one or more heteroatoms. The number of carbon atoms can range from 2 to 30, and is preferably lower, e.g., from 1 to 10, or from 1 to 6, or from 1 to 4. A hydrocarbon can be a linking group or an end group.

Bisphenol A is an example of a hydrocarbon comprised of 2 aryl groups and one alkyl group. Dimethylenecyclohexane is an example of a hydrocarbon comprised of 2 alkyl groups and one cycloalkyl group.

As used herein, the term "amine" describes both a —NR'R" group and a —NR'— group, wherein R' and R" are each independently hydrogen, alkyl, cycloalkyl, aryl, as these terms are defined hereinbelow.

The amine group can therefore be a primary amine, where both R' and R" are hydrogen, a secondary amine, where R' is hydrogen and R" is alkyl, cycloalkyl or aryl, or a tertiary amine, where each of R' and R" is independently alkyl, cycloalkyl or aryl.

Alternatively, R' and R" can each independently be hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, carbonyl, C-carboxylate, O-carboxylate, N-thiocarbamate, O-thiocarbamate, urea, thiourea, N-carbamate, O-carbamate, C-amide, N-amide, guanyl, guanidine and hydrazine.

The term "amine" is used herein to describe a —NR'R" group in cases where the amine is an end group, as defined hereinunder, and is used herein to describe a —NR'— group in cases where the amine is a linking group or is or part of a linking moiety.

The term "alkyl" describes a saturated aliphatic hydrocarbon including straight chain and branched chain groups. Preferably, the alkyl group has 1 to 30, or 1 to 20 carbon atoms. Whenever a numerical range; e.g., "1-20", is stated herein, it implies that the group, in this case the alkyl group, may contain 1 carbon atom, 2 carbon atoms, 3 carbon atoms, etc., up to and including 20 carbon atoms. The alkyl group may be substituted or unsubstituted. Substituted alkyl may have one or more substituents, whereby each substituent group can independently be, for example, hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, C-carboxylate, O-carboxylate, N-thiocarbamate, urea, thiourea, N-carbamate, O-carbamate, C-amide, N-amide, guanyl, guanidine and hydrazine.

The alkyl group can be an end group, as this phrase is defined hereinabove, wherein it is attached to a single adjacent atom, or a linking group, as this phrase is defined hereinabove, which connects two or more moieties via at least two carbons in its chain. When the alkyl is a linking group, it is also referred to herein as "alkylene" or "alkylene chain".

Alkene and Alkyne, as used herein, are an alkyl, as defined herein, which contains one or more double bond or triple bond, respectively.

The term "cycloalkyl" describes an all-carbon monocyclic ring or fused rings (i.e., rings which share an adjacent pair of carbon atoms) group where one or more of the rings does not have a completely conjugated pi-electron system. Examples include, without limitation, cyclohexane, adamantine, norbornyl, isobornyl, and the like. The cycloalkyl group may be substituted or unsubstituted. Substituted cycloalkyl may have one or more substituents, whereby each substituent group can independently be, for example, hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, C-carboxylate, O-carboxylate, N-thiocarbamate, O-thiocarbamate, urea, thiourea, N-carbamate, O-carbamate, C-amide, N-amide, guanyl, guanidine and hydrazine. The cycloalkyl group can be an end group, as this phrase is defined hereinabove, wherein it is attached to a single adjacent atom, or a linking group, as this phrase is defined hereinabove, connecting two or more moieties at two or more positions thereof.

The term "heteroalicyclic" describes a monocyclic or fused ring group having in the ring(s) one or more atoms such as nitrogen, oxygen and sulfur. The rings may also have one or more double bonds. However, the rings do not have a completely conjugated pi-electron system. Representative examples are piperidine, piperazine, tetrahydrofurane, tetrahydropyrane, morpholino, oxalidine, and the like.

The heteroalicyclic may be substituted or unsubstituted. Substituted heteroalicyclic may have one or more substituents, whereby each substituent group can independently be, for example, hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, C-carboxylate, O-carboxylate, N-thiocarbamate, urea, thiourea, O-carbamate, N-carbamate, C-amide, N-amide, guanyl, guanidine and hydrazine. The heteroalicyclic group can be an end group, as this phrase is defined hereinabove, where it is attached to a single adjacent atom, or a linking group, as this phrase is defined hereinabove, connecting two or more moieties at two or more positions thereof.

The term "aryl" describes an all-carbon monocyclic or fused-ring polycyclic (i.e., rings which share adjacent pairs of carbon atoms) groups having a completely conjugated pi-electron system. The aryl group may be substituted or unsubstituted. Substituted aryl may have one or more substituents, whereby each substituent group can independently be, for example, hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, C-carboxylate, O-carboxylate, N-thiocarbamate, O-thiocarbamate, urea, thiourea, N-carbamate, O-carbamate, C-amide, N-amide, guanyl, guanidine and hydrazine. The aryl group can be an end group, as this term is defined hereinabove, wherein it is attached to a single adjacent atom, or a linking group, as this term is defined hereinabove, connecting two or more moieties at two or more positions thereof.

The term "heteroaryl" describes a monocyclic or fused ring (i.e., rings which share an adjacent pair of atoms) group having in the ring(s) one or more atoms, such as, for example, nitrogen, oxygen and sulfur and, in addition, having a completely conjugated pi-electron system. Examples, without limitation, of heteroaryl groups include pyrrole, furan, thiophene, imidazole, oxazole, thiazole, pyrazole, pyridine, pyrimidine, quinoline, isoquinoline and purine. The heteroaryl group may be substituted or unsubstituted. Substituted heteroaryl may have one or more substituents, whereby each substituent group can independently be, for example, hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, C-carboxylate, O-carboxylate, N-thiocarbamate, O-thiocarbamate, urea, thiourea, O-carbamate, N-carbamate, C-amide, N-amide, guanyl, guanidine and hydrazine. The heteroaryl group can be an end group, as this phrase is defined hereinabove, where it is attached to a single adjacent atom, or a linking group, as this phrase is defined hereinabove, connecting two or more moieties at two or more positions thereof. Representative examples are pyridine, pyrrole, oxazole, indole, purine and the like.

The term "halide" and "halo" describes fluorine, chlorine, bromine or iodine.

The term "haloalkyl" describes an alkyl group as defined above, further substituted by one or more halide.

The term "sulfate" describes a —O—S(═O)$_2$—OR' end group, as this term is defined hereinabove, or an —O—S(═O)$_2$—O— linking group, as these phrases are defined hereinabove, where R' is as defined hereinabove.

The term "thiosulfate" describes a —O—S(═S)(═O)—OR' end group or a —O—S(═S)(═O)—O— linking group, as these phrases are defined hereinabove, where R' is as defined hereinabove.

The term "sulfite" describes an —O—S(═O)—O—R' end group or a —O—S(═O)—O— group linking group, as these phrases are defined hereinabove, where R' is as defined hereinabove.

The term "thiosulfite" describes a —O—S(═S)—O—R' end group or an —O—S(═S)—O— group linking group, as these phrases are defined hereinabove, where R' is as defined hereinabove.

The term "sulfinate" describes a —S(═O)—OR' end group or an —S(═O)—O— group linking group, as these phrases are defined hereinabove, where R' is as defined hereinabove.

The term "sulfoxide" or "sulfinyl" describes a —S(═O)R' end group or an —S(═O)— linking group, as these phrases are defined hereinabove, where R' is as defined hereinabove.

The term "sulfonate" describes a —S(═O)$_2$—R' end group or an —S(═O)$_2$— linking group, as these phrases are defined hereinabove, where R' is as defined herein.

The term "S-sulfonamide" describes a —S(═O)$_2$—NR'R" end group or a —S(═O)$_2$—NR'— linking group, as these phrases are defined hereinabove, with R' and R" as defined herein.

The term "N-sulfonamide" describes an R'S(═O)$_2$—NR"— end group or a —S(═O)$_2$—NR'— linking group, as these phrases are defined hereinabove, where R' and R" are as defined herein.

The term "disulfide" refers to a —S—SR' end group or a —S—S— linking group, as these phrases are defined hereinabove, where R' is as defined herein.

The term "phosphonate" describes a —P(═O)(OR')(OR") end group or a —P(═O)(OR')(O)— linking group, as these phrases are defined hereinabove, with R' and R" as defined herein.

The term "thiophosphonate" describes a —P(═S)(OR')(OR") end group or a —P(═S)(OR')(O)— linking group, as these phrases are defined hereinabove, with R' and R" as defined herein.

The term "phosphinyl" describes a —PR'R" end group or a —PR'— linking group, as these phrases are defined hereinabove, with R' and R" as defined hereinabove.

The term "phosphine oxide" describes a —P(═O)(R')(R") end group or a —P(═O)(R')— linking group, as these phrases are defined hereinabove, with R' and R" as defined herein.

The term "phosphine sulfide" describes a —P(═S)(R')(R") end group or a —P(═S)(R')— linking group, as these phrases are defined hereinabove, with R' and R" as defined herein.

The term "phosphite" describes an —O—PR'(═O)(OR") end group or an —O—PH(═O)(O)— linking group, as these phrases are defined hereinabove, with R' and R" as defined herein.

The term "carbonyl" or "carbonate" as used herein, describes a —C(═O)—R' end group or a —C(═O)— linking group, as these phrases are defined hereinabove, with R' as defined herein.

The term "thiocarbonyl" as used herein, describes a —C(═S)—R' end group or a —C(═S)-linking group, as these phrases are defined hereinabove, with R' as defined herein.

The term "oxo" as used herein, describes a (═O) group, wherein an oxygen atom is linked by a double bond to the atom (e.g., carbon atom) at the indicated position.

The term "thiooxo" as used herein, describes a (═S) group, wherein a sulfur atom is linked by a double bond to the atom (e.g., carbon atom) at the indicated position.

The term “oxime” describes a =N—OH end group or a =N—O— linking group, as these phrases are defined hereinabove.

The term “hydroxyl” describes a —OH group.

The term “alkoxy” describes both an —O-alkyl and an —O-cycloalkyl group, as defined herein. The term alkoxide describes —R'O$^-$ group, with R' as defined herein.

The term “aryloxy” describes both an —O-aryl and an —O-heteroaryl group, as defined herein.

The term “thiohydroxy” or “thiol” describes a —SH group. The term “thiolate” describes a —S$^-$ group.

The term “thioalkoxy” describes both a —S-alkyl group, and a —S-cycloalkyl group, as defined herein.

The term “thioaryloxy” describes both a —S-aryl and a —S-heteroaryl group, as defined herein.

The “hydroxyalkyl” is also referred to herein as “alcohol”, and describes an alkyl, as defined herein, substituted by a hydroxy group.

The term “cyano” describes a —C≡N group.

The term “isocyanate” describes an —N=C=O group.

The term “isothiocyanate” describes an —N=C=S group.

The term “nitro” describes an —$NO_2$ group.

The term “acyl halide” describes a —(C=O)R'''' group wherein R'''' is halide, as defined hereinabove.

The term “azo” or “diazo” describes an —N=NR' end group or an —N=N— linking group, as these phrases are defined hereinabove, with R' as defined hereinabove.

The term “peroxo” describes an —O—OR' end group or an —O—O— linking group, as these phrases are defined hereinabove, with R' as defined hereinabove.

The term “carboxylate” as used herein encompasses C-carboxylate and O-carboxylate.

The term “C-carboxylate” describes a —C(=O)—OR' end group or a —C(=O)—O— linking group, as these phrases are defined hereinabove, where R' is as defined herein.

The term “O-carboxylate” describes a —OC(=O)R' end group or a —OC(=O)— linking group, as these phrases are defined hereinabove, where R' is as defined herein.

A carboxylate can be linear or cyclic. When cyclic, R' and the carbon atom are linked together to form a ring, in C-carboxylate, and this group is also referred to as lactone. Alternatively, R' and O are linked together to form a ring in O-carboxylate. Cyclic carboxylates can function as a linking group, for example, when an atom in the formed ring is linked to another group.

The term “thiocarboxylate” as used herein encompasses C-thiocarboxylate and O-thiocarboxylate.

The term “C-thiocarboxylate” describes a —C(=S)—OR' end group or a —C(=S)—O— linking group, as these phrases are defined hereinabove, where R' is as defined herein.

The term “O-thiocarboxylate” describes a —OC(=S)R' end group or a —OC(=S)— linking group, as these phrases are defined hereinabove, where R' is as defined herein.

A thiocarboxylate can be linear or cyclic. When cyclic, R' and the carbon atom are linked together to form a ring, in C-thiocarboxylate, and this group is also referred to as thiolactone. Alternatively, R' and O are linked together to form a ring in O-thiocarboxylate. Cyclic thiocarboxylates can function as a linking group, for example, when an atom in the formed ring is linked to another group.

The term “carbamate” as used herein encompasses N-carbamate and O-carbamate.

The term “N-carbamate” describes an R''OC(=O)—NR'— end group or a —OC(=O)—NR'— linking group, as these phrases are defined hereinabove, with R' and R'' as defined herein.

The term “O-carbamate” describes an —OC(=O)—NR'R'' end group or an —OC(=O)—NR'— linking group, as these phrases are defined hereinabove, with R' and R'' as defined herein.

A carbamate can be linear or cyclic. When cyclic, R' and the carbon atom are linked together to form a ring, in O-carbamate. Alternatively, R' and O are linked together to form a ring in N-carbamate. Cyclic carbamates can function as a linking group, for example, when an atom in the formed ring is linked to another group.

The term “carbamate” as used herein encompasses N-carbamate and O-carbamate.

The term “thiocarbamate” as used herein encompasses N-thiocarbamate and O-thiocarbamate.

The term “O-thiocarbamate” describes a —OC(=S)—NR'R'' end group or a —OC(=S)—NR'— linking group, as these phrases are defined hereinabove, with R' and R'' as defined herein.

The term “N-thiocarbamate” describes an R''OC(=S)NR'— end group or a —OC(=S)NR'— linking group, as these phrases are defined hereinabove, with R' and R'' as defined herein.

Thiocarbamates can be linear or cyclic, as described herein for carbamates.

The term “dithiocarbamate” as used herein encompasses S-dithiocarbamate and N-dithiocarbamate.

The term “S-dithiocarbamate” describes a —SC(=S)—NR'R'' end group or a —SC(=S)NR'— linking group, as these phrases are defined hereinabove, with R' and R'' as defined herein.

The term “N-dithiocarbamate” describes an R''SC(=S)NR'— end group or a —SC(=S)NR'— linking group, as these phrases are defined hereinabove, with R' and R'' as defined herein.

The term “urea”, which is also referred to herein as “ureido”, describes a —NR'C(=O)—NR''R''' end group or a —NR'C(=O)—NR''— linking group, as these phrases are defined hereinabove, where R' and R'' are as defined herein and R''' is as defined herein for R' and R''.

The term “thiourea”, which is also referred to herein as “thioureido”, describes a —NR'—C(=S)—NR''R''' end group or a —NR'—C(=S)—NR''— linking group, with R', R'' and R''' as defined herein.

The term “amide” as used herein encompasses C-amide and N-amide.

The term “C-amide” describes a —C(=O)—NR'R'' end group or a —C(=O)—NR'— linking group, as these phrases are defined hereinabove, where R' and R'' are as defined herein.

The term “N-amide” describes a R'C(=O)—NR''— end group or a R'C(=O)—N— linking group, as these phrases are defined hereinabove, where R' and R'' are as defined herein.

An amide can be linear or cyclic. When cyclic, R' and the carbon atom are linked together to form a ring, in C-amide, and this group is also referred to as lactam. Cyclic amides can function as a linking group, for example, when an atom in the formed ring is linked to another group.

The term “guanyl” describes a R'R''NC(=N)— end group or a —R'NC(=N)— linking group, as these phrases are defined hereinabove, where R' and R'' are as defined herein.

The term "guanidine" describes a —R'NC(═N)—NR"R'" end group or a —R'NC(═N)— NR"— linking group, as these phrases are defined hereinabove, where R', R" and R'" are as defined herein.

The term "hydrazine" describes a —NR'—NR"R'" end group or a —NR'—NR"— linking group, as these phrases are defined hereinabove, with R', R", and R'" as defined herein.

As used herein, the term "hydrazide" describes a —C(═O)—NR'—NR"R'" end group or a —C(═O)—NR'—NR"— linking group, as these phrases are defined hereinabove, where R', R" and R'" are as defined herein.

As used herein, the term "thiohydrazide" describes a —C(═S)—NR'—NR"R'" end group or a —C(═S)—NR'—NR"— linking group, as these phrases are defined hereinabove, where R', R" and R'" are as defined herein.

The term "cyanurate" describes a

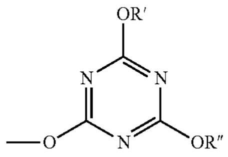

end group or

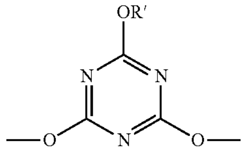

linking group, with R' and R" as defined herein.

The term "isocyanurate" describes a

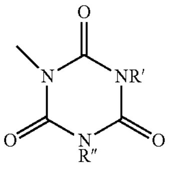

end group or a

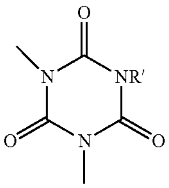

linking group, with R' and R" as defined herein.

The term "thiocyanurate" describes a

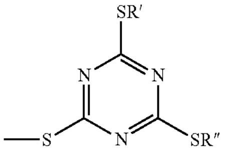

end group or

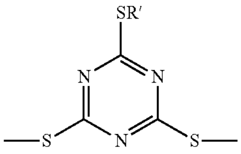

linking group, with R' and R" as defined herein.

As used herein, the term "alkylene glycol" describes a —O—[(CR'R")$_z$—O]$_y$—R'" end group or a —O—[(CR'R")$_z$—O]$_y$— linking group, with R', R" and R'" being as defined herein, and with z being an integer of from 1 to 10, preferably, from 2 to 6, more preferably 2 or 3, and y being an integer of 1 or more. Preferably R' and R" are both hydrogen. When z is 2 and y is 1, this group is ethylene glycol. When z is 3 and y is 1, this group is propylene glycol. When y is 2-4, the alkylene glycol is referred to herein as oligo(alkylene glycol).

Herein, an "ethoxylated" material describes an acrylic or methacrylic compound which comprises one or more alkylene glycol groups, or, preferably, one or more alkylene glycol chains, as defined herein. Ethoxylated (meth)acrylate materials can be monofunctional, or, preferably, multifunctional, namely, difunctional, trifunctional, tetrafunctional, etc.

In multifunctional materials, typically, each of the (meth) acrylate groups are linked to an alkylene glycol group or chain, and the alkylene glycol groups or chains are linked to one another through a branching unit, such as, for example, a branched alkyl, cycloalkyl, aryl (e.g., Bisphenol A), etc.

In some embodiments, the ethoxylated material comprises at least one, or at least two ethoxylated group(s)s, that is, at least one or at least two alkylene glycol moieties or groups. Some or all of the alkylene glycol groups can be linked to one another to form an alkylene glycol chain. For example, an ethoxylated material that comprises 30 ethoxylated groups can comprise a chain of 30 alkylene glycol groups linked to one another, two chains, each, for example, of 15 alkylene glycol moieties linked to one another, the two chains linked to one another via a branching moiety, or three chains, each, for example, of 10 alkylene glycol groups linked to one another, the three chains linked to one another via a branching moiety. Shorter and longer chains are also contemplated.

The ethoxylated material can comprise one, two or more alkylene glycol chains, of any length.

The term "branching unit" as used herein describes a multi-radical, preferably aliphatic or alicyclic group. By "multi-radical" it is meant that the unit has two or more attachment points such that it links between two or more atoms and/or groups or moieties.

In some embodiments, the branching unit is derived from a chemical moiety that has two, three or more functional groups. In some embodiments, the branching unit is a branched alkyl or a cycloalkyl (alicyclic) or an aryl (e.g., phenyl) as defined herein.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non-limiting fashion.

Example 1

Chemical Composition of Transparent Modeling Material Formulations

Exemplary chemical components composing the reference formulations I and II and exemplary formulations according to some of the present embodiments, which provide, when hardened, a transparent material (collectively referred to herein also as "transparent modeling material formulations", or "transparent modeling formulations" or "transparent formulations"), are presented in Table 1 below.

TABLE 1

| Component | Description | Exemplary materials |
|---|---|---|
| A | Low MW/low viscosity monofunctional (meth)acrylate | |
| A1 | Non-aromatic, low MW/low viscosity, monofunctional (meth)acrylate, optionally featuring Tg higher than 50° C., e.g., of 50-150, or 70-150, or 80-150° C. | As described hereinabove |
| A2 | Aromatic, low MW/low viscosity, monofunctional (meth)acrylate, optionally featuring Tg lower than 50° C., or lower than 20° C., e.g., of 0-50, or of 0-30, or of 0-20° C. | As described hereinabove |
| B | Multi-functional (e.g., difunctional or trifunctional) (meth)acrylate featuring Tg higher than 100° C., or higher than 150° C. | As described hereinabove |
| B1 | Aliphatic or alicyclic multi-functional (e.g., difunctional) (meth)acrylate featuring Tg higher than 100° C., or higher than 150° C. | As described hereinabove |
| B2 | Cyanurate or Isocyanurate-based multi-functional (e.g., difunctional) (meth)acrylate featuring Tg higher than 100° C., or higher than 150° C. | As described hereinabove |
| C | Aliphatic urethane (meth)acrylate multifunctional | |
| C1 | Aliphatic urethane (meth)acrylate difunctional, high viscosity/high MW, Tg lower than 50° C., or lower than 30° C., or lower than 20° C. (e.g., of 0-50, or of 0-30, or of 0-20° C.) | Aliphatic polyester urethane diacrylate oligomers |
| C2 | Aliphatic urethane (meth)acrylate multifunctional (e.g., trifunctional), high viscosity/high MW, preferably featuring Tg higher than 20° C. (e.g., of from 20 to 60, or from 40 to 60° C.) | Aliphatic urethane diacrylate and/or triacrylate oligomers |
| D | Ethoxylated (meth)acrylate multifunctional | |
| D1 | Ethoxylated difunctional (meth)acrylate monomer/oligomer, medium-high viscosity, preferably featuring Tg higher than 50° C., e.g., of 50-100, preferably 50-80 or 50-70° C. | Aromatic ethoxylated diacrylates featuring Tg higher than 50° C., e.g., of 50-100, preferably 50-80 or 50-70° C. |
| D2 | Ethoxylated, low viscosity, difunctional (meth)acrylate preferably featuring Tg higher than 50° C., e.g., of 50-100, preferably 50-80 or 50-70° C. | Non-aromatic ethoxylated diacrylates featuring Tg higher than 50° C., e.g., of 50-100, preferably 50-80 or 50-70° C. |
| D3 | Ethoxylated, high viscosity difunctional (meth)acrylate monomer/oligomer, medium-high viscosity, preferably featuring Tg lower than 20° C., e.g., of −50-0° C. | Aromatic, high MW ethoxylated diacrylates featuring Tg lower than 0° C. |
| E | Epoxy (meth)acrylate multifunctional | Aromatic epoxy (meth)acrylate di-functional |
| P | Photoinitiator (PI) | |
| P1 | PI phosphine oxide-type | PIs of the BAPO or MAPO type |
| P2 | alpha-amine/hydroxy ketone -type | alpha-hydroxy ketone type |
| G | Inhibitor | As described hereinabove |
| H | Sulfur-containing additive | |
| H1 | Thiols | As described hereinabove |
| H2 | Thioethers | As described herein |
| F | Amine-containing additive | Amine-containing oxygen scavenger as described herein |
| I | Surface Active Agent | |
| I1 | Silicon-based Surface Active Agent | Materials marketed within the BYK family |
| I2 | Polyacrylate-based Surface Active Agent | Materials marketed within the BYK family |
| J | Pigment/dye | |
| J | Blue pigment/dye | As described hereinabove |

Example 2

Exemplary available transparent modeling material formulations Table 2A below presents the chemical composition of reference formulations, such as Reference (Ref.) formulation I, which provide, when hardened, a transparent material.

TABLE 2A

| Component | % Weight |
|---|---|
| A1 | 45-60 |
| A2 | 10-15 |
| B1 | 5-15 |
| C1 | 20-30 |
| E | 3-10 |
| P1 | 1-2 |
| P2 | 2-3 |
| G | 0.1-0.2 |
| I1 | 0.01-0.2 |
| J | $0\text{-}5 \cdot 10^{-4}$ |

An average Tg of an exemplary Reference Formulation I ranges from 60 to 70° C.

Table 2B below presents the chemical composition of other exemplary reference formulations, such as Reference (Ref.) formulation II, which provide, when hardened, a transparent material.

TABLE 2B

| Component | % weight |
|---|---|
| A1 | 45-60 |
| C1 | 20-30 |
| D1 | 15-25 |
| P1 | 0.5-1.5 |
| P2 | 2-3 |
| H1 | 0.5-2 |
| I1 | 0.05-0.2 |

An average Tg of an exemplary Reference Formulation II ranges from 60 to 70° C.

Hardened materials formed of Reference (Ref.) formulations I and II are typically characterized by the following properties:

Tensile strength (as defined herein) higher than 30 MPa;

Flexural strength (as defined herein) higher than 50 MPa;

Flexural Modulus (as defined herein) higher than 1800 MPa;

Izod Impact (as defined herein) higher than 15, typically higher than 20 J/mol;

HDT higher than 40° C.; and

Elongation at break of at least 7% (e.g., 7-30%).

Table 2C below presents the chemical composition of an exemplary transparent formulation according to some of the present embodiments, which is also referred to herein as Ref. formulation III. Such a formulation is as disclosed in PCT/IL2020/050396 and is a partially reactive formulation that is a part of a formulation system (e.g., a dual component system).

TABLE 2C

| Component | Wt. % |
|---|---|
| A1 | 40-60 |
| C1 | 3-8 |
| C2 | 12-22 |
| D1 | 15-25 |
| D2 | 5-10 |
| P1 | 0.1-1 |
| G | 0.1-0.2 |
| I1 | 0.01-0.05 |
| J | $0\text{-}1 \cdot 10^{-4}$ |

TABLE 2C-continued

Example 3

Newly Designed Transparent Modeling Material Formulations

As described in PCT/IL2020/050396, the present assignee has designed transparent formulations which have been successfully practiced in a dual-component system, as a partially reactive formulation combined with a fully-reactive formulation. An exemplary such formulation is presented in Table 2C above.

In a search for a stand-alone transparent formulation, which can be used as a single formulation without being combined with a fully-reactive formulation, and which can additionally overcome the limitations imposed when using UV LED radiation source, as discussed hereinabove, the present inventors have designed and successfully practiced new formulations.

The present inventors have recognized that since photoinitiators that absorb at short wavelength are inefficient when used with UV LED, materials that act as accelerators of surface curing, such as oxygen scavengers and hydrogen donors, should be added to such formulations. However, in view of the limitations associated with currently practiced such materials, the present inventors have sought for alternative materials.

The present inventors have studied the inclusion of thioethers in such formulations. Thioethers have been recognized in the art as being significantly less active as oxygen scavengers and as accelerators of photoinitiator-promoted free radical polymerization. After extensive, laborious studies, the present inventors have identified thioethers which not only increase drastically the surface curing and thus, for example, render the formulations suitable for use with UV LED, but also do not adversely affect the formulation's performance in terms of, for example, the formulation's stability, yellowness of the hardened material and mechanical properties of the hardened material. These thioethers (Component H2 in Table 1 above) should feature at least one, preferably at least two, hydrocarbon chain(s) of at least 8, at least 10 carbon atoms in length (e.g., from 8 to 30, or from 10 to 30, or from 8 to 25, or from 10 to 25, or from 8 to 20, or from 10 to 20, carbon atoms in length).

Optionally, but not obligatory, the hydrocarbon chain is a linear saturated chain, preferably non-branched linear chain.

The hydrocarbon chain can optionally be substituted and/or terminated by one or more curable groups, preferably UV-curable groups (e.g., acrylate or methacrylate groups).

Optionally, but not obligatory, the thioether features one or more ester groups.

Optionally, but not obligatory, the thioether is liquid at room temperature. Liquid thioethers may avoid stability issues that may arise in case solid materials, which may solidify during storage and/or use, are used, and may also assure better migration toward the layer's surface when the layer is exposed to UV LED radiation and hence act more efficiently.

Exemplary preferred thioethers can be collectively represented by Formula A:

Formula A

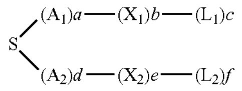

Wherein:

a, b, c, d, e and f are each independently 0 or 1;

$A_1$ and $A_2$ are each independently an alkylene chain, e.g., of 1 to 6 or from 1 to 4 carbon atoms in length;

$X_1$ and $X_2$ are each independently a —$Y_1$—C(═$Y_2$)— group or a —C(═$Y_2$)—$Y_1$ group, wherein each of $Y_1$ and $Y_2$ is independently O or S; and $L_1$ and $L_2$ are each independently a hydrocarbon chain of at least 8 carbon atoms as described herein in any of the respective embodiments.

In exemplary embodiments, a, b, c, d, e and f are each 1.

In exemplary embodiments, $X_1$ and $X_2$ are each a —C(═O)—O— group (such that $Y_1$ and $Y_2$ are each 0).

In exemplary embodiments, a, b, c, d, e and f are each 1 and $X_1$ and $X_2$ are each a —C(═O)— group.

An exemplary commercially available thioether of Formula A is marketed as Evenstab 13 (CAS No. 10595-72-9).

It is to be noted that other thioethers are also contemplated. Some exemplary, non-limiting examples include materials marketed as ADK STAB AO-4125 (CAS No. 29598-76-3); Evabochem 994 (CAS No. 14338-82-0); and Evabochem 696 (CAS No. 24293-43-4).

Additional thioethers that are usable in the context of embodiments of the present invention are described hereinabove. Some preferred exemplary thioethers include one or more curable groups (e.g., terminal curable groups such as (meth)acrylate groups.

Tables 3A, 3B and 3C below present exemplary formulations, referred to herein as Ex. Formulation I, II and III, respectively.

TABLE 3A (Ex. Formulation I)

| Component | % Weight |
|---|---|
| A1 | 45-60 |
| A2 | 10-15 |
| B1 | 3-10 |
| C1 | 25-35 |
| E | 3-10 |
| P1 | 1-2 |
| P2 | 2-3 |
| H2* | 0.5-3 |
| F | 0.5-3 |
| G | 0.1-0.2 |
| I1 | None |
| J | $0\text{-}5 \cdot 10^{-4}$ |

*Selected thioether is solid at room temperature

TABLE 3B (Ex. Formulation II)

| Component | % Weight |
|---|---|
| A1 | 45-60 |
| A2 | 10-15 |
| B1 | 3-10 |
| C1 | 20-30 |
| E | 3-10 |
| P1 | 1.5-2.5 |
| P2 | None |
| H2 | 1-5 |
| G | 0.1-0.2 |
| I1 | 0.01-0.05 (0.05) |
| J | $0\text{-}5 \cdot 10^{-4}$ |

TABLE 3C (Ex. Formulation III)

| Component | % Weight |
|---|---|
| A1 | 45-60 |
| A2 | 8-15 |
| B1 | None |
| B2 | 5-10 |
| C1 | 20-30 |
| E | 3-10 |
| P1 | 0.1-1 |
| P2 | None |
| H2 | 1-6 |
| G | 0.1-0.2 |
| I1 | None |
| I2 | 0.05-0.1 |
| J | $0\text{-}5 \cdot 10^{-4}$ |

The Exemplary formulations all include a thioether as described herein, and additional modifications were made to, for example, Ref. Formulation I, in order to maintain desirable viscosity at the jetting temperature, reactivity, and mechanical properties of the hardened material.

It is to be noted that dozens of additional formulations were prepared and tested and Ex. Formulations I, II and III are representative of formulations that exhibited a desirable performance.

It is to be further noted that formulations comprising thioethers that feature shorter hydrocarbon chains provided a less satisfactory performance. These include, for example, thioether materials such as those marketed as Evabochem 994 (CAS No. 14338-82-0) and as Evabochem 696 (CAS No. 24293-43-4).

The tested formulations were used for printing transparent objects, using a Stratasys J-826 system (equipped with UV LED radiation source), such as described, for example, in FIG. 1A, or a Stratasys J-55 (equipped with UV LED radiation source), such as described, for example, in FIGS. 1B-D.

The J-55 system is operated at higher UV dose relative to the J-826 system (about 2-3-folds higher), and a thickness of the dispensed layer is lower (about 2-folds lower). This combination of higher UV dose and thinner layers results in an increased adverse effect as a result of increased oxygen diffusion. Without being bound by any particular theory, it is assumed that this combination leads to both photodegradation of the polymeric chains and an ensemble of adverse reactions as a result of oxygen radicals, including, for example, de-activation of the photoinitiator, de-activation of the formed free radicals, premature termination of the free-radical polymerization, etc.

The present inventors have identified that while Exemplary Formulations I and II efficiently perform with systems such as Stratasys J-826, Ex. Formulation III, which includes lower PI content (P1) and higher thioether content (H2) performs efficiently also with systems such as Stratasys J-55.

The present inventors have also uncovered that replacing at least a portion of component B1 with component B2 provides for reduced yellowness.

The successful inclusion of a B2 component was further tested and additional exemplary transparent formulations were designed.

During additional laborious studies, an additional exemplary transparent formulation was identified, and is referred to herein as Ex. Formulation IV. Table 4 below presents the chemical composition of Ex. Formula IV.

This formulation was shown to perform successfully with a system in which a thickness of the dispensed layer is higher than 20 micrometers (microns), optionally also with a UV LED

TABLE 4

| Component | % Weight |
|---|---|
| A1 | 50-60 |
| A2 | 5-15 |
| B1 | None |
| B2 | 1-5 |
| C1 | 10-20 |
| D3 | 3-10 |
| E | 10-20 |
| P1 | 1-2 |
| P2 | None |
| G | 0.1-0.2 |
| I1 | 0.01-0.05 |
| J | $0\text{-}5 \cdot 10^{-4}$ |

The present inventors have identified that the use of multi-functional components such as B2 and D3 overcomes adverse effects (e.g., yellowness) caused by, for example, component B1. Since at least D3 features low Tg values and high viscosity, manipulation of the amount of the other components was made in order to provide a formulation with desirable viscosity, and which provides hardened material with desirable Tg and mechanical properties.

Herein throughout, the phrase "low viscosity" describes a material that features, before curing, a viscosity of no more than 500 centipoises, at 25° C.

Herein throughout, the phrase "medium viscosity" describes a material that features, before curing, a viscosity of from 500-2000 centipoises, at 25° C.

Herein throughout, the phrase "high viscosity" describes a material that features, before curing, a viscosity of higher than 2000 centipoises preferably in a range of from 2000 to 10000 centipoises, when measured at 25° C.

Herein throughout, the phrase "low MW" describes a material that features, before curing, a molecular weight of no more than 500 grams/mol, and even of no more than 400 grams/mol.

Herein throughout, the phrase "medium MW" describes a material that features, before curing, a molecular weight of from 500 grams/mol to about 1000 grams/mol.

Herein throughout, the phrase "high MW" describes a material that features, before curing, a molecular weight of higher than 1000 grams/mol.

Medium and high-MW materials are also referred to herein as oligomeric materials, or as oligomers.

Herein, whenever low (or high or medium) MW/low (or high or medium) viscosity is indicated it is meant the indicated MW feature and/or the indicated viscosity feature.

Herein throughout, an average Tg means a sum of the Tg of each component multiplied by its relative weight portion divided by the sum of the respective weight portions.

For example, if material A is included in an amount of X weight percent and features Tg1, and a material B is included in an amount of Y weight percent and features Tg2, then an average Tg of materials A and B is calculated herein as:

$$\text{Average } Tg=(X\times Tg1+Y\times Tg2)/(X+Y).$$

In case only one material is present for a certain group of materials as described herein, the average Tg of this material is its Tg.

Some of the newly designed transparent formulations comprise one or more photoinitiator(s) (PIs), in a total amount of no more than 3% by weight, or no more than 2% by weight, yet are considered as fully reactive curable formulations, as defined herein.

The newly designed Formulations may further comprise one or more non-reactive (non-curable) materials, in addition to component H2 as described herein (e.g., additives as described herein for components G and I) as described herein, for example, an inhibitor, a surface active agent, in an amount lower than 1%, preferably lower than 0.5%, by weight, and/or a coloring agent that provides a blue tint (e.g., component J), in an amount lower than $5\cdot10^{-4}$, preferably in a range of 0 to $1\cdot10^{-4}$.

Example 4

Post Printing Treatment

Objects made using the transparent formulations described herein were subjected to photobleaching, by exposing the printed object to LED irradiation.

A typical photobleaching post-treatment can be performed using a LED 100 Watts 6500 K lamp, and optionally further exposing to heat, e.g., at 35-55° C. Irradiation and heating can be performed during a time period of, for example, 1 hour, 2 hours, or more, e.g., from 1 hour to 24 hours, or from 2 hours to 24 hours.

The time required for exposing a printed object to photobleaching in order to achieve the desired optical properties of the final object depends on the size, shape and particularly the width or depth of the object or the transparent part thereof, and the desired optical property.

Monitoring parameters such as L*a*b*, transmittance and yellowness index can be performed during the photobleaching process in order to determine the time period of photobleaching for a certain object.

The present assignee has studied the conditions required for successful photobleaching and have designed accordingly a photobleaching post-treatment procedure which is useful particularly for transparent formulation such as described herein.

It has been unexpectedly discovered that for a particular subrange of wavelengths within the visible light range, photobleaching is significantly faster and more efficient compared to other wavelengths. In particular, the inventors found that visible light having a peak wavelength less than 470 nm, more preferably less than 460 nm, for example, 450 nm of less, reduces yellowish hue faster than light having other peak wavelengths, or substantially white light.

Thus, according to some embodiments of the present invention, an object fabricated from a modeling material by additive manufacturing is treated by exposing it to visible light having a peak wavelength less than 470 nm. The peak wavelength is preferably at least 350 nm, more preferably at least 370 nm more preferably at least 390 nm, e.g., 400 nm or more.

In some embodiments of the present invention, at any time interval of the exposure of the object to the visible light, X % of the spectral energy of the visible light is within the spectral range spanning from about 430 nm to about 470 nm or from about 440 nm to about 460 nm, where X is at least 20 or at least 30 or at least 40 or at least 50 or at least 60 or at least 70 or at least 80 or at least 90 or at least 95.

Figure 9A:
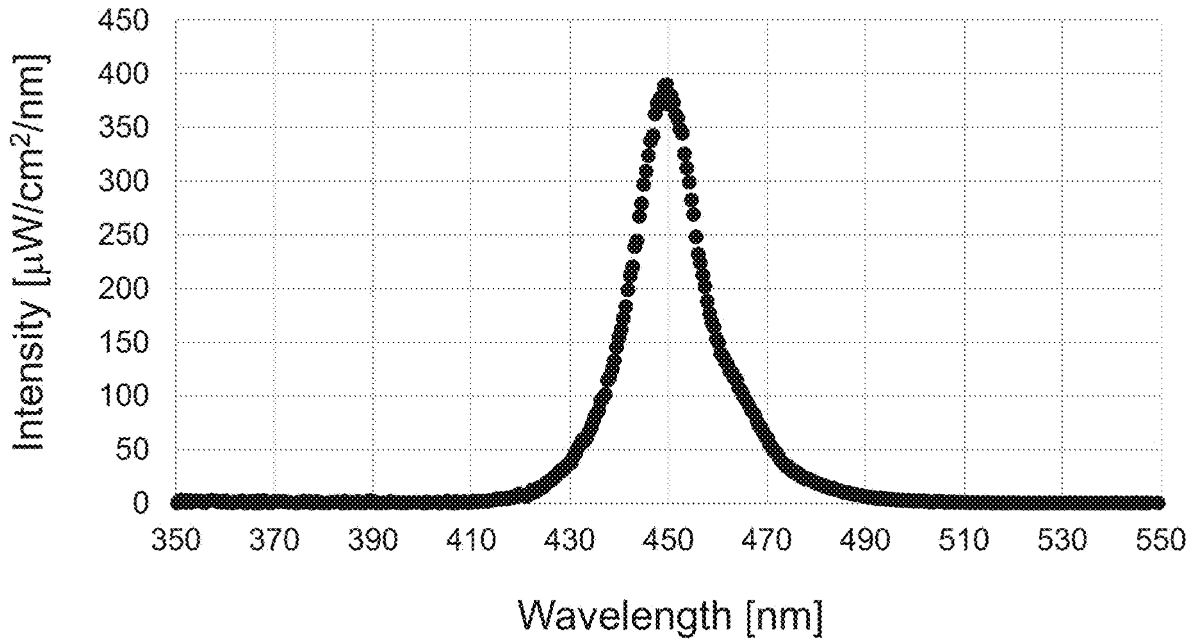
FIGS. 9A and 9B show spectral contents of a visible light suitable for the present embodiments (FIG. 9A) and of a white LED (FIG. 9B)
Figure 9B:
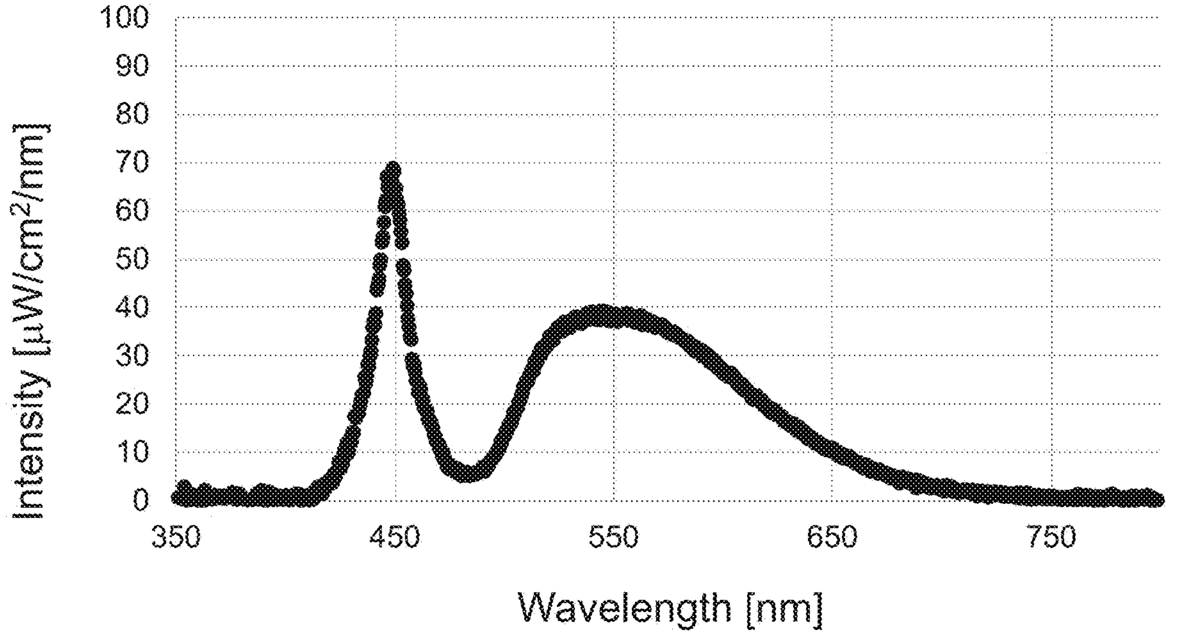

A representative example of a spectral content of a visible light suitable for the present embodiments is shown in FIG. 9A. A spectral content of a white LED is shown in FIG. 9B. As shown, in FIG. 9A most of the spectral energy is within the spectral range spanning from about 430 nm to about 470 nm, whereas in FIG. 9B, a significant portion of the spectral energy is delivered at longer wavelengths (500 nm and above).

It has also been unexpectedly discovered that some dyes in the modeling material may decompose or otherwise be modified chemically when the photobleaching process is executed at too elevated temperatures, or when the photobleaching process by itself elevate the temperature of the modeling material. In particular, the inventors found that magenta dye is substantially vulnerable to the photobleaching process, in particular when the photobleaching process is at a temperature which is above the heat deflection temperature (HDT) of modeling materials that include magenta dye (e.g., a modeling material comprising magenta, such as a black color).

Thus, according to some embodiments of the present invention the object is treated by exposing it to visible light as further detailed hereinabove and to a temperature of less than the HDT of the modeling material, more preferably to temperature that is at most 5° C. or at most 10° C. less than the HDT of the modeling material. Preferably, the temperature to which the object is exposed is higher than $T_{MIN}$ where $T_{MIN}$ is a predetermined parameter that is the larger among room temperature (e.g., 25° C.) and 20° C. less than the HDT. When the object is fabricated from two or more modeling materials, the photobleaching is at a temperature that is less (e.g., at least 5° C. less) than the HDT of the modeling material that has the lowest HDT value, or less than a weighted average HTD of the modeling materials used to fabricate said object.

The duration of the exposure to the visible light and temperature is preferably selected based on the extent of the desired effect. For example, in some embodiments of the present invention the duration of exposure is selected to reduce a yellowness index (YI) of the modeling material as calculated using the formula YI=100−Blue/[(Blue+Red+Green)/3]*100.

YI can alternatively be measured using a spectrophotometer according to the ASTM standard E 313.

In various exemplary embodiments of the invention the duration of exposure is selected to reduce YI by at least 5 units, more preferably at least 6 units, more preferably at least 7 units, more preferably at least 8 units, more preferably at least 9 units, more preferably at least 10 units.

YI can still alternatively be calculated using the formula $YI=100\times(C_X X-C_Z Z)/Y$, where $C_X$ and $C_Z$ are constants, and X, Y, Z are tristimulus values in the CIE XYZ color space. When the color of the modeling material is expressed in terms of other color spaces (e.g., CMYK) the respective color space can be transformed to the CIE XYZ color space by color transformation. Such color transformations are well known to those having ordinary skill in the art of printing. The values of the coefficients CX and CZ is in in accordance with the ASTM standard used for defining the YI. When the ASTM standard D-1925 is used, $C_X$ is about 1.28, $C_Z$ is about 1.06.

While it is generally desired to reduce the yellowness index of the modeling material, particularly for those parts of the object that are made of a generally transparent and colorless modeling material, it is preferred to maintain the color of colored parts of the object. In other words, it is preferred to have small color differences between the color of the colored parts after the exposure and the color of the colored parts before exposure.

Color difference is conveniently expressed herein by quantities which can be calculated using mathematical operations in the CIE (L*, a*, b*) color space. When the color of a colored region of the object is expressed in terms of other color spaces (e.g., CMYK or CIE XYZ) the color difference can be expressed in those color spaces, or, alternatively, the respective color space can be transformed to the CIE (L*, a*, b*) color space by a color transformation to allow the calculation of the color difference in this space. The CIE (L*, a*, b*) color space is commonly referred to as a "uniform" color space in that steps of equal size from one color point to another in the color space are perceived approximately as equal differences in color. Every color is treated as a point in the color space and represented by the triplet (L*, a*, b*), which can be measured, for example, by a spectrometer, such as, but not limited to, a spectrometer having the tradename Ci7860 commercially available from X-Rite, Michigan, USA.

The difference between two colors can be quantified using the Euclidian distance between the corresponding points in the color space. Formally, denoting the coordinates of two colors by ($L_1$*, $a_1$*, $b_2$*) and ($L_2$*, $a_2$*, $b_3$*), the difference between the two colors is given by:

$$\Delta E^* = \sqrt{(L_1^* - L_2^*)^2 + (a_1^* - a_2^*)^2 + (b_1^* - b_2^*)^2}$$

Using the above expression for ΔE*, the color difference between the color of a colored region after the exposure and the color of the same colored region before exposure can be expressed in terms of the so called "ΔE* unit." Thus, for example, the color difference between the two colors is said to be 1 ΔE* unit if the right hand side of the above expression for ΔE* is unity.

In some embodiments of the present invention one or more of the parameters of the photobleaching process (e.g., peak wavelength, temperature, duration) is selected such that for at least one colored region of the object, more preferably each colored region of the object, the color difference between the color of the colored region after the exposure and a color of the colored region before exposure is less than 2 ΔE* units.

In some embodiments of the present invention the duration of the photobleaching process is selected such that, following the treatment, the transparent modeling material from which the object is fabricated is characterized by a CIE Lightness value L* of at least 90, a CIE a* value of at least −0.35, and a CIE b* value of less than 2, or less than 1.5.

In any of the above embodiments, the one or more of the parameters of the photobleaching process can be selected manually by the operator and/or selected automatically and/or be predetermined and not selectable by the operator. For example, the peak wavelength of the light can be predetermined and not selectable by the operator (e.g., set at a value between 400 nm and 500 nm or between 420 nm and 480 nm), and at least one of the temperature and the duration of exposure be selected manually or automatically.

The selection of a parameter is preferably object-specific, so that one or more of the fabrication parameters of the object are used as input to select the respective parameter for the photobleaching process. Representative examples of fabrication parameters that can be used as input include, without limitation, the type of the modeling materials from which the object was fabricated, the HDT of the modeling materials from which the object was fabricated, the thermal conductivity of the modeling materials from which the object was fabricated, the geometry of the object (e.g., a thickness or a set of thicknesses along a direction, or along each of two or three directions), the amount (e.g., volume, weight) of each modeling material used for fabricating the object, the duration of exposure of the object to curing radiation (if employed), etc. It is appreciated that some fabrication parameters can be obtained from information pertaining to other fabrication parameters. For example, by receiving input pertaining to the type of the modeling material, the HDT and/or thermal conductivity of this material can be obtained, e.g., using lookup tables.

Once the fabrication parameter(s) are received the parameter(s) for the photobleaching process can be selected using a lookup table that associates fabrication parameters with parameters for photobleaching, or more preferably sets of fabrication parameters with sets of parameters for photobleaching. The lookup table can be used even when the actual fabrication parameters do exactly match the entries of the lookup table. In this case, the entry that best matches the actual fabrication parameters is selected and the parameters for photobleaching that correspond to the selected entry are extracted from the lookup table. The extracted parameters can be used in the photobleaching process. Alternatively the parameters to be used in the photobleaching can be calculated based on the extracted parameters, for example, by applying interpolation and/or scaling.

When the selection of the parameter(s) for the photobleaching is done automatically, it is preferably executed by receiving the fabrication parameters from the AM system (e.g., system 10 or 110), accessing a computer readable medium containing a lookup table that associates fabrication parameters with parameters for photobleaching, searching the lookup table for fabrication parameters matching the fabrication parameters received from the AM system, and extracting from the lookup table the respective parameters for the photobleaching process.

Figure 4:
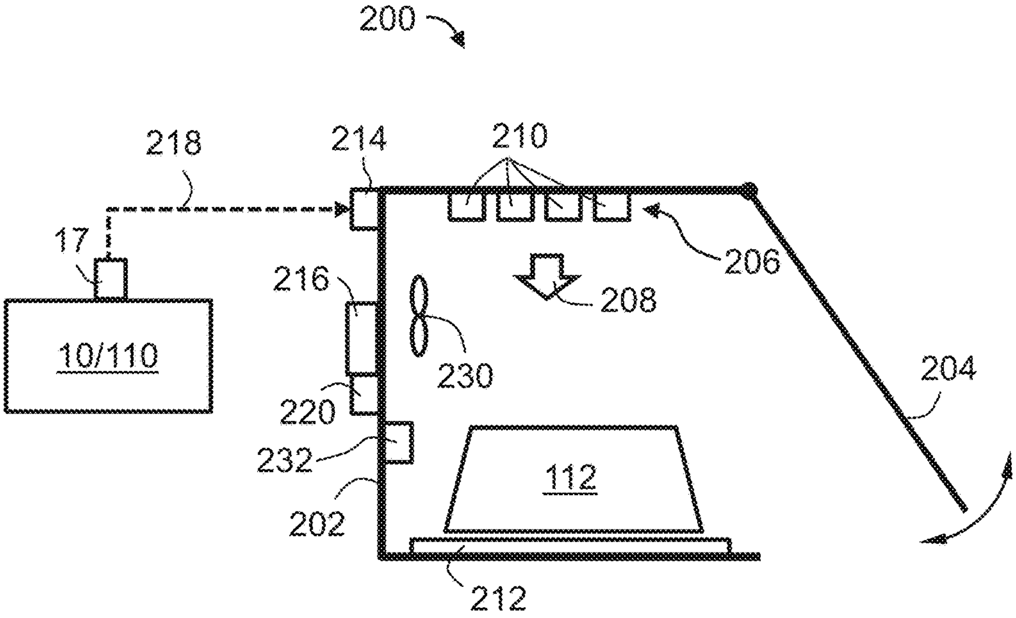
FIG. 4 is a schematic illustration of a system for treating an object fabricated from a modeling material by an additive manufacturing system, according to some embodiments of the present invention.

FIG. 4 is a schematic illustration of a system 200 for treating object 112 fabricated from a modeling material by an AM system, according to some embodiments of the present invention. The AM system can be any system that fabricates three-dimensional objects by additive manufacturing, such as, but not limited to, system 10 or 110 described above. System 200 comprises a treatment chamber 202 for receiving object 112. Typically, chamber 202 is provided with a door 204 for closing chamber after object 112 has been introduced into chamber 202. System 200 further comprises an illumination system 206 for generating light 208 to illuminate object 112. Typically, illumination system 206 comprises one or more light sources 210 for generating light 208. Light sources 210 can be of any type known in the art, such as, but not limited to, LED, OLED, mercury lamp, and the like. In some embodiments of the present invention the illumination system generates visible light having a peak wavelength less than 470 nm, as further detailed hereinabove. A spectrum of the light 208 with the desired peak wavelength can be ensured by selecting a light source having an emission spectrum with the desired peak wavelength, or by filtering light having broader spectrum using a filter having a transmission spectrum with the desired peak wavelength. The location of light sources 210 within chamber 202 may vary, but they are preferably located at the top internal surface and/or at the corners of chamber 202. In some embodiments, one or more strips of LEDs are used (e.g., strips of white and/or blue LEDs).

System 200 optionally and preferably also comprises a heating system 212 for heating object 112 and/or the interior of chamber 202. FIG. 4 illustrates an embodiment in which heating system 212 is at the bottom of chamber 202 and arranged for heating object 112 from below. However, this need not necessarily be the case, since some embodiments of the present invention contemplate placing heating system 212 at other parts of chamber 202 (e.g., on one or more of the side walls, and/or the top). Further, the present embodiments contemplate a heating system with a plurality of heating elements, in which case the heating elements can either be placed at one location or distributed within chamber 202 (e.g., on its walls, bottom and/or top). In some embodiments, system 200 comprises a cooling system 230 (e.g., one or more fans), and/or one or more temperature sensors 232 (e.g., IR sensors) for closed-loop temperature monitoring of object 112 and/or chamber 202.

In some embodiments of the present invention system 200 comprises an input 214 having a circuit configured for receiving a set of fabrication parameters corresponding to the fabrication of the object by the AM system. Input 214 can, for example, comprise a user interface, such as, but not limited to, a keyboard or a touch screen. Input 214 can alternatively comprise a communication system configured for communicating with a remote user interface (not shown), and can receive signals from the remote user interface pertaining to the set of fabrication parameters. The remote user interface can be of any type known in the art. For example, the remote user interface can be selected from a group consisting of a mobile phone, a tablet computer, a notebook computer and the like. Input 214 can in some embodiments of the present invention comprise a communication system configured for communicating directly with the AM system 10/110, in which case the AM system also comprises a communication system 17 (see also FIGS. 1A and 1B) configured to communicate with input 214. In these embodiments, the controller or the data processor of the AM system provides the set of fabrication parameters to communication system 17 for transmission to input 214.

The communication between input 214 and the remote interface and/or communication system 17 of the AM system can be wired communication via a cable 218, or wireless communication, for example, via near field wireless communication technology (e.g., Bluetooth, WiFi, etc.).

System 200 preferably comprises a computerized controller 216 having a circuit configured for receiving the set of fabrication parameters from input 214 (whether input 214 is a user interface or a communication system that receives the fabrication parameters from a remote user interface or directly from the AM system). Optionally and preferably, the circuit of controller 216 is also configured for operating illumination system 210 and heating system 212 based on the set of fabrication parameters. Typically, but not necessarily, controller 216 accesses a computer readable medium 220 that stores information sufficient for controller 216 to determine the parameters of the photobleaching process based on the set of fabrication parameters received via input 214. Controller 216 then operates illumination system 210 and heating system 212 according to the determined parameters of the photobleaching process.

The present embodiments contemplate many types of information to be stored in medium 220. Preferably, the information is in the form of a lookup table that associates fabrication parameters with parameters for photobleaching, as further detailed hereinabove. For example, when the set of fabrication parameters comprises a type of the modeling material, medium 220 can contain HDT data, e.g., in the form of a lookup table having a plurality of entries each including a type of modeling material and an HDT value corresponding to the type of the modeling material of the entry. In this case, the type of modeling material is a fabrication parameter and the HDT value is a parameter for photobleaching. Controller 216 can then search the HDT data, extract the HDT value that correspond to the type of the modeling material received via input 214, and control heating system 212 to maintain in the chamber a temperature that is less than the HDT value as further detailed hereinabove. Alternatively, the set of fabrication parameters received via input 214 can already include the HDT value, in which case computerized controller 216 can control heating system 212 to maintain a temperature less than HDT value without searching medium 220.

When the set of fabrication parameters comprises a type of the modeling material, medium 220 can also contain thermal conductivity data, e.g., in the form of a lookup table having a plurality of entries each including a type of modeling material and a thermal conductivity value corresponding to the type of the modeling material of the entry. Controller 216 can then search the thermal conductivity data, extract the thermal conductivity value that correspond to the type of the modeling material received via input 214, and control the duration over which systems 210 and 212 operate based on the thermal conductivity value. Medium 220 can contain another lookup table that associates thermal conductivity with duration, and controller 216 can select the proper duration by searching this lookup table. Alternatively, medium 220 can contain a lookup table that associates the type of modeling material with the duration, in which case controller 216 can select the duration based on the type of modeling material without determining the thermal conductivity. Still alternatively, the set of fabrication parameters received via input 214 can already include the thermal conductivity value, in which case computerized controller 216 can use a lookup table that associates thermal conductivity with duration, to determine the proper duration without determining the type of modeling material.

When the set of fabrication parameters comprises a geometrical parameter describing the object, controller 216 selects the duration of the exposure based on the geometrical parameter. This is optionally and preferably done using the information in medium 216. For example, medium 220 can contain a lookup table having a plurality of entries each including geometrical information and a duration value corresponding to the geometrical information of the entry. The lookup table can include a different geometrical parameter per entry or a different set of geometrical parameters per entry. For example, the lookup table can include a first plurality of entries pertaining to different shapes, a second plurality of entries pertaining to different volumes, a third plurality of entries pertaining to different thicknesses, etc., or, alternatively, the lookup table can include a plurality of entries each pertaining to a different combination of shape, volume and thickness.

The set of fabrication parameters can also comprise the type and/or concentration of photoinitiator used in the fabrication. In this case, controller 216 can control the duration over which systems 210 and 212 operate based on the type and/or concentration of photoinitiator. Medium 220 can contain a lookup table that associates type and/or concentration of the photoinitiator with duration, and controller 216 can select the proper duration by searching this lookup table.

Any combination of the above types of information is contemplated. For example, in a preferred embodiment, an a priori collection of possible fabrication scenarios is used for defining the lookup table in medium 220, so that each entry corresponds to one fabrication scenario and associates this fabrication scenario to a set of parameters for the photobleaching process. For example, an entry in the lookup table can include a set of fabrication parameters selected from the group consisting of type of modeling material, geometry, HDT, thermal conductivity, and a corresponding set of parameters for the photobleaching process (e.g., temperature, duration).

A comparative study was performed to investigate the ability of a photobleaching process such as described in U.S. Provisional Patent Application No. 63/094,712, and in co-filed PCT International Patent Application entitled "METHOD AND SYSTEM FOR TREATING ADDITIVE MANUFACTURED OBJECT", both by the present assignee, to bleach an object fabricated by AM, from a transparent formulation which comprises a thioether material, as described herein for Ex. Formulations I, II and III, which included TPO as the photoinitiator, at concentration of 0.8%, and which was characterized by HDT estimated at 45° C.-48° C.

In one experiment, objects 40×40 in lateral dimension and 5 mm in height, were fabricated by 3D inkjet printing, and were placed in various storage conditions for at least 24 hours. The objects were fabricated together with other objects, 15 mm in height (which were not used in this experiment) so as to expose the 5 mm height objects to excessive amount of UV light (until the 15 mm objects were completed). Four storage conditions were tested: (i) white light (white lamp 45 W and light temperature of 6500K) and room temperature (about 25° C.), (ii) blue light and temperature of 45° C., (iii) temperature of 45° C. in dark conditions, and (iv) room conditions and white fluorescent lamp. For each storage condition, the YI was calculated as a function of the storage time. The YI was calculated as follows.

Images of a pair of printed parts, were captured using a digital camera (Canon, PowerShot A650 IS). The images were then analyzed using ImageJ, and RGB values were extracted. The yellow index was calculated according to the formula $$\text{Yellow Index} = 100 - \text{Blue}/[(\text{Blue} + \text{Red} + \text{Green})/3] * 100,$$

where Blue, Red and Green are the intensities of the respective colors, as obtained by image processing.

Figure 5:
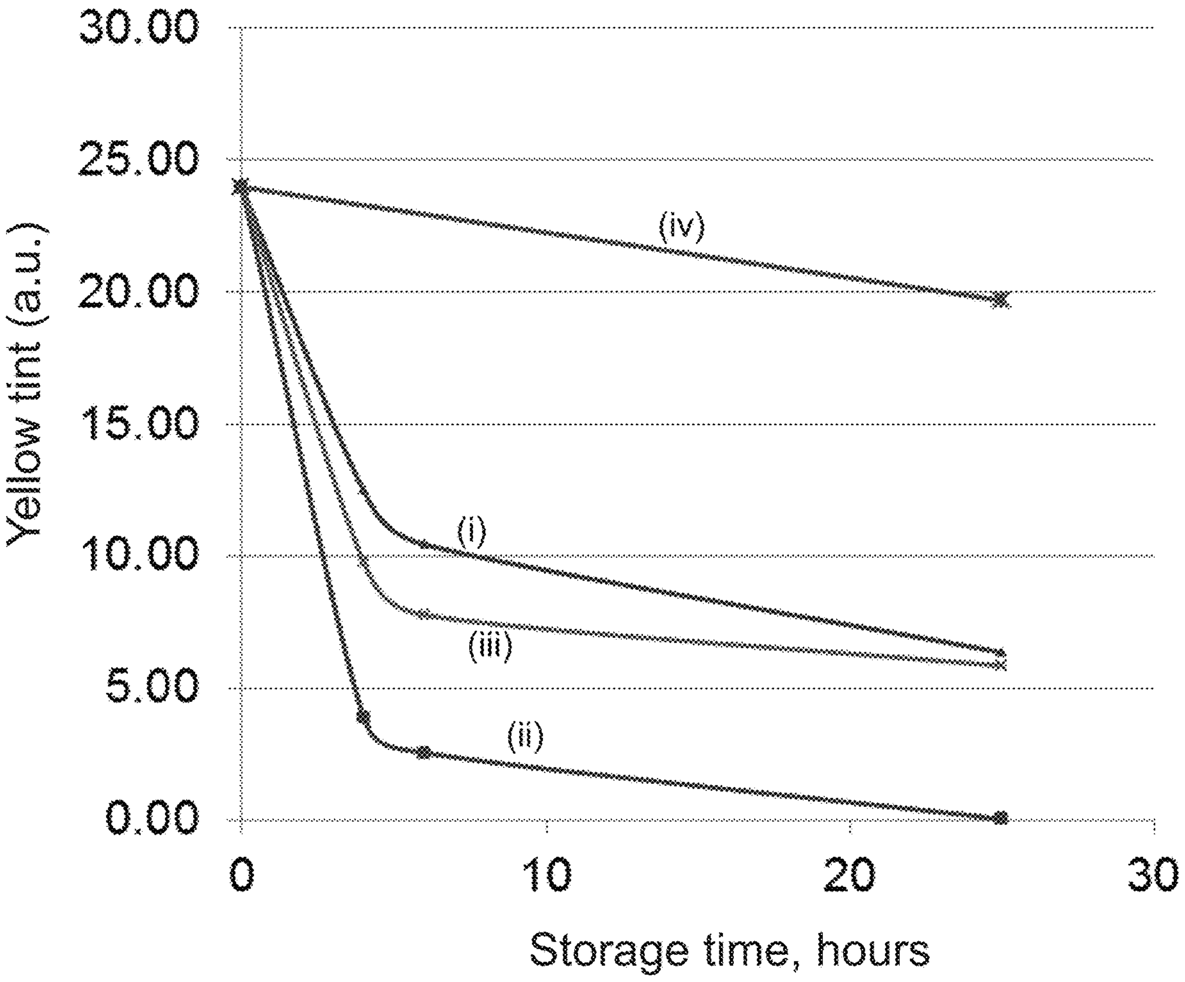
FIG. 5 shows yellowness index as a function of time, obtained during an experiment performed according to some embodiments of the present invention, in to investigate the effect of storage on the yellowness index.

The results are shown in FIG. 5. As shown, the fastest reduction in YI was for storage condition (ii).

Figure 6:
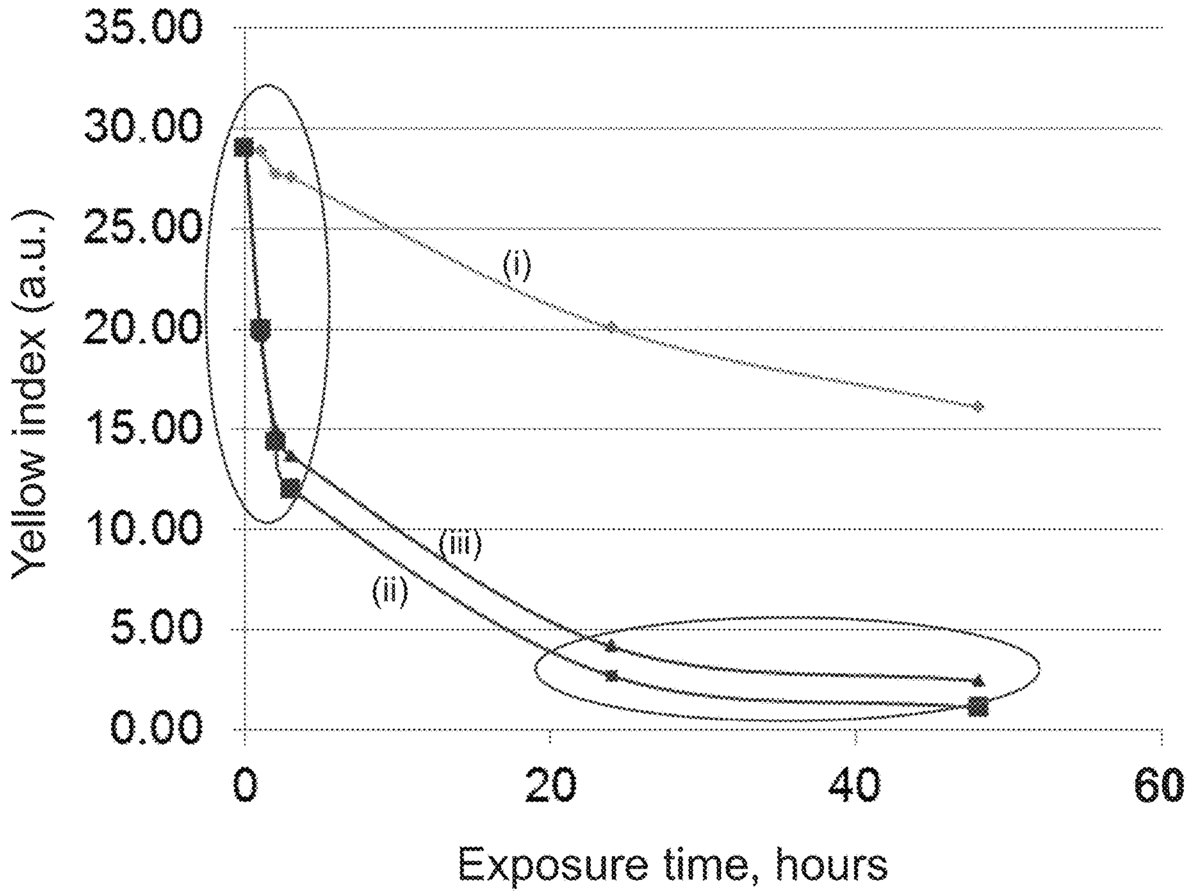
FIG. 6 shows yellowness index as a function of time, obtained during another experiment performed according to some embodiments of the present invention to investigate the effect of different lighting scenarios on the yellowness index.

In another experiment, objects, 10 mm in height and 40 mm×40 mm in lateral dimensions, were fabricated by 3D inkjet printing, and were exposed to light in different lighting scenarios. Three lighting scenarios were tested: (i) fluorescent white light in the laboratory, (ii) white light illumination in an illumination chamber maintained at 40° C., and (iii) illumination using a white lamp 45 W and light temperature of 6500K on a table maintained at a temperature of 40° C. For each scenario, the YI was calculated as a function of the illumination time, as done for the previous experiment. The results are shown in FIG. 6. As shown, the fastest reduction in YI was for illumination scenario (ii).

Figure 7:
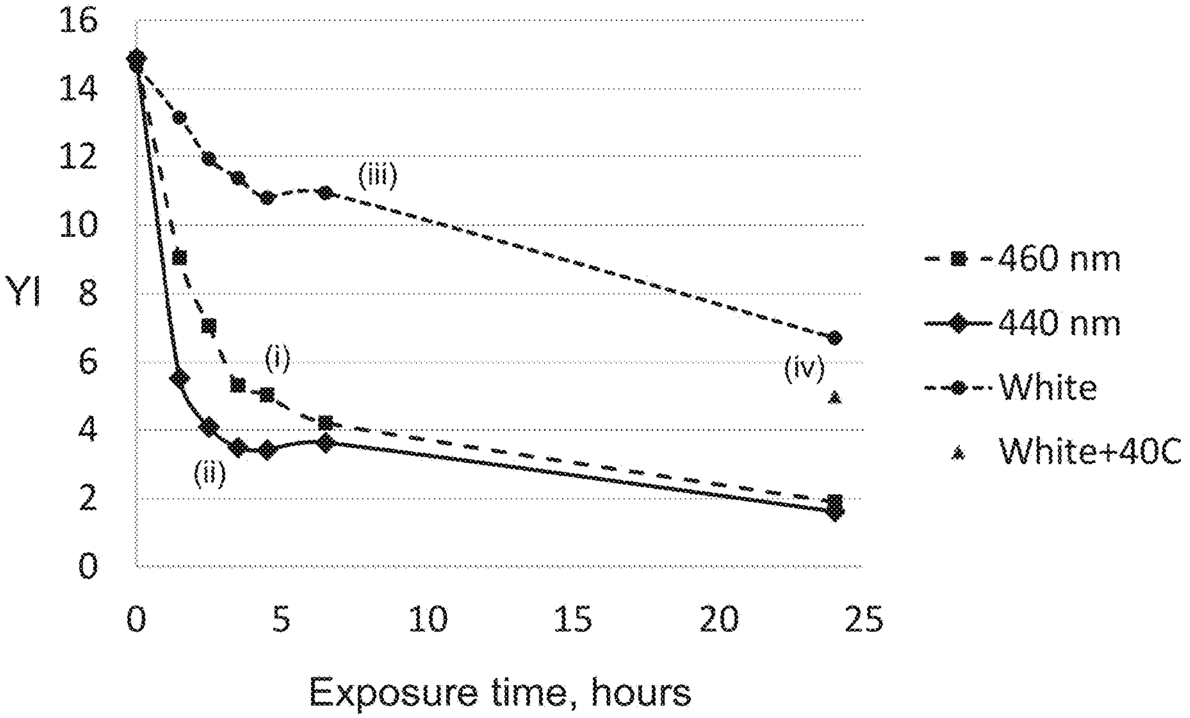
FIG. 7 shows yellowness index as a function of time, obtained during another experiment performed according to some embodiments of the present invention to investigate the effect of light spectrum on the yellowness index.

In an additional experiment, the effect of the light spectrum was investigated. Objects, 10 mm in height and 40 mm×40 mm in lateral dimensions, were fabricated by 3D inkjet printing, and were exposed to light at different spectra. Four lighting scenarios were tested: (i) light having a peak wavelength of 460 nm at room temperature (25° C.), (ii) light having a peak wavelength of 440 nm at room temperature (25° C.), (iii) white flood lamp (100 W, light temperature—6500K) at room temperature (25° C.), and (iv) white flood lamp (100 W, light temperature—6500K) at temperature of 40° C. For each scenario, the YI was measured using a benchtop spectrophotometer (CI76600), according to ASTM E-313, as a function of the illumination time. The results are shown in FIG. 7. As shown, the fastest reduction in YI was for illumination scenario (ii). FIG. 7 does not contain a trend line since in lighting scenario (iv), a single measurement was taken at end of the experiment.

Table A, below summarizes results of an experiment in which ten objects, 1 mm in height and 40 mm×40 mm in lateral dimensions, which were fabricated by 3D inkjet printing, were exposed to a photobleaching process at room temperature and white light generated by a flood lamp 100 W LED 6500K system. Shown in Table A are the colors of each of the objects, before treatment, and after 1 hour and 6 hours of exposure to the light. The colors are expressed in the CIE (L*, a*, b*) color space. Also shown is the color difference ΔE relative to the color before treatment. Table A demonstrates that use of white light for photobleaching results in a significant change in color for many of the samples after 6 hours of treatment.

TABLE A

| | before | | | after 1 hr photobleaching | | | | after 6 hr photobleaching | | | |
|---|---|---|---|---|---|---|---|---|---|---|---|
| # | L | a | b | L | a | b | ΔE | L | a | b | ΔE |
| 1 | 82.5 | −2.29 | −5.73 | 82.7 | −2.32 | −6.17 | 0.48 | 85.8 | −1.64 | −4.74 | 3.43 |
| 2 | 70.0 | −4.51 | −4.53 | 70.2 | −4.58 | −4.67 | 0.20 | 71.6 | −4.58 | −3.89 | 1.70 |
| 3 | 48.4 | −4.2 | −6.63 | 48.3 | −4.19 | −6.84 | 0.21 | 48.7 | −4.33 | −6.98 | 0.49 |
| 4 | 29.6 | −2.93 | −2.92 | 29.9 | −2.91 | −3.07 | 0.35 | 29.7 | −3.1 | −3.22 | 0.36 |
| 5 | 70.6 | −1.4 | 2.14 | 70.8 | −1.42 | 2.2 | 0.21 | 72.3 | −0.95 | 3.05 | 1.92 |
| 6 | 83.5 | −3.83 | −4.27 | 83.8 | −3.79 | −4.68 | 0.48 | 87.0 | −3.6 | −3.29 | 3.61 |
| 7 | 79.7 | −1.84 | −6.43 | 80.1 | −1.75 | −6.78 | 0.54 | 82.6 | −1.24 | −5.87 | 3.01 |
| 8 | 59.3 | −4.99 | −5.93 | 59.4 | −4.9 | −6.07 | 0.22 | 60.2 | −5.06 | −5.67 | 0.92 |
| 9 | 36.1 | −3.78 | −5.92 | 36.4 | −3.8 | −5.97 | 0.28 | 36.5 | −3.03 | −6.2 | 0.88 |
| 10 | 76.7 | −1.68 | 0.9 | 77.3 | −1.7 | 0.89 | 0.60 | 79.1 | −0.75 | 2.62 | 3.15 |

Table B, below summarizes results of an experiment which is similar to the experiment summarized in Table B, except that a higher dose of 460 nm LED light was used (100 W in this experiment).

TABLE B

| | before | | | after 1 hr photobleaching | | | | after 6 hr photobleaching | | | |
|---|---|---|---|---|---|---|---|---|---|---|---|
| # | L | a | b | L | a | b | ΔE | L | a | b | ΔE |
| 1 | 83.5 | −2.07 | −5.21 | 85.3 | −1.75 | −6.45 | 2.19 | 88.1 | −1.04 | −5.99 | 4.77 |
| 2 | 70.1 | −4.47 | −4.03 | 71.4 | −4.32 | −4.65 | 1.45 | 72.6 | −3 | −7.19 | 4.29 |
| 3 | 48.4 | −4.45 | −6.46 | 49.3 | −4.26 | −7.38 | 1.28 | 49.6 | −2.52 | −11.29 | 5.34 |
| 4 | 29.7 | −3.65 | −2.57 | 30.8 | −4.01 | −3.11 | 1.22 | 30.9 | −3.73 | −4.97 | 2.66 |
| 5 | 70.4 | −0.82 | 2.61 | 71.6 | −0.31 | 2.43 | 1.33 | 73.0 | 1.32 | 0 | 4.27 |
| 6 | 84.1 | −3.69 | −3.95 | 85.7 | −3.61 | −4.92 | 1.92 | 90.3 | −3.06 | −3.31 | 6.26 |
| 7 | 79.7 | −1.76 | −6.31 | 81.9 | −1.38 | −7.22 | 2.35 | 84.7 | 0.06 | −6.52 | 5.33 |
| 8 | 59.0 | −4.82 | −6.3 | 60.1 | −4.53 | −7.33 | 1.49 | 60.6 | −2.77 | −11.68 | 5.96 |
| 9 | 36.0 | −3.5 | −6.06 | 36.8 | −3.4 | −6.95 | 1.22 | 37.2 | −2.14 | −9.98 | 4.33 |
| 10 | 76.9 | −1.42 | 1.24 | 78.9 | −0.9 | 1.35 | 2.11 | 81.5 | 1.38 | 0.28 | 5.49 |

Table B demonstrates that a high dose of 460 nm LED light also results in a significant change in color after 6 hours of treatment.

Figure 8:
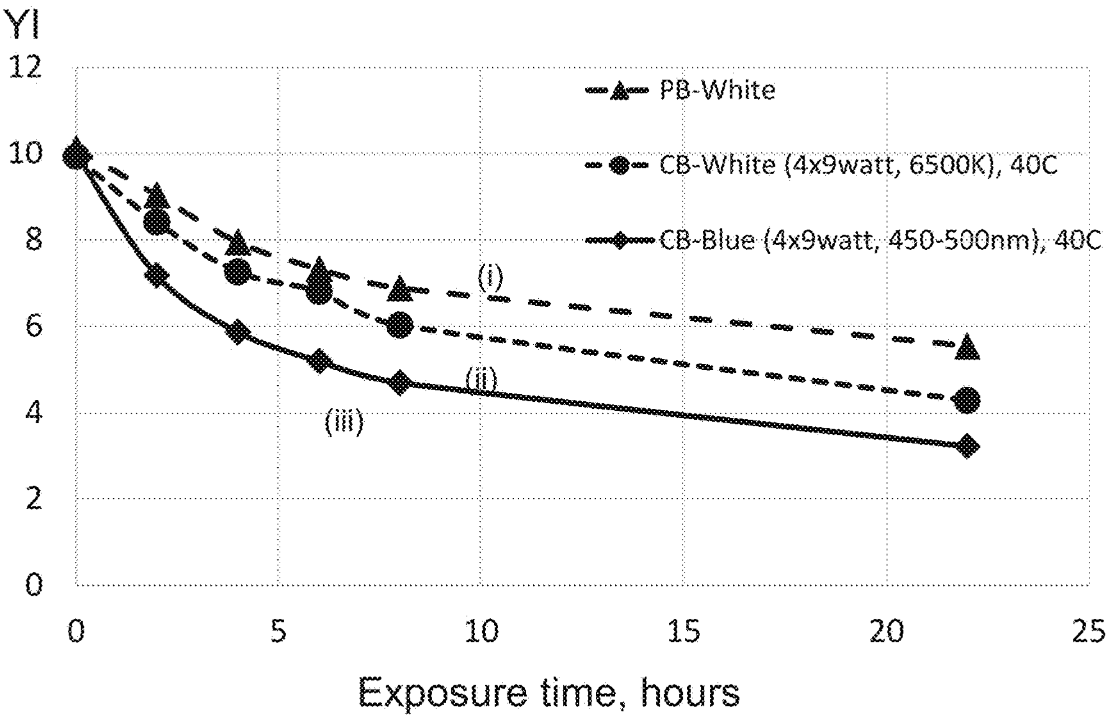
FIG. 8 shows yellowness index as a function of time, obtained during an additional experiment performed according to some embodiments of the present invention, to compare between the effects of white and blue light on the yellowness index.

FIG. 8 shows the reduction in YI for (i) photobleaching at room temperature and a flood lamp 100 W white light, (ii) photobleaching at a temperature of 40° C. and white LED light using four 9 W 6500 K LEDs, and (iii) photobleaching at a temperature of 40° C. and blue LED light using four 9 W LEDs emitting light with peak wavelength between 450 nm and 500 nm. As shown, the highest change in YI was for photobleaching process (iii). Tables C and D below summarize the color changes for photobleaching processes (iii) and (i), respectively, for ten objects, 1 mm in height and 40 mm×40 mm in lateral dimensions, which were fabricated by 3D inkjet printing.

Tables C and D, and FIG. 8 demonstrate that photobleaching process (iii) successfully achieves significant reduction of the YI, while maintaining a small change in the colors of the object (Table C). In comparison, photobleaching process (i) also maintains a small change in the colors of the object (Table D), but is less adequate for reducing the YI.

TABLE C

| | before photobleaching | | | after 22 hr photobleaching | | | |
|---|---|---|---|---|---|---|---|
| # | L | a | b | L | a | b | ΔE |
| 1 | 84.03 | −0.14 | 0.2 | 85.02 | 0.02 | −1.23 | 1.75 |
| 2 | 29.22 | −1.87 | −2.02 | 29.27 | −1.86 | −2.36 | 0.34 |
| 3 | 29.54 | −0.84 | −0.72 | 29.81 | −0.74 | −1.03 | 0.42 |
| 4 | 33.26 | −1.09 | 1.05 | 33.71 | −0.8 | 0.65 | 0.67 |
| 5 | 39.42 | −0.13 | 1.63 | 39.68 | 0.31 | 1.02 | 0.80 |
| 6 | 40.35 | −0.58 | −2.59 | 40.59 | −0.29 | −3.07 | 0.61 |
| 7 | 74.27 | −0.45 | 9.58 | 74.59 | 0.41 | 8.31 | 1.57 |
| 8 | 63.6 | −1.6 | 3.08 | 64.01 | −1.03 | 1.92 | 1.36 |
| 9 | 68.83 | −1.36 | 12.56 | 69.21 | −0.33 | 10.83 | 2.05 |
| 10 | 71.78 | −2.21 | 2.46 | 72.28 | −1.52 | 0.87 | 1.80 |
| 11 | 71.48 | 1.23 | 6.16 | 71.74 | 1.71 | 5.55 | 0.82 |
| 12 | 77.5 | −3.04 | −0.11 | 78.88 | −2.9 | −2.7 | 2.94 |
| 13 | 45.82 | −25.77 | −32.23 | 47.07 | −23.44 | −36.14 | 4.72 |
| 14 | 39.49 | 48.74 | 8.06 | 40.33 | 50.04 | 6.31 | 2.34 |
| 15 | 70.78 | −0.02 | 76.34 | 72.2 | 0.22 | 78.81 | 2.86 |

TABLE D

| | before photobleaching | | | after 22 hr photobleaching | | | |
|---|---|---|---|---|---|---|---|
| # | L | a | b | L | a | b | ΔE |
| 1 | 83.57 | 0.26 | −0.92 | 85.28 | 0.14 | −0.35 | 1.81 |
| 2 | 29.24 | −1.75 | −2.25 | 29.23 | −1.99 | −2.3 | 0.25 |
| 3 | 28.08 | −0.95 | −0.92 | 29.67 | −0.78 | −0.84 | 1.60 |
| 4 | 33.05 | −0.97 | 0.94 | 33.49 | −0.91 | 0.77 | 0.48 |
| 5 | 39.57 | 0.08 | 1.88 | 39.46 | 0.21 | 1.64 | 0.29 |
| 6 | 40.46 | −0.59 | −2.68 | 40.54 | −0.41 | −3.16 | 0.52 |
| 7 | 74.26 | −0.62 | 9.9 | 74.61 | −0.03 | 9.66 | 0.73 |
| 8 | 63.81 | −1.03 | 3.26 | 64.11 | −1.33 | 2.94 | 0.53 |
| 9 | 68.23 | 0.41 | 10.4 | 69.38 | −0.55 | 11.88 | 2.11 |
| 10 | 71.91 | −2.15 | 2.17 | 72.44 | −1.92 | 2.22 | 0.58 |
| 11 | 71.24 | 1.79 | 5.09 | 71.56 | 1.8 | 5.76 | 0.74 |
| 12 | 77.64 | −2.88 | −0.03 | 79.1 | −2.89 | −2.03 | 2.48 |
| 13 | 46.22 | −26.08 | −31.68 | 46.95 | −24.36 | −35.73 | 4.46 |
| 14 | 40.23 | 49.05 | 9.38 | 40.2 | 50.06 | 7.01 | 2.58 |
| 15 | 71.35 | 0.22 | 76.59 | 72.21 | −0.47 | 78.77 | 2.44 |

The effect of the photobleaching process on the mechanical properties of the object was also studied. The results for exposure duration of 24 hours are summarized in Table E, below, demonstrating improved mechanical properties after applying a photobleaching processes (i)-(iii) as described in FIG. 8.

By "flexural strength" or "flexural stress" it is meant the stress in a material just before it yields in a flexure test. Flexural stress may be determined, for example, according to ASTM D-790-03.

By "flexural modulus" or "flexural Y. modulus" it is meant the ratio of stress to strain in flexural deformation, which is determined from the slope of a stress-strain curve produced by a flexural test such as the ASTM D790. Flexural modulus may be determined, for example, according to ASTM D-790-04.

TABLE E

| | White Flood lamp 100 W (6500K), Room Temp Process (i) | White LED strips (4 × 9 W), 6500K 40 C. Process (ii) | Blue LED strips (450-500 nm 4 × 9 W), 40 C. Process (iii) |
|---|---|---|---|
| Flexural Y. Modulus (MPa) | 1287 ± 23 | 1294 ± 42 | 1440 ± 91 |
| Flexural Stress (MPa) | 45.2 ± 0.1 | 45 ± 0.5 | 51.6 ± 1 |
| HDT (° C.) | 45.5 ± 0.2 | 46.4 ± 0.1 | 45.9 ± 0.04 |

Example 5

Mechanical, Physical and Optical Properties of Printed Objects

Optical Properties:

Transmittance, Yellowness Index (YI) and L*a*b* values of objects made using the transparent formulations as described herein and using a system equipped with LED-UV curing (e.g., a system referred to as Stratasys J55 system) were measured.

Cubic objects, 40×40×6 mm were printed as described herein, using Ex. Formulations I, II, III and IV, compared to Ref. Formulation I and to Perspex (PMMA).

Transmittance, as % of light that passes through the object, was measured using X-Rite Ci7860 device.

Yellowness Index was determined according to ASTM D1925.

For quantitative color measurements, the X-Rite measurement technique using the CIE Color Systems (based on the CIE L*a*b* color scale, wherein L* defines lightness, a* denotes the red/green value and b* the yellow/blue value), was used. The standard illuminant applied for color measurements was daylight.

The data obtained in these measurements, mentioned above, after post-treatment as described in Example 4 hereinabove, is presented in Table 5 below. Values are provided for the 6 mm-face.

TABLE 5

| Formulation | Transmittance (%) | Yellow Index |
|---|---|---|
| PMMA | 91 | 0.6 |
| Ref. Formulation I | 83 | −1.8 |
| Ex. Formulation I | 82 | 4.3 |
| Ex. Formulation II | 77 | 5.2 |
| Ex. Formulation III | 89 | 2.9 |
| Ex. Formulation IV | 78 | 3.2 |

As can be seen, objects made of the transparent formulations of the present embodiments exhibit optical features which are the closer to Perspex (PMMA), compared with, for example, the commercially available Ref. Formulation I, and particularly exhibit a substantially low YI, and substantially high transmittance.

FIG. 10 presents a photograph of exemplary objects made using Ref. Formulation I formulation (left), Ref. Formulation III (a dual component object as described herein; right) and the same exemplary objects made using Ex. Formulation II. Objects were printed on a Stratasys J826-LED system, and demonstrate the advantageous transparency and nullified hue obtained using a transparent formulation according to the present embodiments as a single component formulation system.

FIG. 11 presents a photograph of an exemplary object made using Ref. Formulation I (bottom) and Ex. Formulation III (top), when printed on a Stratasys J55 system, showing the improved performance of a formulation according to the present embodiments.

Physical and Mechanical Properties:

Table 6 below presents the properties of objects made of the exemplary formulations shown in Tables 3A, 3B, 3C and 4, compared to Reference formulation I, using Stratasys J55 system, after subjecting the printed objects to photobleaching as described herein in Example 4.

As shown in Table 6, the objects made using the transparent formulations as described herein do not exhibit a substantial change in their properties compared to the reference formulation, with the maximal change being of less than 35% (for tensile strength).

TABLE 6

| Property | Method | Ex. Form. I | Ex. Form. II | Ex. Form. III | Ex. Form. IV | Ref. Form. I |
|---|---|---|---|---|---|---|
| Izod impact (J/m) | ASTM D256 | 35-40 | 35-40 | 20-30 | 35-45 | 20-30 |
| HDT (° C.) | ASTM D648 | 45-50 | 45-50 | 45-50 | 50-55 | 45-50 |
| Tensile Strength (MPa) | ASTM D638 | 35-45 | 35-45 | 26-37 | 45-55 | 50-65 |
| Elongation at break (%) | ASTM D638 | 35-55 | 30-55 | 45-62 | 4-20 | 10-25 |
| Tensile modulus (MPa) | ASTM D638 | 1800-2300 | 1800-2500 | 1500-2000 | 2800-3000 | 2000-3000 |
| Flexural strength (MPa) | ASTM D790 | 60-62 | 59-61 | 48-61 | 80-85 | 75-110 |
| Flexural Modulus (MPa) | ASTM D790 | 1900-2100 | 1800-2000 | 1300-1800 | 2400-2700 | 2200-3200 |

Overall these data show that while a substantial change in optical properties is achieved using the transparent formulations of the present embodiments, no substantial change in other properties is observed.

In addition, all formulations were shown to meet jettability requirements (determined, for example, by recording the jetting pattern using a fast camera and analytical weight, and by using, for example, a jetting station which test jetting parameters relevant to the printing process, the jetting is recorded using a fast camera and analytical weight), and exhibited low or reasonable tackiness (determined empirically).

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A curable formulation comprising one or more curable materials, at least one thioether and optionally one or more non-curable materials, wherein said thioether comprises at least two hydrocarbon chains of at least 8 carbon atoms in length and further comprises at least one curable group, wherein an amount of said thioether ranges from 1 to 7% by weight of the total weight of the formulation, and wherein said one or more curable materials comprise at least one multi-functional (meth)acrylate featuring Tg higher than 150° C.

2. The curable formulation of claim 1, wherein a total amount of said one or more curable materials ranges from 85% to 95% by weight of the total weight of the formulation.

3. The curable formulation of claim 1, being a transparent formulation which provides, when hardened, a material that features light transmittance higher than 70%.

4. The curable formulation of claim 1, being a photocurable formulation and further comprising a photoinitiator which is activated upon absorbing light at a wavelength higher than 380 nm.

5. The curable formulation of claim 4, wherein a total amount of said photoinitiator is no more than 3% by weight, of the total weight of the formulation.

6. The formulation of claim 4, wherein said photoinitiator comprises a phosphine oxide-type photoinitiator.

7. The curable formulation of claim 1, wherein said thioether further comprises at least one carboxylate or thiocarboxylate group(s).

8. The curable formulation of claim 1, wherein said one or more curable materials comprise:

at least one aliphatic or alicyclic mono-functional (meth) acrylate material featuring a molecular weight lower than 500 grams/mol, in a total amount of from 10 to 60% by weight of the total weight of the formulation; and/or at least one aromatic mono-functional (meth)acrylate material, in a total amount of from 5 to 15% by weight of the total weight of the formulation; and/or at least one multi-functional (meth)acrylate material, in a total amount of from 30 to 60% by weight of the total weight of the formulation; and/or at least one multi-functional urethane acrylate that features a molecular weight higher than 1000 grams/mol, in a total amount that ranges from 15 to 40% by weight of the total weight of the formulation; and/or at least one multi-functional epoxy (meth)acrylate material.

9. The curable formulation of claim 1, wherein an amount of said at least one multi-functional (meth)acrylate featuring said Tg higher than 150° C. ranges from 3% to 15% by weight of the total weight of the formulation.

10. The curable formulation of claim 1, wherein said multi-functional (meth)acrylate featuring Tg higher than 150° C. is an isocyanurate-containing material or an aliphatic or alicyclic material.

11. The curable formulation of claim 1, wherein said multi-functional (meth)acrylate featuring Tg higher than 150° C. features a molecular weight lower 550 grams/mol.

12. A photocurable formulation comprising:

at least one photoinitiator in a total amount of no more than 3% by weight of the total weight of the formulation;

at least one mono-functional (meth)acrylate material featuring a molecular weight lower than 500 grams/mol, in a total amount of from 50 to 70% by weight of the total weight of the formulation;

at least two multi-functional (meth)acrylic materials, in a total amount of from 30 to 50% by weight of the total weight of the formulation, wherein at least one of said multi-functional (meth)acrylic materials features Tg higher than 100° C. and features a volume shrinkage lower than 15% and/or comprises a cyanurate moiety, and at least one another of said multi-functional (meth) acrylic materials is an ethoxylated multifunctional (meth)acrylate material which features a molecular weight of above 1000 grams/mol, and Tg lower than 20° C.

13. The photocurable formulation of claim 12, wherein:

an amount of said multi-functional (meth)acrylic material that features Tg higher than 100° C. ranges from 1 to 5% by weight of the total weight of the formulation; and/or an amount of said ethoxylated multifunctional (meth) acrylate material which features Tg lower than 20° C. ranges from 3 to 10% by weight, of the total weight of the formulation; and/or said at least one mono-functional (meth)acrylate material comprises at least one aliphatic or alicyclic (non-aromatic) mono-functional (meth)acrylate material, in an amount of from 50 to 60% by weight of the total weight of the formulation; and at least one aromatic mono-functional (meth)acrylate material in an amount of from 5 to 10%, by weight, of the total weight of the formulation; and/or said multi-functional (meth)acrylate materials further comprise at least one multi-functional urethane acrylate that features a molecular weight higher than 1000 grams/mol, in an amount that ranges from 10 to 20% by weight of the total weight of the formulation; and/or said multi-functional (meth)acrylate materials further comprise at least one multi-functional urethane acrylate that features a molecular weight higher than 1000 grams/mol, in an amount that ranges from 10 to 20% by weight of the total weight of the formulation; and/or said multi-functional (meth)acrylate materials further comprise at least one multi-functional epoxy (meth) acrylate material, in an amount that ranges from 10 to 20% by weight of the total weight of the formulation.

14. The photocurable formulation of claim 12, wherein said at least one photoinitiator comprises a phosphine oxide-type photoinitiator, which is activated by radiation at a wavelength of at least 380 nm.

15. A method of additive manufacturing a three-dimensional object that comprises in at least a portion thereof a transparent material, the method comprising sequentially forming a plurality of layers in a configured pattern corresponding to the shape of the object, thereby forming the object, wherein the formation of each of at least a few of said layers comprises dispensing at least one formulation, and exposing the dispensed formulation to a curing condition to thereby form a cured modeling material, wherein said at least one formulation is the curable or photocurable formulation according to claim 1.

16. The method of claim 15, wherein said curing condition comprises electromagnetic irradiation and said electromagnetic irradiation is from a LED source.

17. The method of claim 15, wherein said curing condition comprises UV irradiation, and wherein a dose of said UV irradiation is higher than 0.1 $J/cm^2$ per layer.

18. The method of claim 15, further comprising, subsequent to exposing to said curing condition, exposing the object to a condition that promotes decomposition of a residual amount of said photoinitiator (photobleaching).

19. A method of additive manufacturing a three-dimensional object that comprises in at least a portion thereof a transparent material, the method comprising sequentially forming a plurality of layers in a configured pattern corresponding to the shape of the object, thereby forming the object, wherein the formation of each of at least a few of said layers comprises dispensing at least one formulation, and exposing the dispensed formulation to a curing condition to thereby form a cured modeling material, wherein said at least one formulation is the curable or photocurable formulation according to claim 12.

20. The method of claim 19, wherein said curing condition comprises electromagnetic irradiation and said electromagnetic irradiation is from a LED source.

21. The method of claim 19, wherein said curing condition comprises UV irradiation, and wherein a dose of said UV irradiation is higher than 0.1 $J/cm^2$ per layer.

* * * * *